(12) United States Patent
Tanaka

(10) Patent No.: US 9,720,214 B2
(45) Date of Patent: Aug. 1, 2017

(54) ZOOM LENS SYSTEM, IMAGING OPTICAL DEVICE, AND DIGITAL APPARATUS

(71) Applicant: Konica Minolta, Inc., Tokyo (JP)

(72) Inventor: Hiroaki Tanaka, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 48 days.

(21) Appl. No.: 14/725,095

(22) Filed: May 29, 2015

(65) Prior Publication Data

US 2015/0350557 A1 Dec. 3, 2015

(30) Foreign Application Priority Data

Jun. 2, 2014 (JP) ................................. 2014-113959

(51) Int. Cl.
*G02B 27/64* (2006.01)
*G02B 15/14* (2006.01)
*G02B 15/173* (2006.01)

(52) U.S. Cl.
CPC ........... *G02B 15/14* (2013.01); *G02B 15/173* (2013.01); *G02B 27/646* (2013.01)

(58) Field of Classification Search
CPC ........ G02B 15/00; G02B 15/14; G02B 15/15; G02B 15/16; G02B 15/163; G02B 15/167; G02B 15/173; G02B 15/22; G02B 15/24; G02B 15/28; G02B 27/64; G02B 27/646
See application file for complete search history.

(56) References Cited

U.S. PATENT DOCUMENTS

| | | | | |
|---|---|---|---|---|
| 5,000,549 A * | 3/1991 | Yamazaki | ............ | G02B 15/161 359/557 |
| 5,687,401 A * | 11/1997 | Kawamura | .......... | G02B 15/173 359/676 |
| 6,046,852 A * | 4/2000 | Konno | ................. | G02B 27/646 359/557 |
| 6,650,475 B1 | 11/2003 | Hamano | | |
| 7,057,818 B2 | 6/2006 | Hamano et al. | | |
| 8,218,238 B2 * | 7/2012 | Hagiwara | ............ | G02B 27/646 359/554 |
| 8,228,615 B2 * | 7/2012 | Shinohara | ............ | G02B 15/173 359/557 |
| 2006/0215278 A1 * | 9/2006 | Ori | ........................ | G02B 27/646 359/687 |
| 2009/0290216 A1 * | 11/2009 | Fujisaki | ............... | G02B 15/173 359/557 |

FOREIGN PATENT DOCUMENTS

| | | |
|---|---|---|
| JP | 2001-117000 A | 4/2001 |
| JP | 2003-295059 A | 10/2003 |

* cited by examiner

*Primary Examiner* — Thong Nguyen
(74) *Attorney, Agent, or Firm* — Osha Liang LLP

(57) ABSTRACT

In a zoom lens system, a distance between a first lens group and a second lens group is increased, a distance between the second lens group and a third lens group is reduced, and a distance between the third lens group and a fourth lens group is reduced. The third lens group includes, in order from an object side, a front lens group and a rear lens group separated from each other by a widest air gap on an optical axis in the third lens group. Camera-shake correction is performed by moving whole or part of the front lens group as a camera-shake correction lens group perpendicularly to the optical axis. Conditional formula below is satisfied: $-3.0 < \text{fis}/\text{f3} < -0.9$, where f3 represents a focal length of the third lens group and fis represents a focal length of the camera-shake correction lens group.

12 Claims, 49 Drawing Sheets

EX1

FIG.7A EX1-W
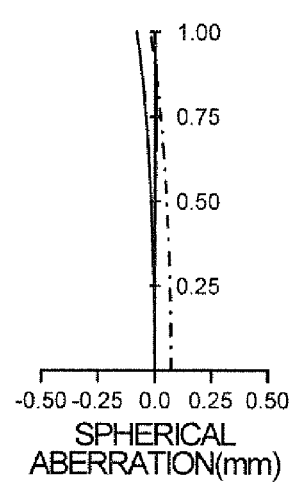
SPHERICAL ABERRATION(mm)
FIG.7B EX1-W
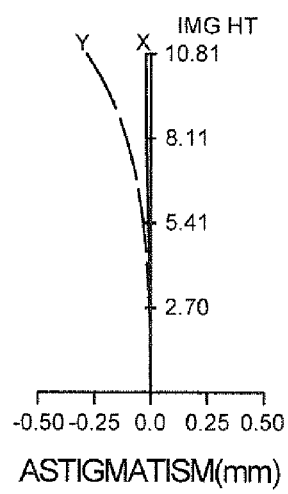
ASTIGMATISM(mm)
FIG.7C EX1-W
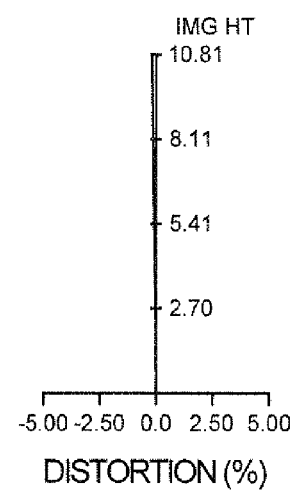
DISTORTION (%)
FIG.7D EX1-M
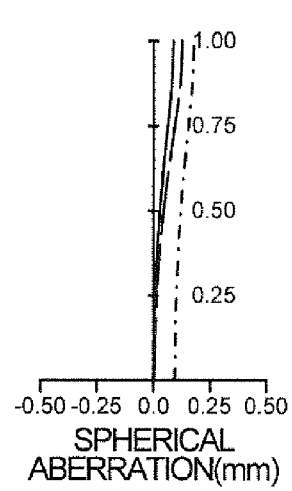
SPHERICAL ABERRATION(mm)
FIG.7E EX1-M
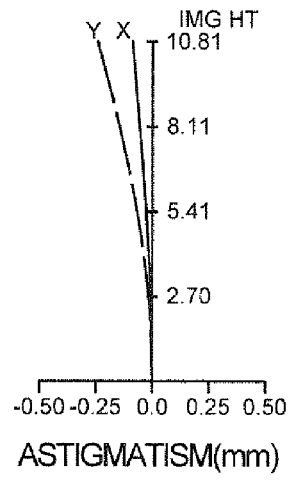
ASTIGMATISM(mm)
FIG.7F EX1-M
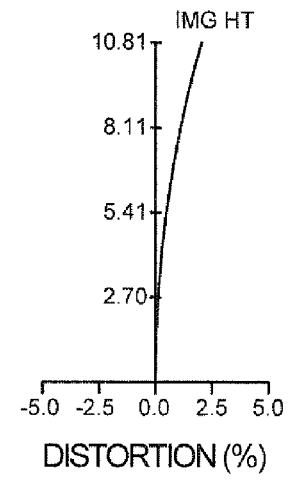
DISTORTION (%)
FIG.7G EX1-T
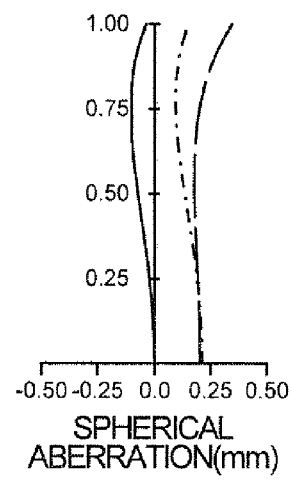
SPHERICAL ABERRATION(mm)
FIG.7H EX1-T
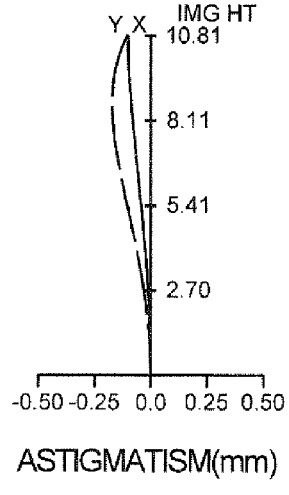
ASTIGMATISM(mm)
FIG.7I EX1-T
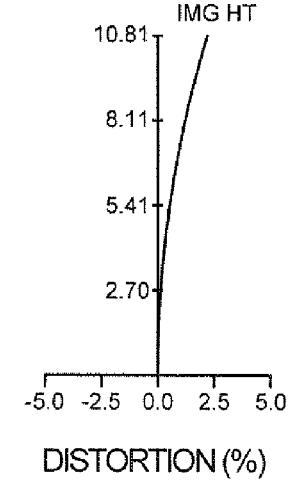
DISTORTION (%)

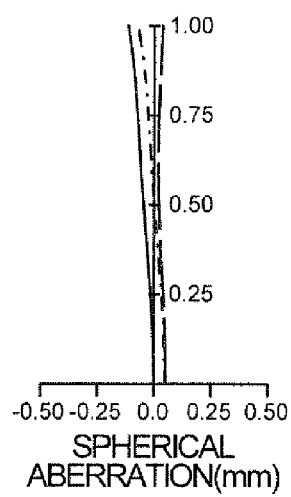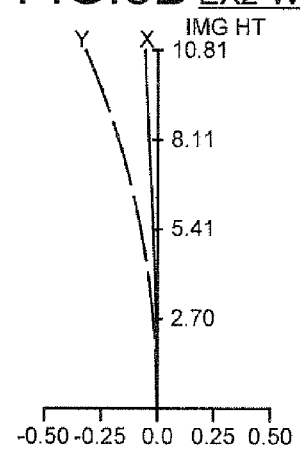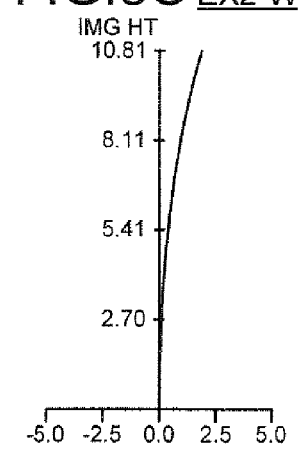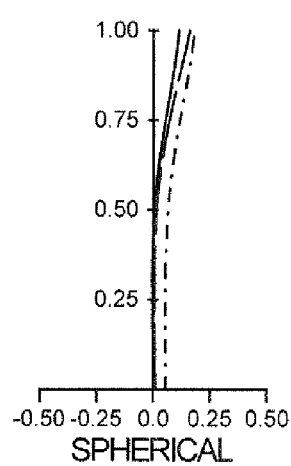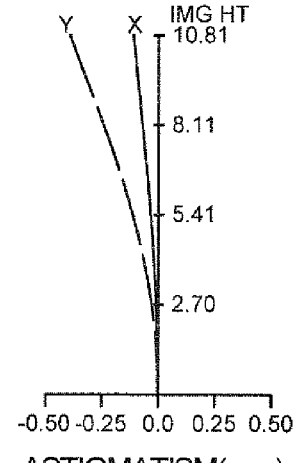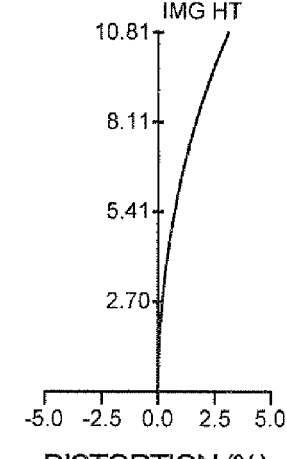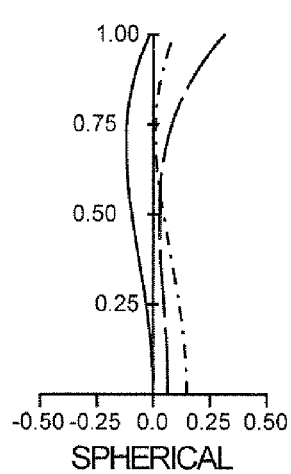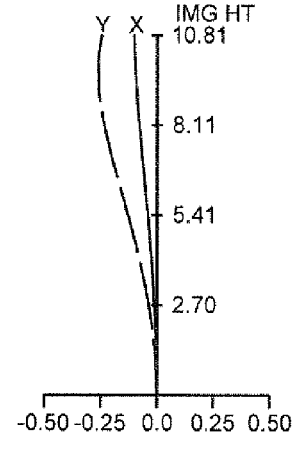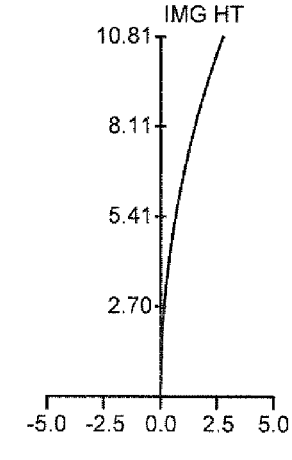

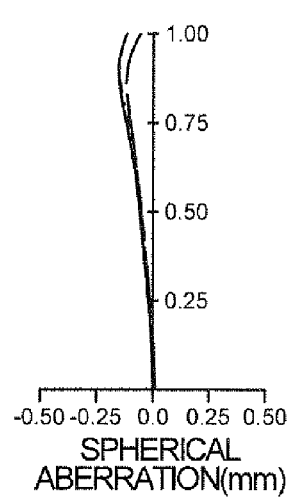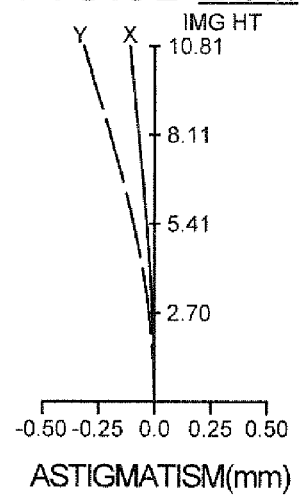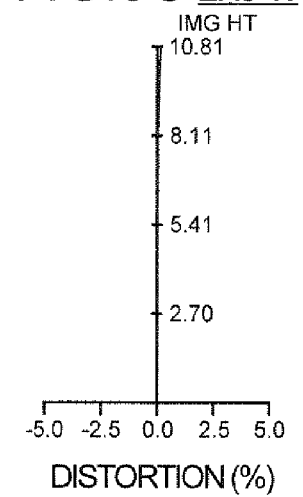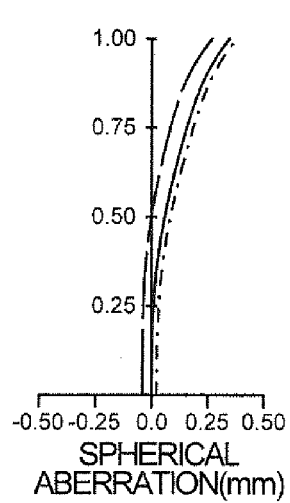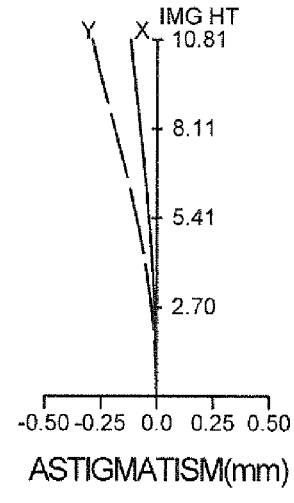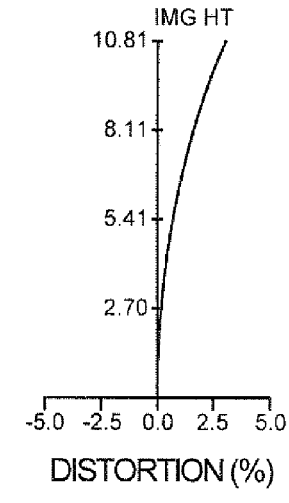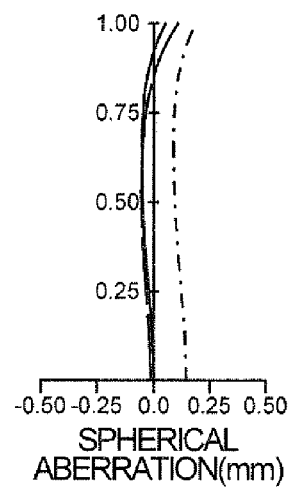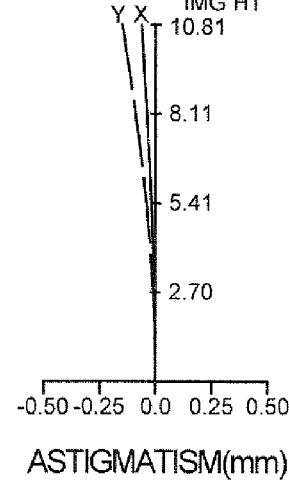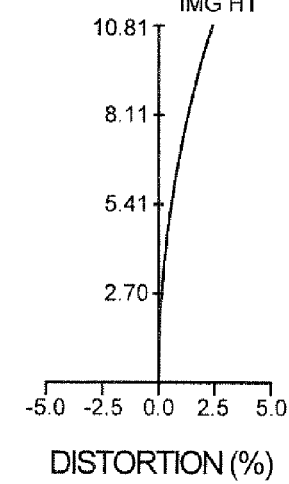

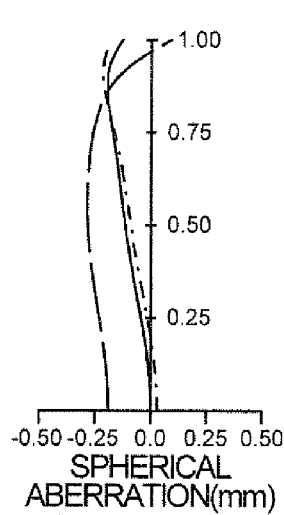
FIG.10A EX4-W
SPHERICAL ABERRATION(mm)
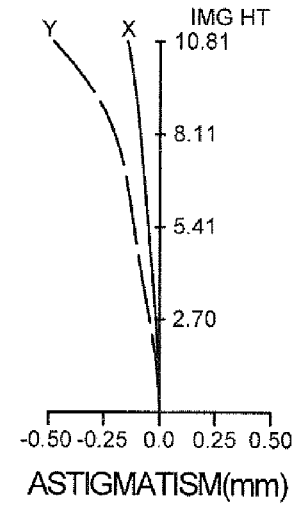
FIG.10B EX4-W
ASTIGMATISM(mm)
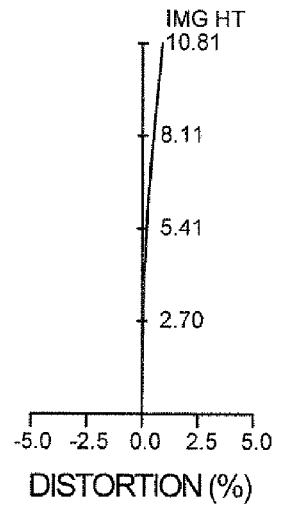
FIG.10C EX4-W
DISTORTION (%)
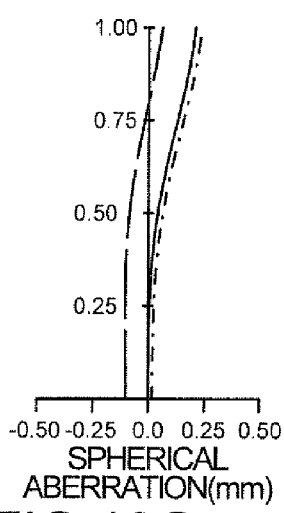
FIG.10D EX4-M
SPHERICAL ABERRATION(mm)
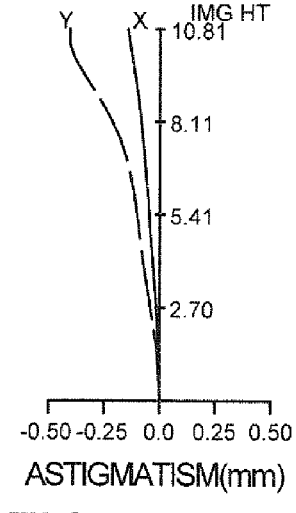
FIG.10E EX4-M
ASTIGMATISM(mm)
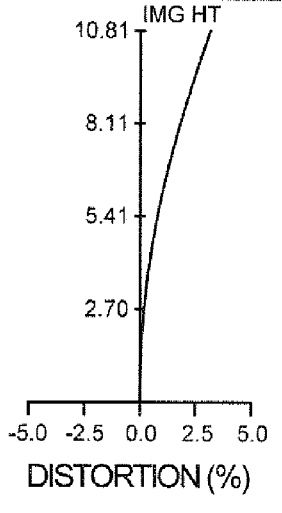
FIG.10F EX4-M
DISTORTION (%)
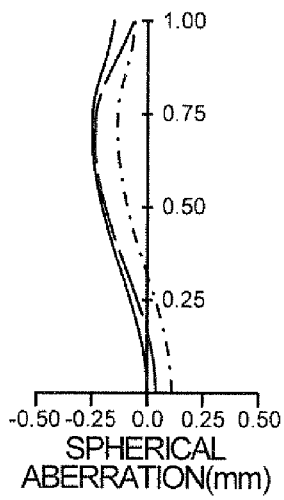
FIG.10G EX4-T
SPHERICAL ABERRATION(mm)
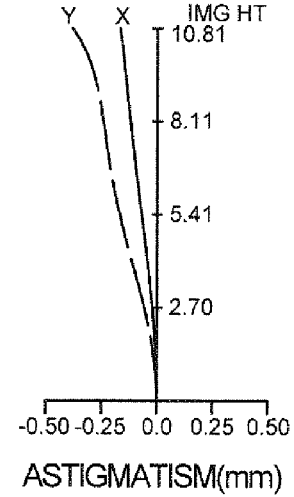
FIG.10H EX4-T
ASTIGMATISM(mm)
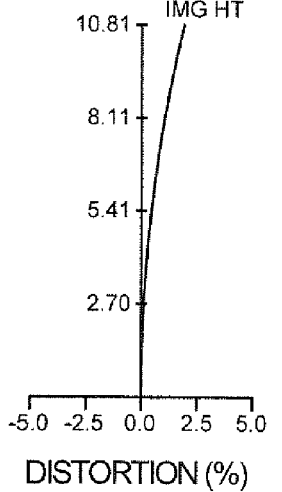
FIG.10I EX4-T
DISTORTION (%)

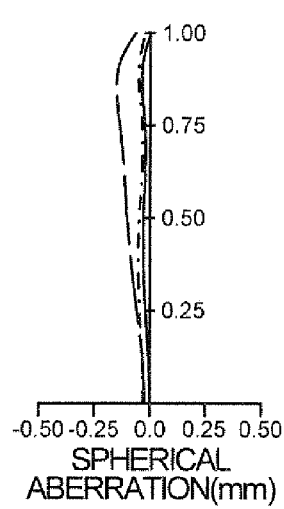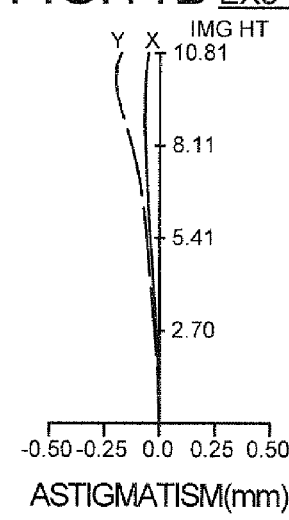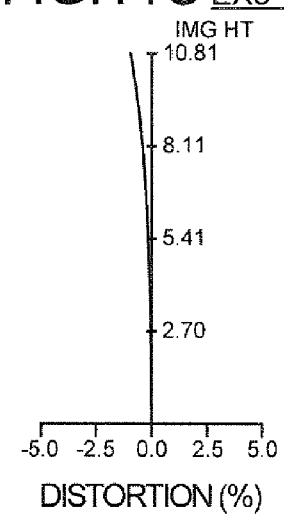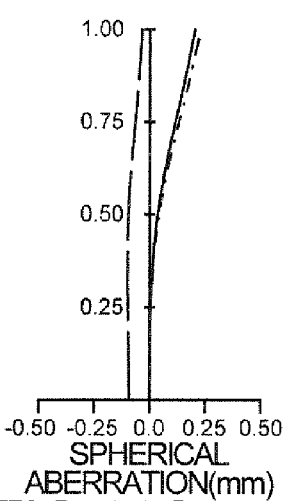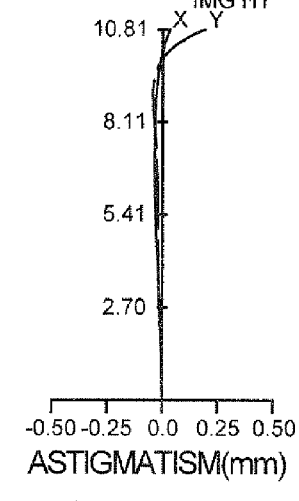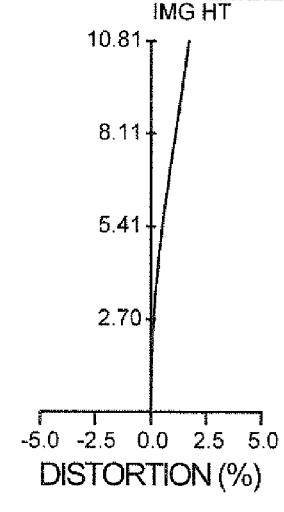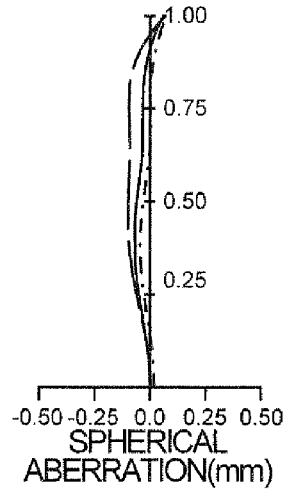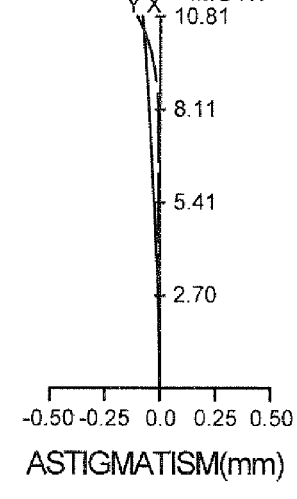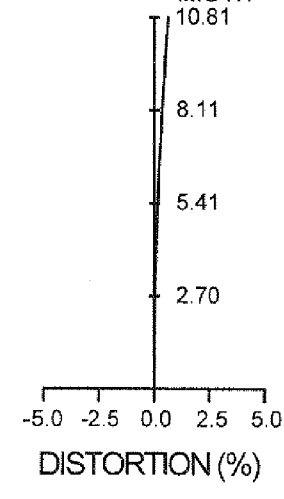

FIG.12A EX6-W 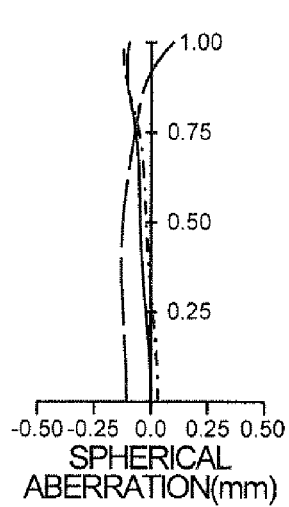
FIG.12B EX6-W 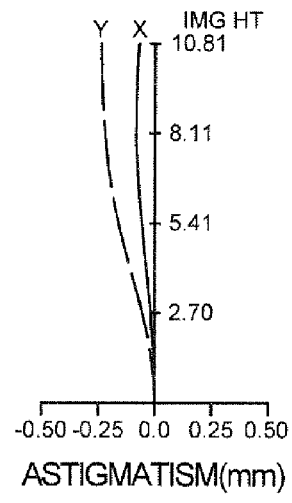
FIG.12C EX6-W 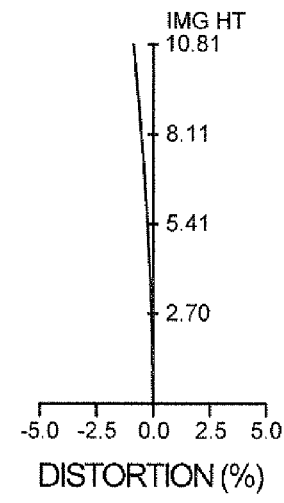
FIG.12D EX6-M 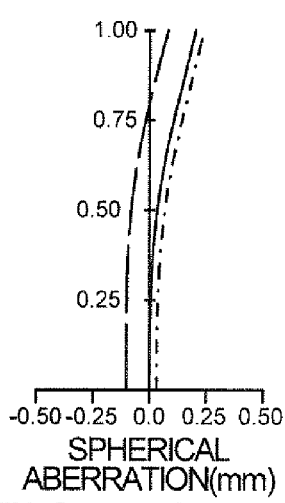
FIG.12E EX6-M 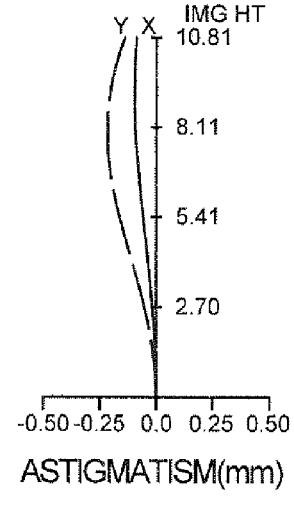
FIG.12F EX6-M 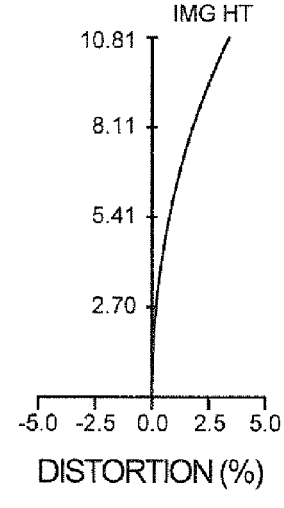
FIG.12G EX6-T 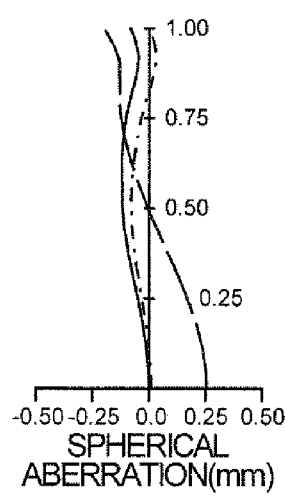
FIG.12H EX6-T 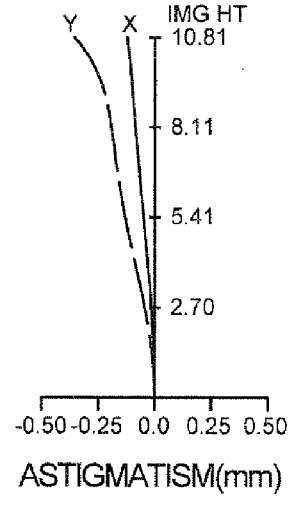
FIG.12I EX6-T 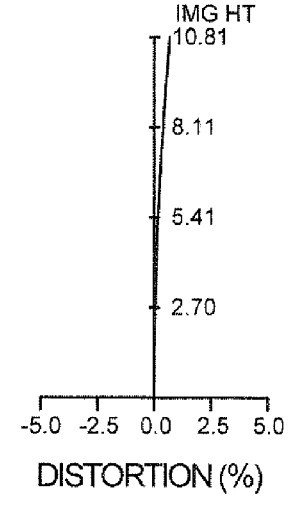

FIG.14A
FIG.14E
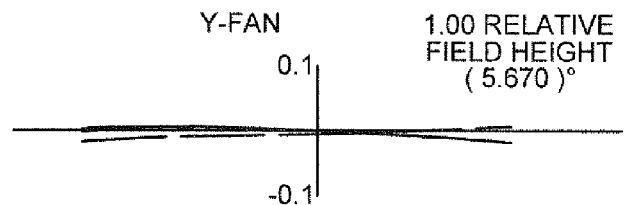
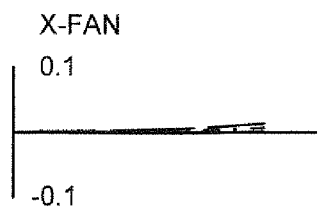
FIG.14B
FIG.14F
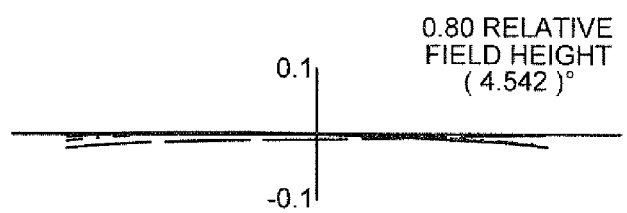
FIG.14C
FIG.14G
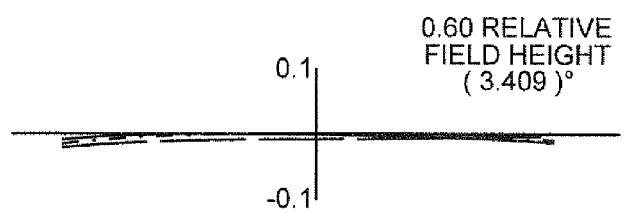
FIG.14D
FIG.14H
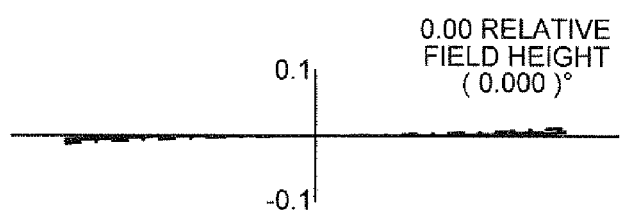

FIG.16A
FIG.16B
FIG.16C
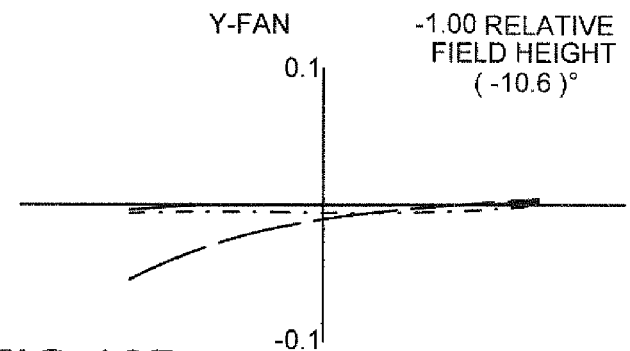
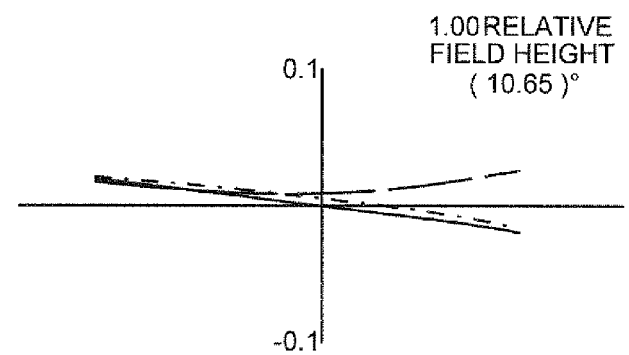
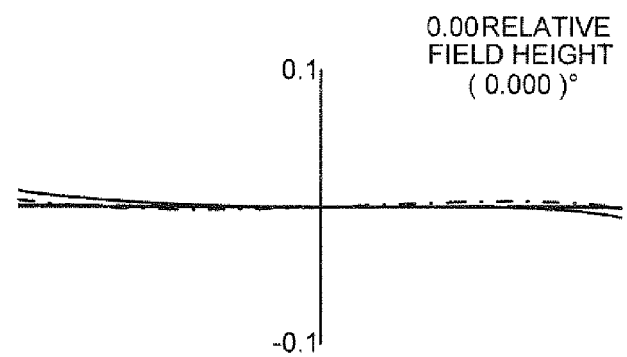
FIG.16D
FIG.16E
FIG.16F
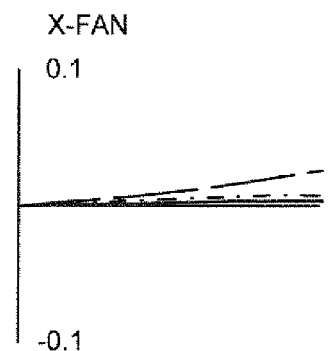
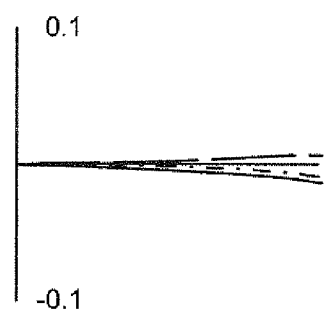
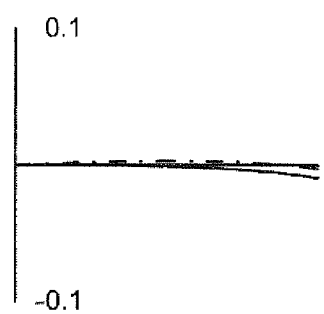

FIG.17A
FIG.17B
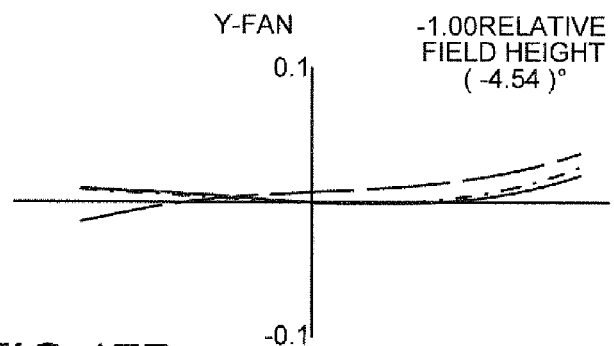
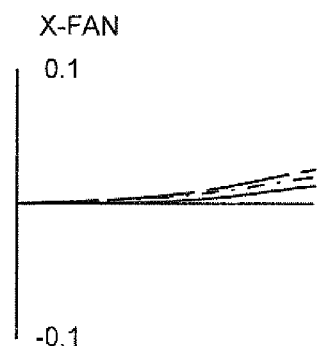
FIG.17D
FIG.17C
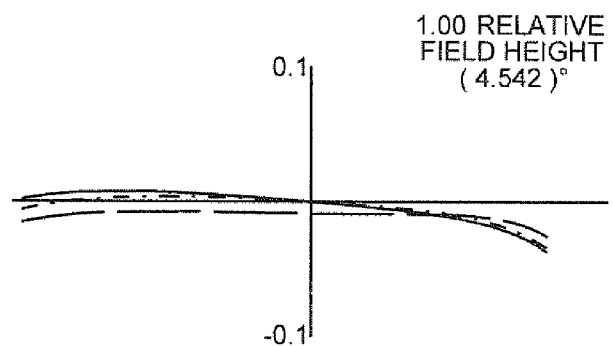
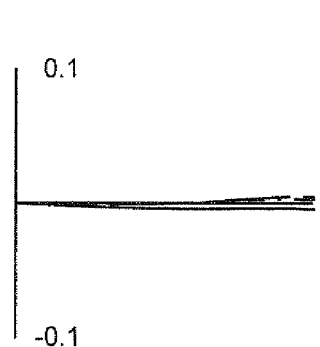
FIG.17E
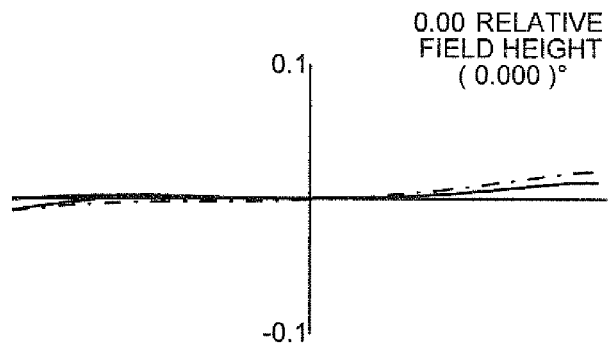
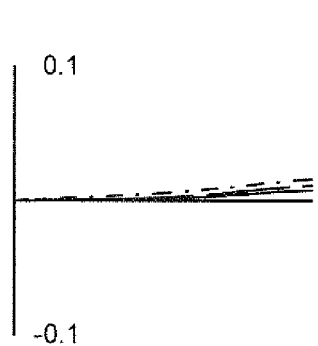
FIG.17F FIG.18A
FIG.18D
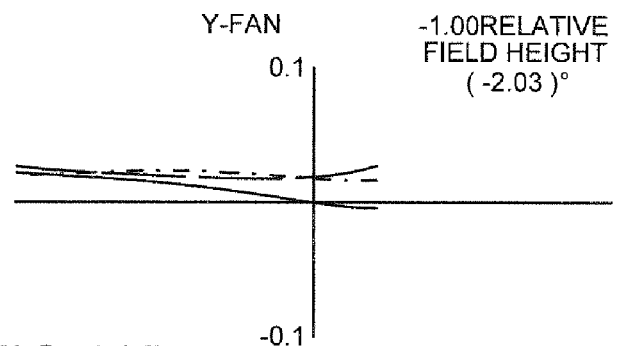
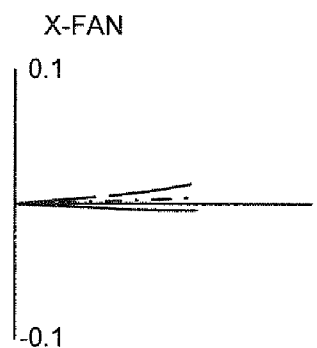
FIG.18B
FIG.18E
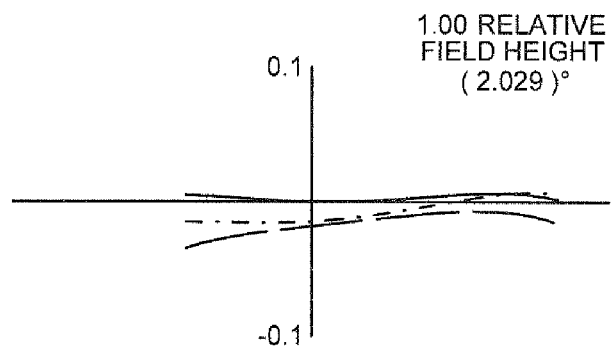
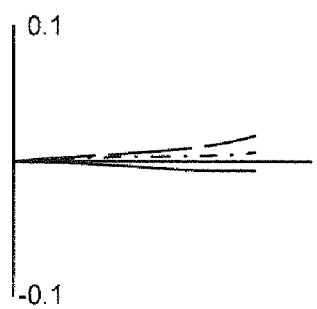
FIG.18C
FIG.18F
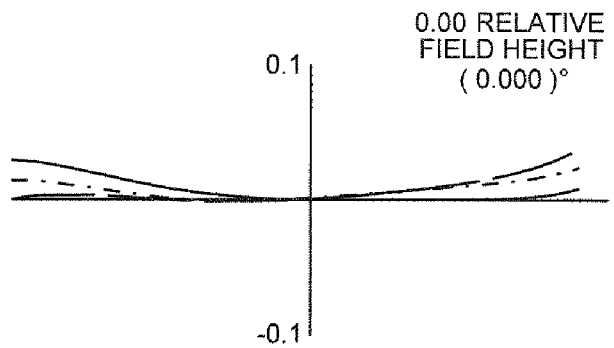
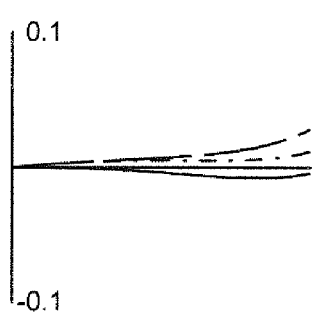

FIG.21A
FIG.21E
Y-FAN 1.00 RELATIVE FIELD HEIGHT (2.537)°  X-FAN
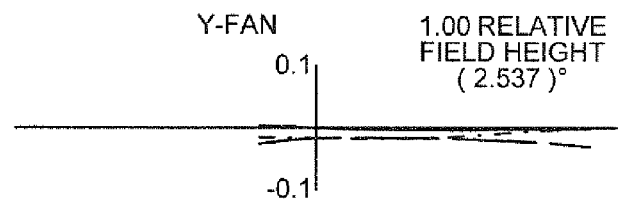
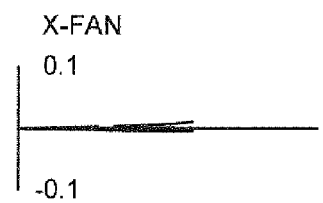
FIG.21B
FIG.21F
0.80 RELATIVE FIELD HEIGHT (2.030)°
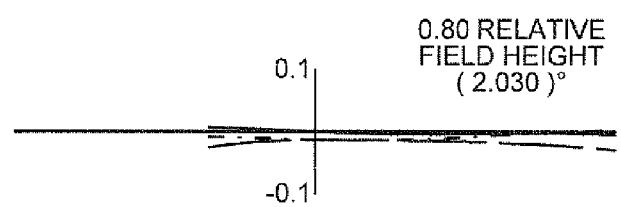
FIG.21C
FIG.21G
0.60 RELATIVE FIELD HEIGHT (1.523)°
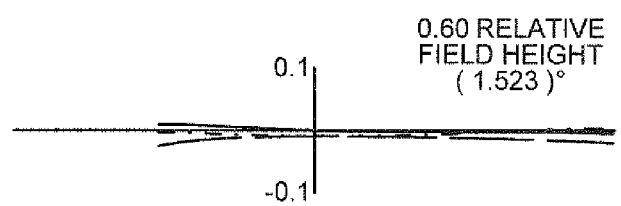
FIG.21D
FIG.21H
0.00 RELATIVE FIELD HEIGHT (0.000)°
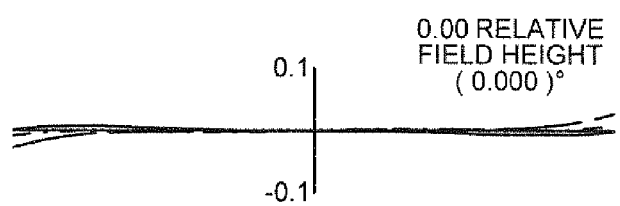

FIG.22A  FIG.22D
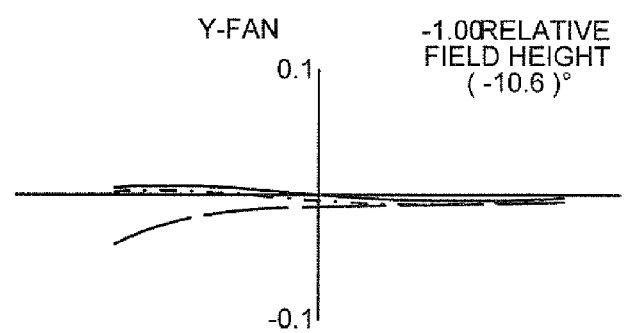
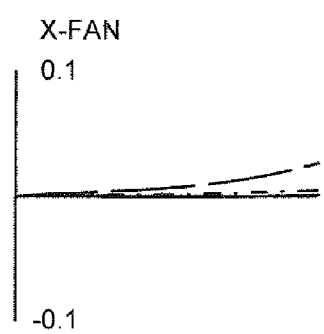
FIG.22B  FIG.22E
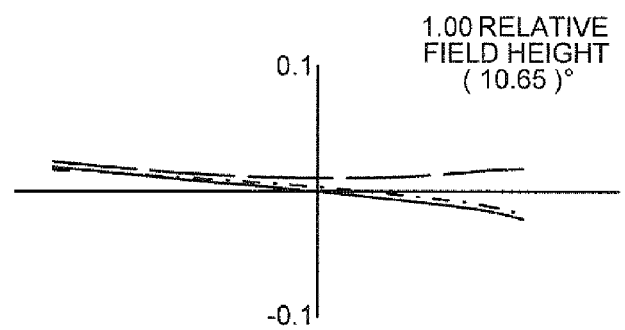
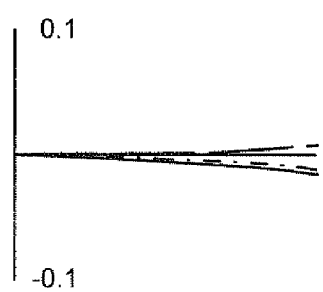
FIG.22C  FIG.22F
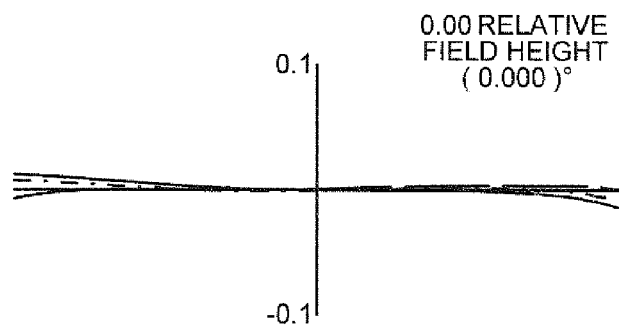
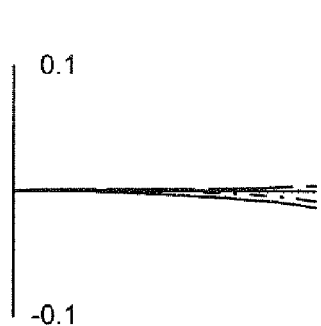

FIG.23A
FIG.23D
FIG.23B
FIG.23E
FIG.23C
FIG.23F
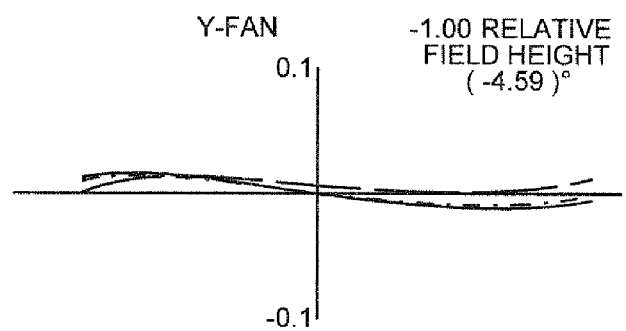
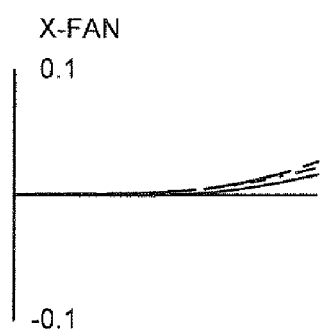
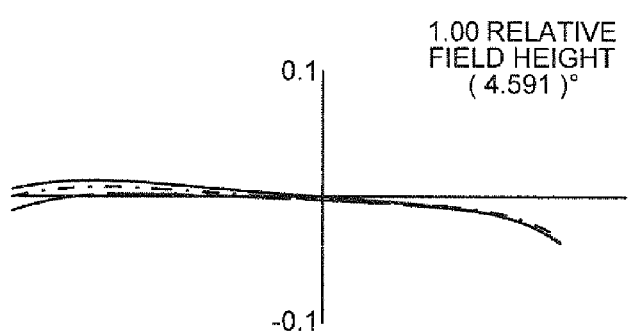
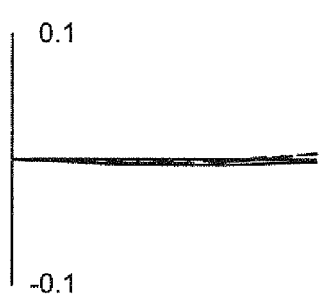
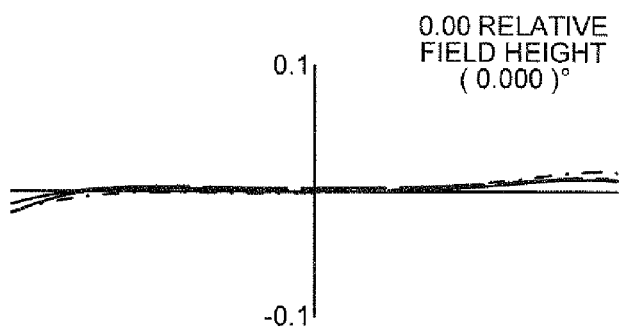
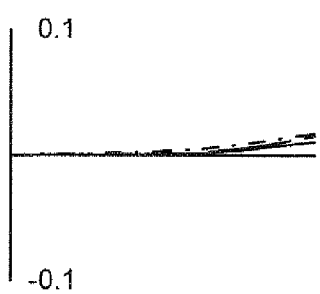

FIG.24A
FIG.24D
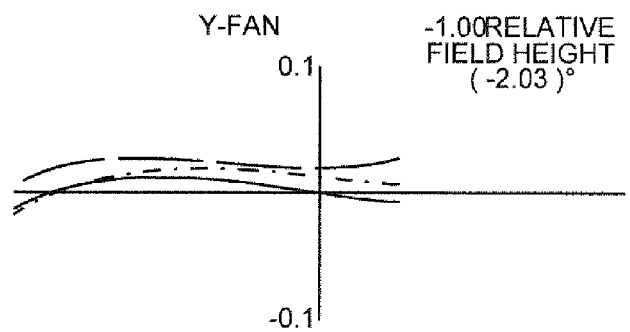
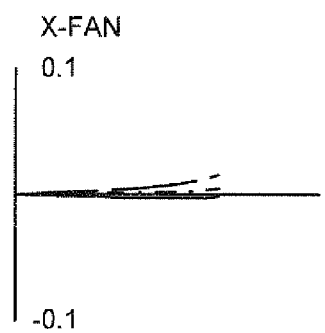
FIG.24B
FIG.24E
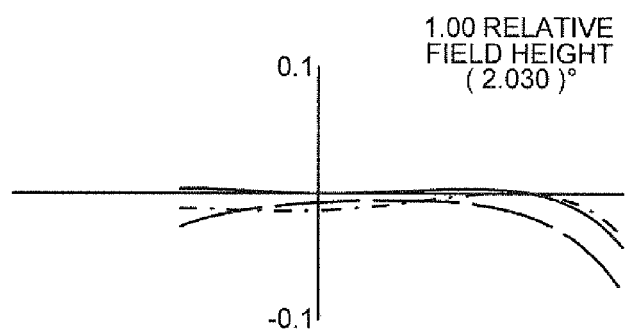
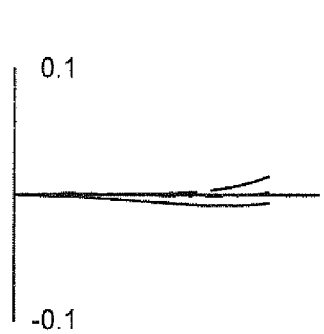
FIG.24C
FIG.24F
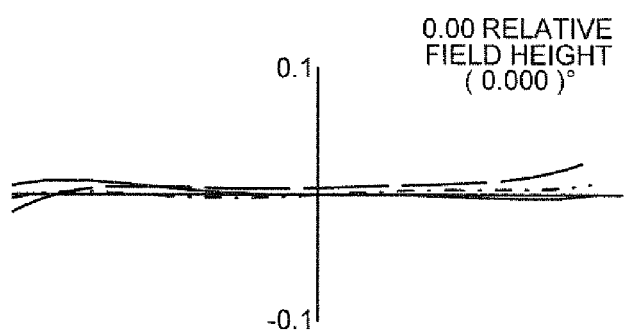
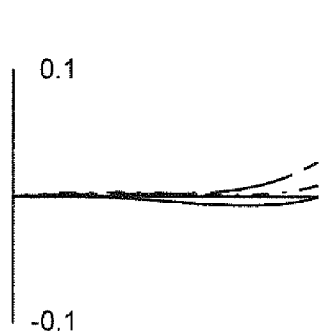

FIG.27A
FIG.27E
Y-FAN  1.00 RELATIVE FIELD HEIGHT ( 2.535 )°
X-FAN
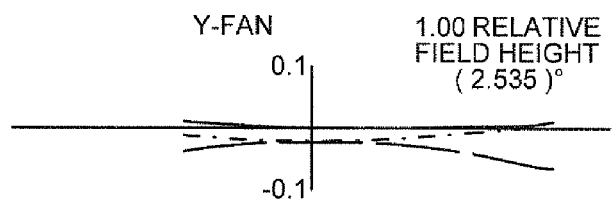
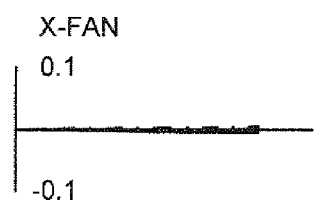
FIG.27B
FIG.27F
0.80 RELATIVE FIELD HEIGHT ( 2.029 )°
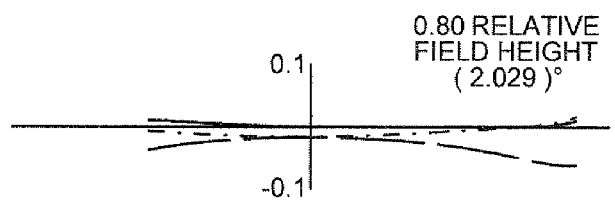
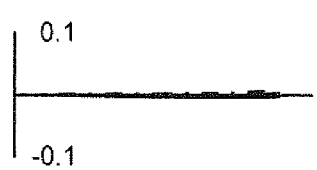
FIG.27C
FIG.27G
0.60 RELATIVE FIELD HEIGHT ( 1.522 )°
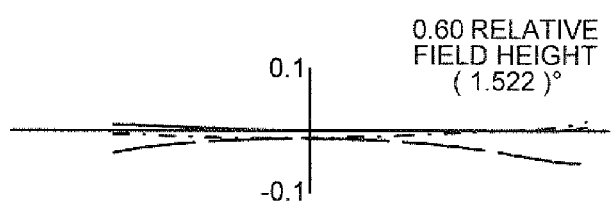
FIG.27D
FIG.27H
0.00 RELATIVE FIELD HEIGHT ( 0.000 )°
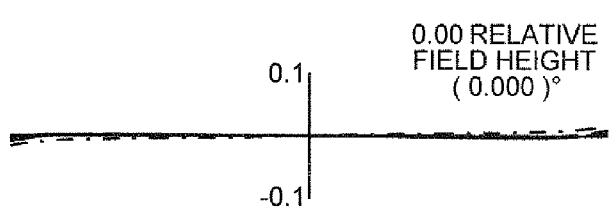

FIG.28A
FIG.28D
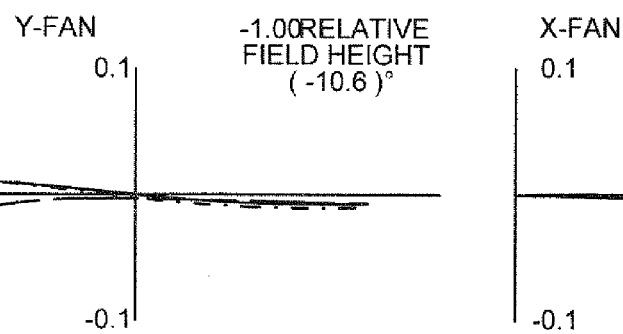
FIG.28B
FIG.28E
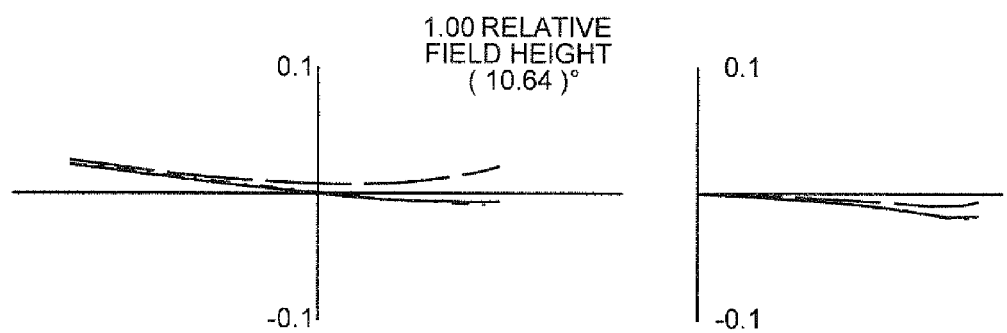
FIG.28C
FIG.28F
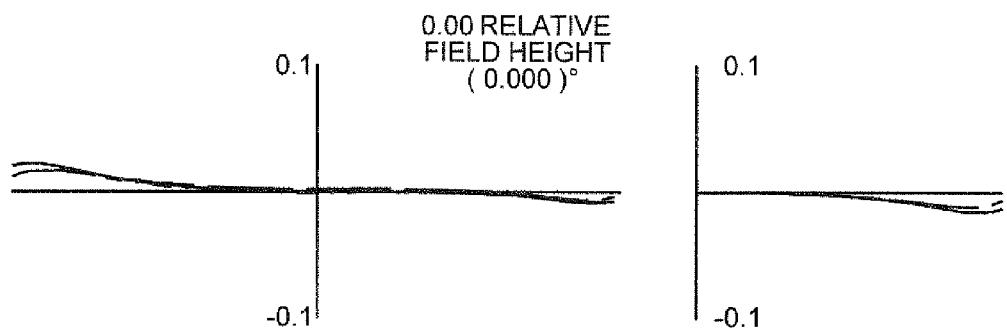

FIG.29A
FIG.29D
FIG.29B
FIG.29E
FIG.29C
FIG.29F
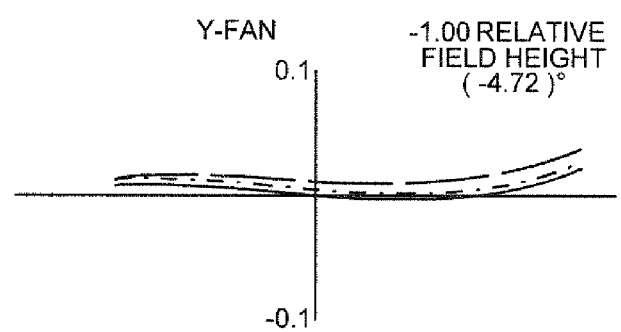
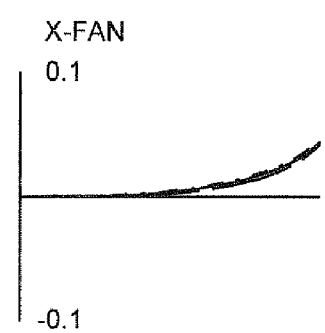
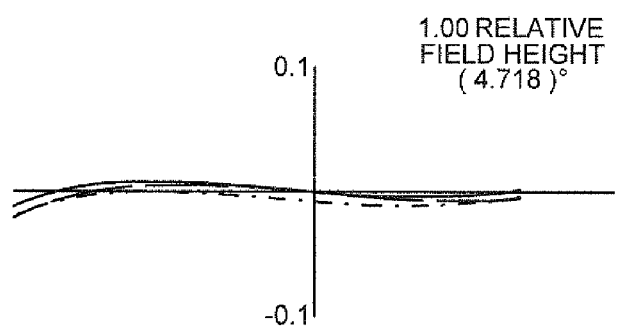
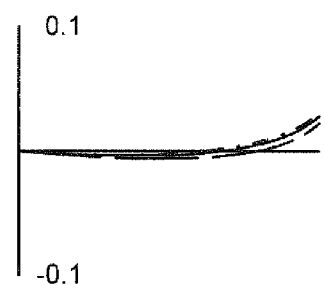
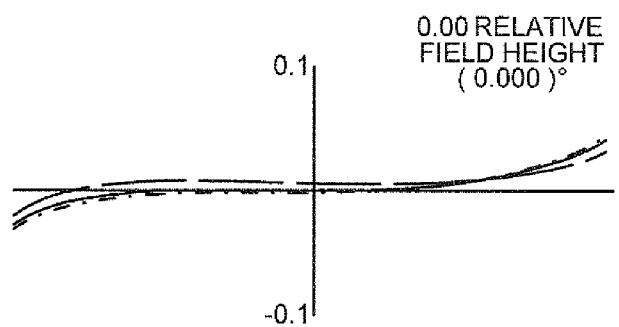
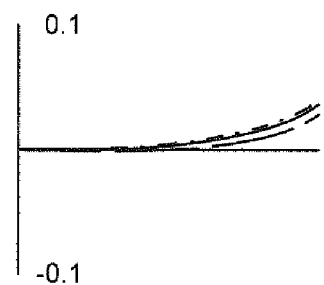

FIG.30A
FIG.30B
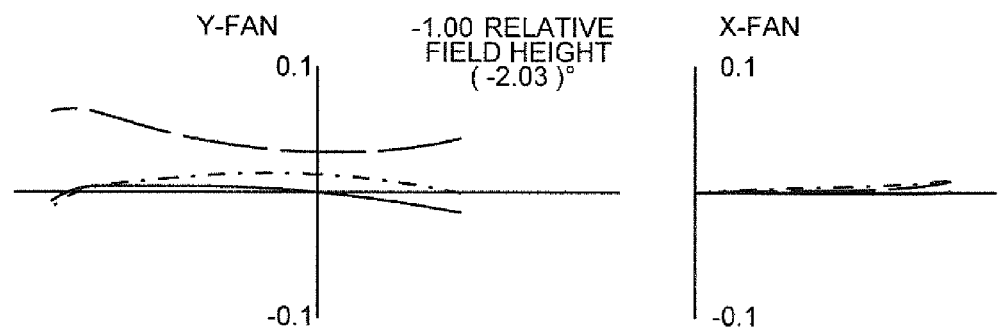
FIG.30C
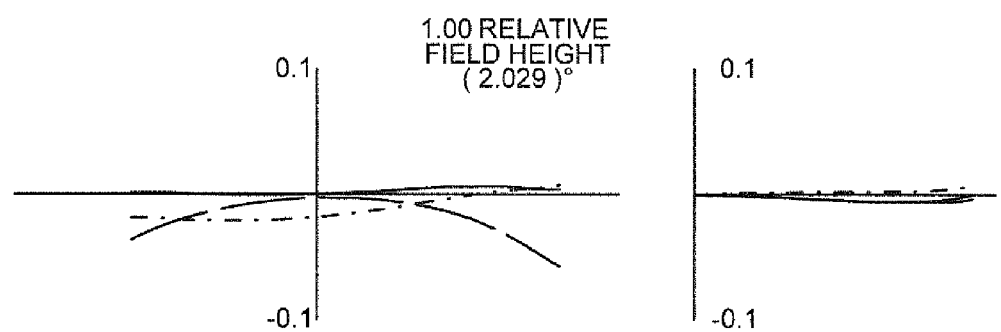
FIG.30D
FIG.30E
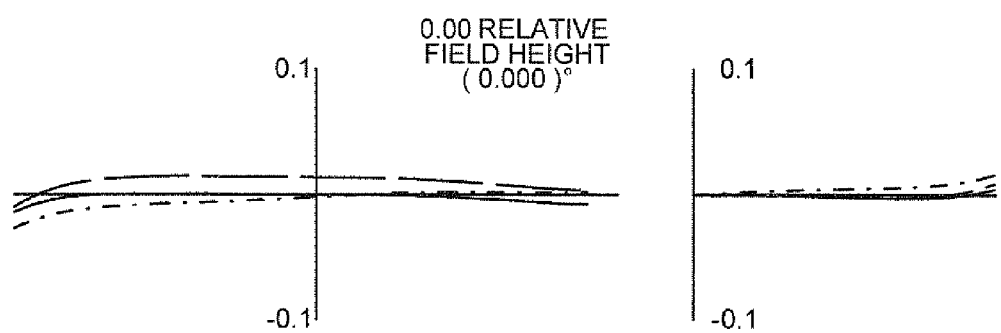
FIG.30F FIG.34A  FIG.34D
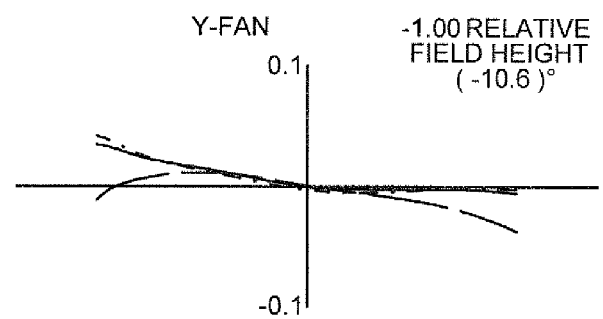
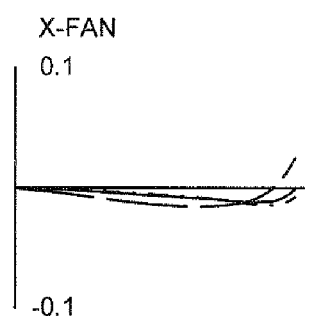
FIG.34B  FIG.34E
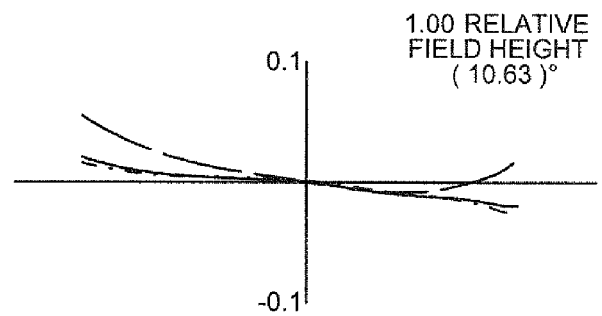
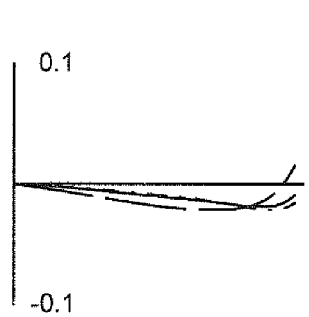
FIG.34C  FIG.34F
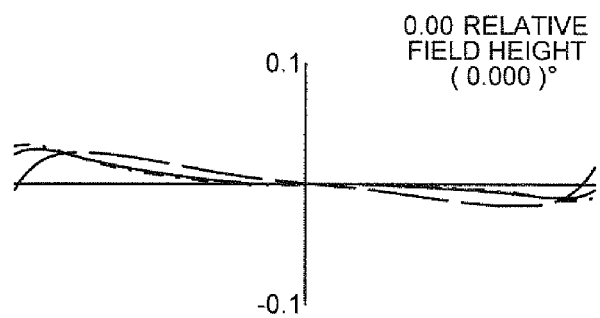

FIG.35A                                    FIG.35D
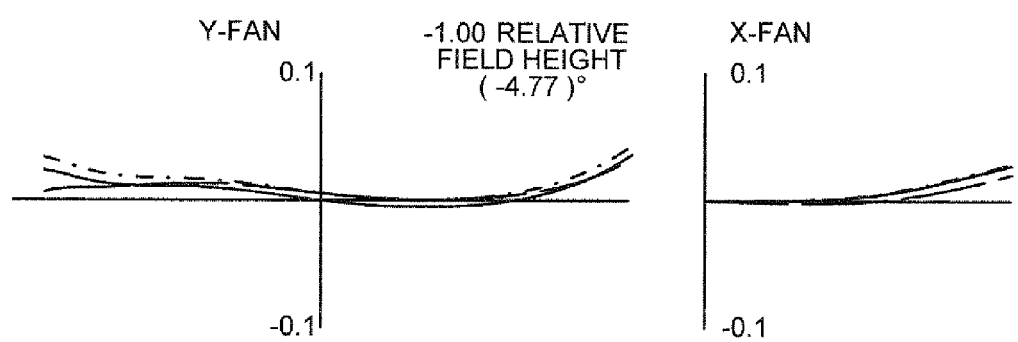
FIG.35B                                    FIG.35E
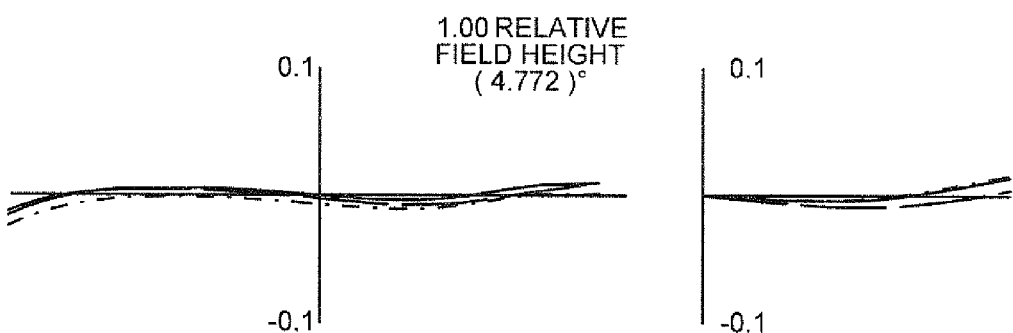
FIG.35C                                    FIG.35F
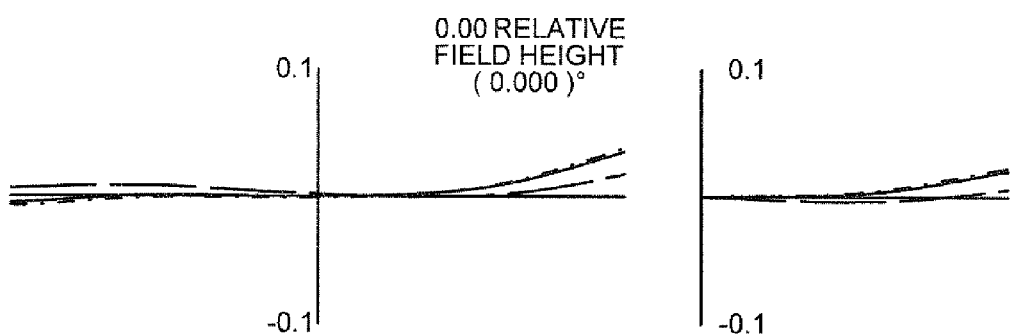

FIG.36A
FIG.36D
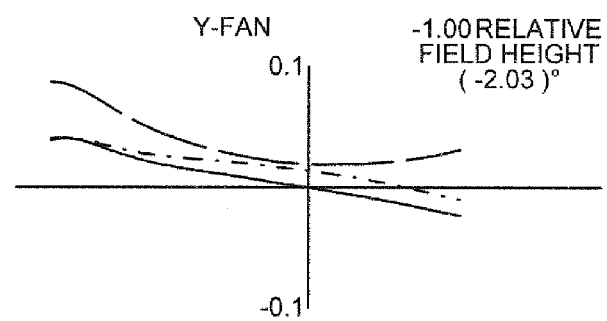
FIG.36B
FIG.36E
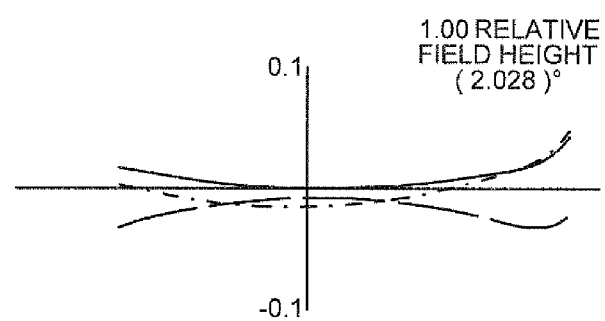
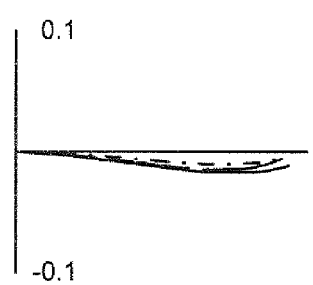
FIG.36C
FIG.36F
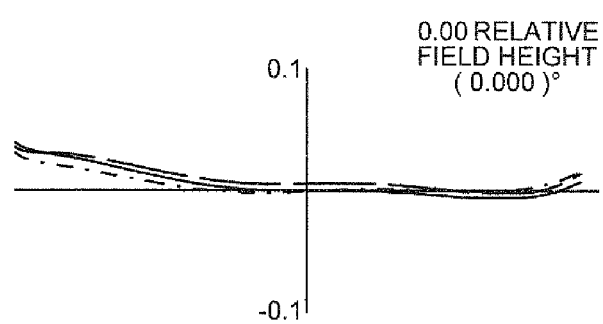
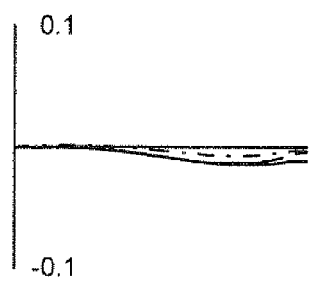

Y-FAN  1.00 RELATIVE FIELD HEIGHT (6.078)°

X-FAN 0.80 RELATIVE FIELD HEIGHT (4.869)°

0.60 RELATIVE FIELD HEIGHT (3.656)°

0.00 RELATIVE FIELD HEIGHT (0.000)°

FIG.40A
FIG.40D
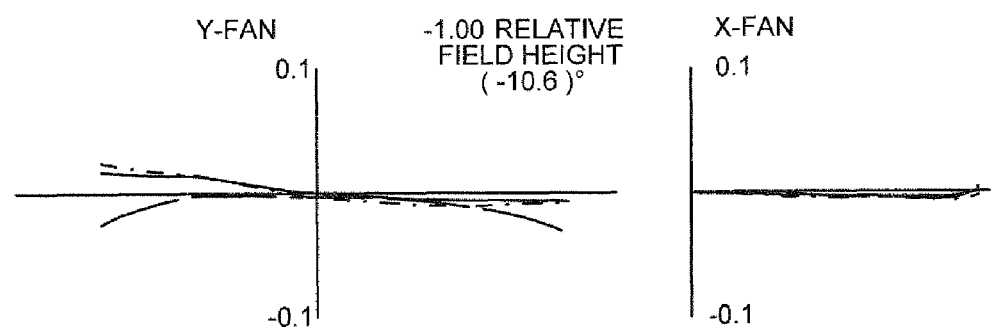
FIG.40B
FIG.40E
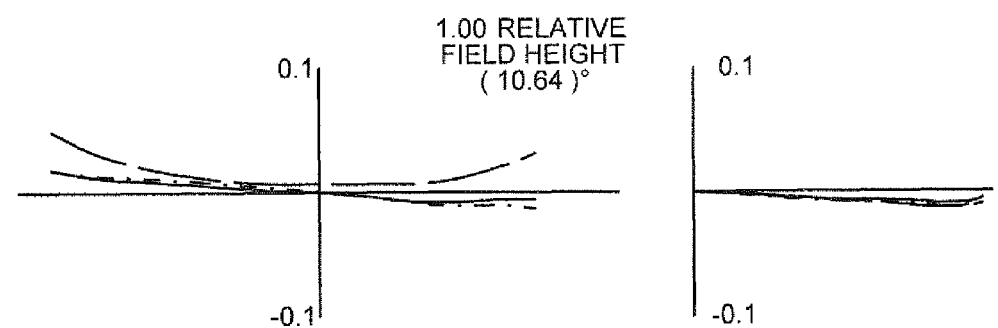
FIG.40C
FIG.40F
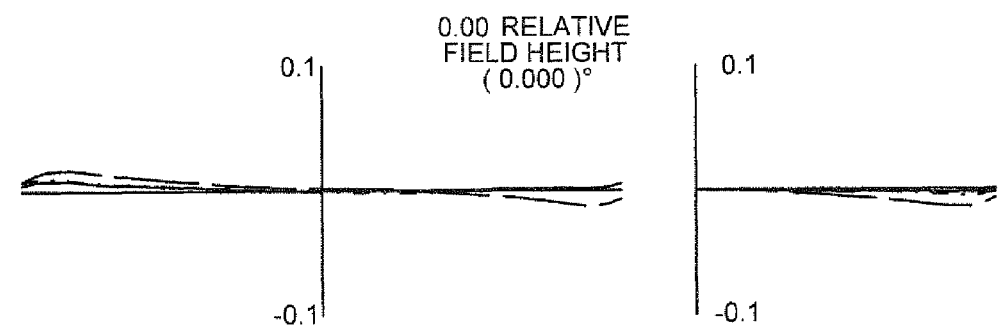

FIG.41A
FIG.41B
FIG.41C
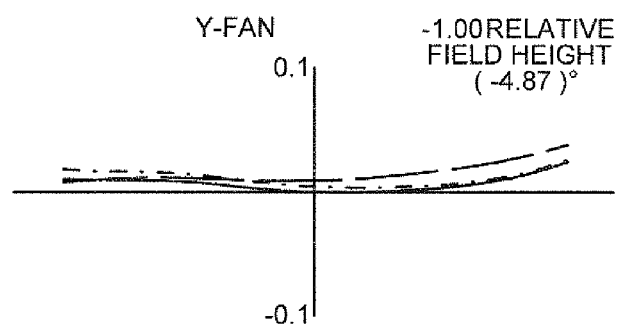
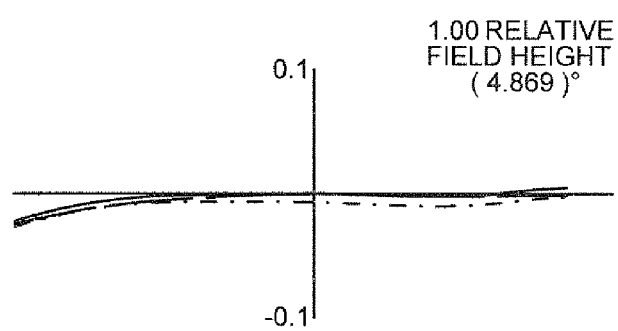
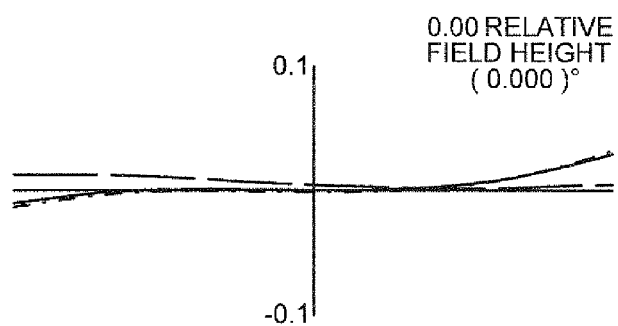
FIG.41D
FIG.41E
FIG.41F
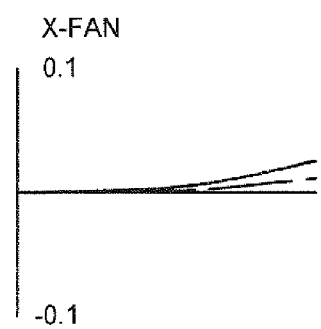
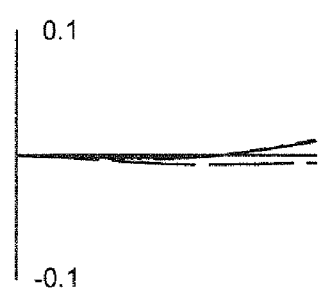

FIG.42A
FIG.42D
FIG.42B
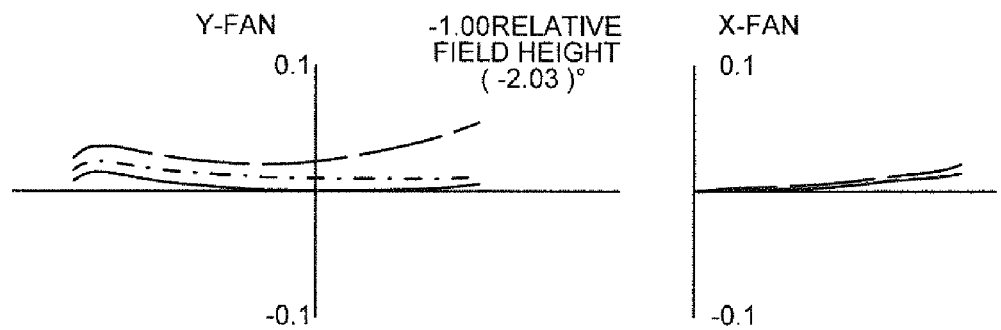
FIG.42E
FIG.42C
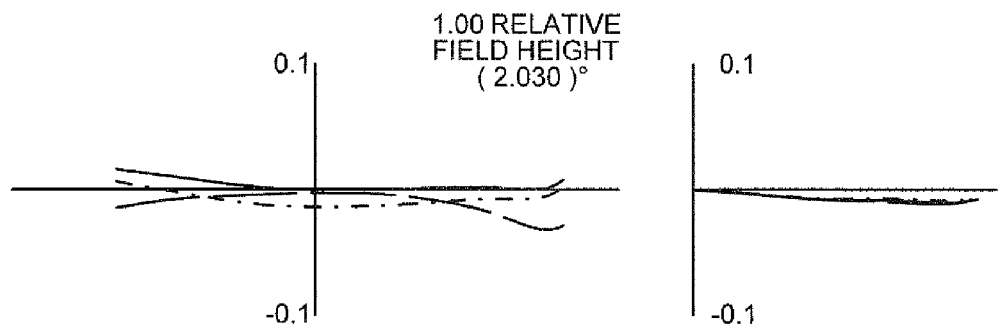
FIG.42F
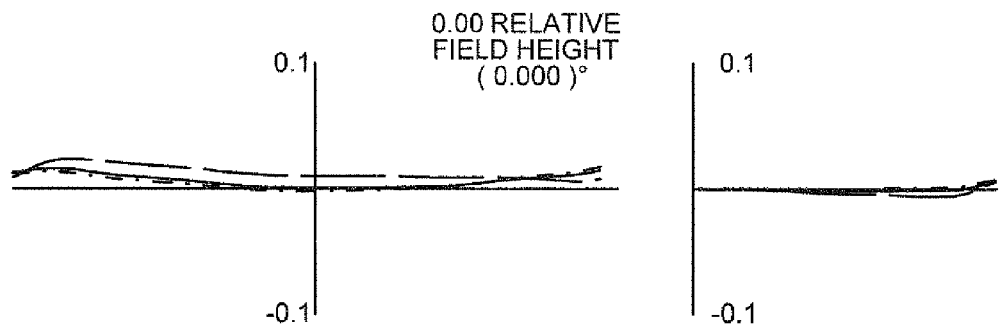

FIG.43A
FIG.43E
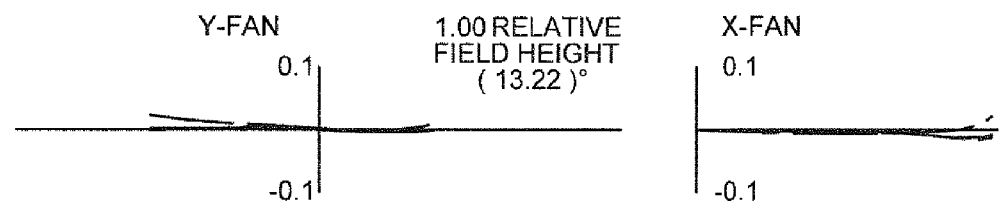
FIG.43B
FIG.43F
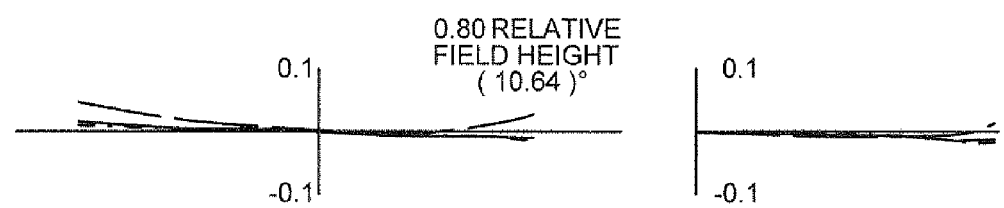
FIG.43C
FIG.43G
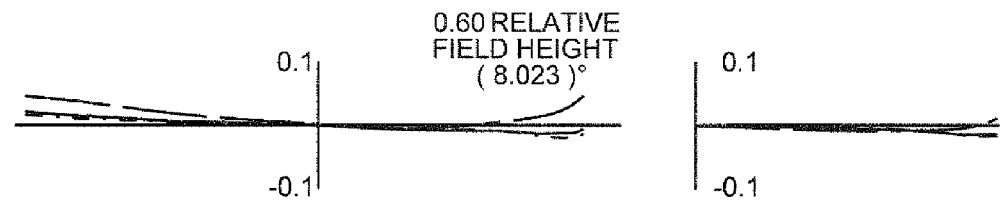
FIG.43D
FIG.43H
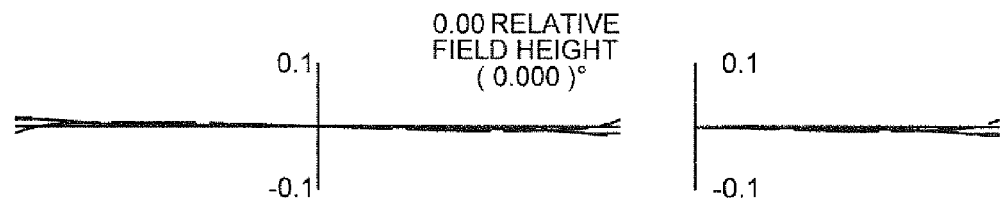

FIG.45A
FIG.45E
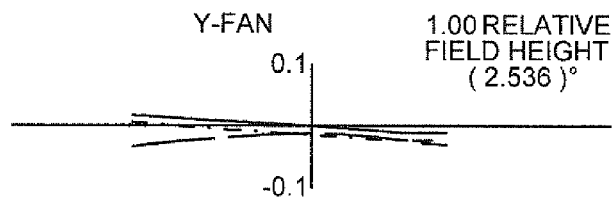
FIG.45B
FIG.45F
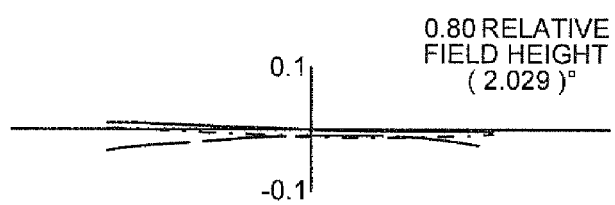
FIG.45C
FIG.45G
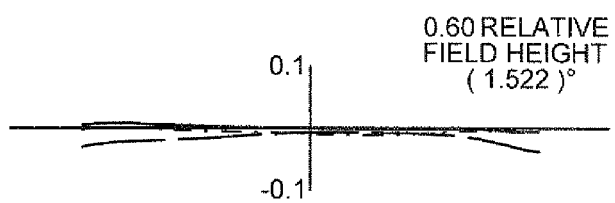
FIG.45D
FIG.45H
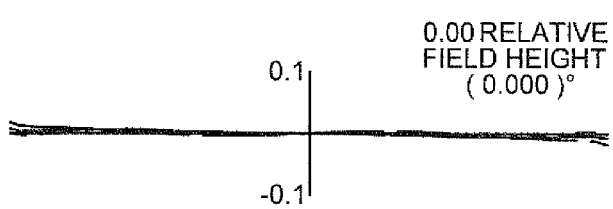

FIG.46A
FIG.46D
FIG.46B
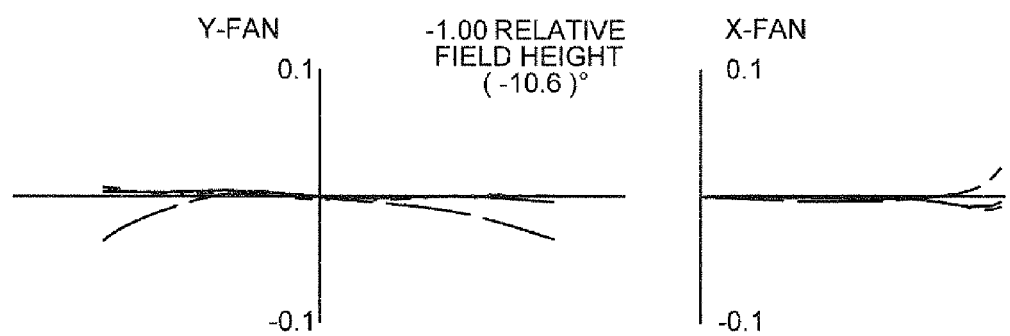
FIG.46E
FIG.46C
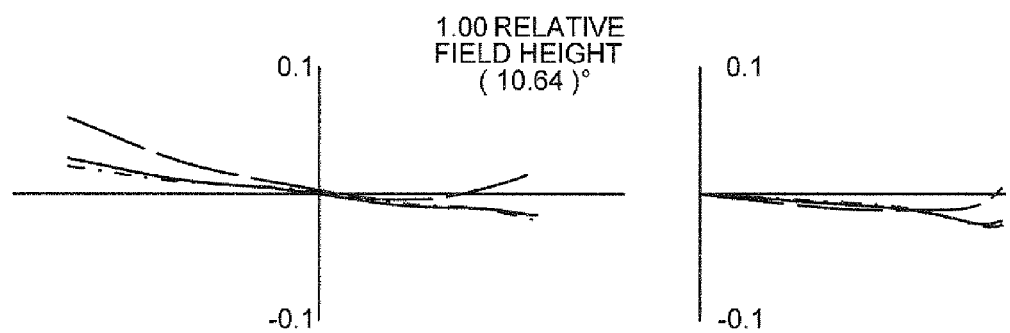
FIG.46F
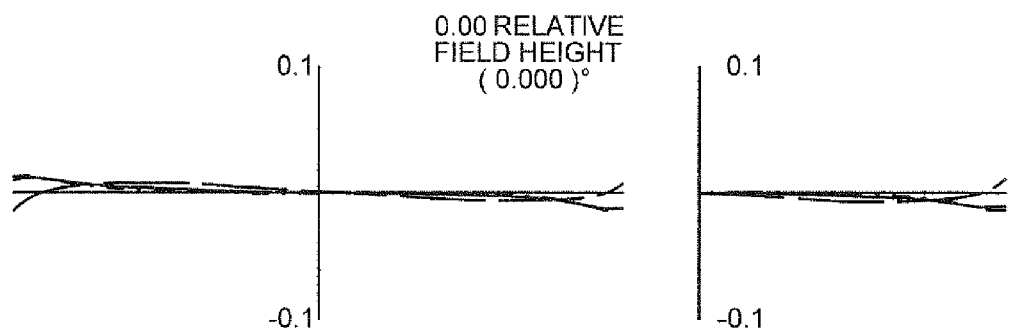

FIG.47A
FIG.47D
FIG.47B
FIG.47E
FIG.47C
FIG.47F
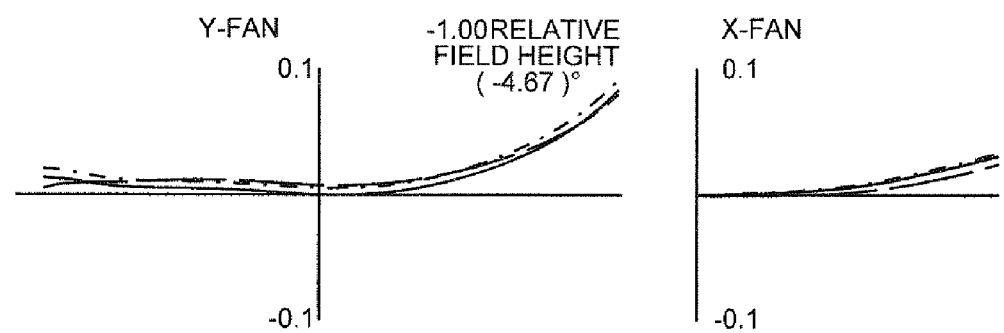
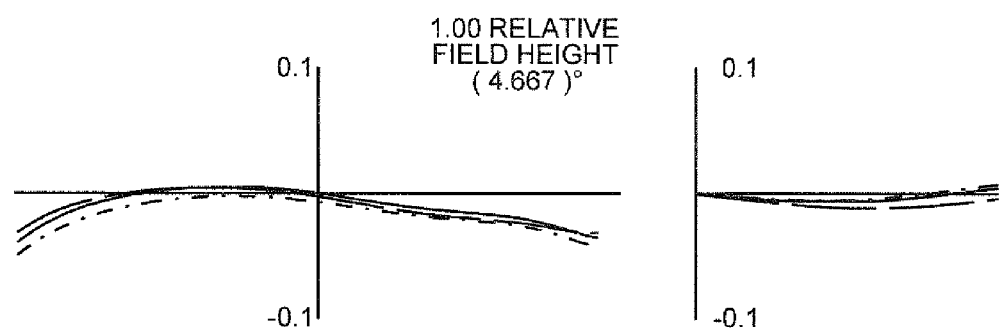
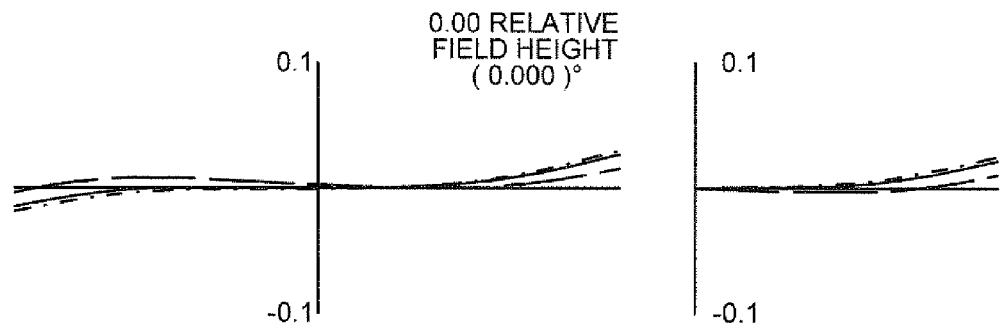

ZOOM LENS SYSTEM, IMAGING OPTICAL DEVICE, AND DIGITAL APPARATUS

CROSS-REFERENCE TO RELATED APPLICATIONS

This application is based on Japanese Patent Application No. 2014-113959 filed on Jun. 2, 2014, the contents of which are hereby incorporated by reference.

BACKGROUND OF THE INVENTION

1. Field of the Invention

Embodiments of the invention relate to a zoom lens system, an imaging optical device, and a digital apparatus. For example, one or more embodiments of the present invention relate to the following: a telephoto zoom lens system as an imaging optical system having a variable magnification function such that an angle of view at a telephoto end is about 5° and a shake-proof function; an imaging optical device that outputs, as an electrical signal, a picture of a subject taken in with the zoom lens system and an imaging element; and a digital apparatus having an image input function, such as a digital camera, that incorporates such an imaging optical device.

2. Description of Related Art

In recent years, in the field of digital single-lens reflex cameras, especially in the field of mirrorless single-lens cameras, there have been increasing demands for reduction in size and weight of cameras including interchangeable lenses. However, in a zoom lens system whose angle of view at the telephoto end is about 5°, the total length of the zoom lens system tends to be increased. Furthermore, due to a long focal length with respect to an imaging surface diagonal length of an imaging element, such a zoom lens system also causes a large amount of image blur on the imaging surface when camera shake occurs, resulting in failed photography. There have been proposed zoom lens systems that correct image blur by moving part of the optical system in a direction perpendicular to an optical axis in, for example, Patent Literatures 1 and 2.

Patent Literature 1: Japanese Patent Application Publication No. 2001-117000

Patent Literature 2: Japanese Patent Application Publication No. 2003-295059

Telephoto zoom lens systems disclosed in Patent Literatures 1 and 2 listed above perform camera-shake correction by moving an entire third lens group. However, application of configurations disclosed in Patent Literatures 1 and 2 to a large imaging element is accompanied by increased size of a shake-proof mechanism and increased weight resulting from a large number of lens elements used in such configurations.

SUMMARY OF THE INVENTION

Embodiments of the invention have been made against this background, and may provide a high-performance zoom lens system that helps miniaturize an entire optical system of a telephoto zoom lens system whose angle of view at the telephoto end is about 5°, and that also includes a compact and light-weight shake-proof mechanism, an imaging optical device including the same, and a digital apparatus.

According to one aspect of the present invention, a zoom lens system that performs magnification variation by moving a plurality of lens groups along an optical axis to change a distance between the plurality of lens groups includes, in order from an object side, a first lens group having a positive optical power, a second lens group having a negative optical power, a third lens group having a positive optical power, and a fourth lens group. Here, during magnification variation from a wide angle end to a telephoto end, a distance between the first lens group and the second lens group is increased, a distance between the second lens group and the third lens group is reduced, and a distance between the third lens group and the fourth lens group is reduced. The third lens group includes, in order from the object side, a front lens group and a rear lens group which are separated from each other by a widest air gap on an optical axis in the third lens group. Camera-shake correction is performed by moving whole or part of the front lens group as a camera-shake correction lens group in a direction perpendicular to the optical axis. Conditional formula (1) below is satisfied:

$$-3.0 < fis/f3 < -0.9 \tag{1}$$

where f3 represents a focal length of the third lens group; and
fis represents a focal length of the camera-shake correction lens group.

According to another aspect of the present invention, a zoom lens system that performs magnification variation by moving a plurality of lens groups along an optical axis to change a distance between the plurality of lens groups includes, in order from an object side, a first lens group having a positive optical power, a second lens group having a negative optical power, a third lens group having a positive optical power, a fourth lens group, and a fifth lens group. Here, during magnification variation from a wide angle end to a telephoto end, a distance between the first lens group and the second lens group is increased, a distance between the second lens group and the third lens group is reduced, and a distance between the third lens group and the fourth lens group is reduced. The third lens group includes, in order from the object side, a front lens group and a rear lens group which are separated from each other by a widest air gap on an optical axis in the third lens group. Camera-shake correction is performed by moving whole or part of the front lens group as a camera-shake correction lens group in a direction perpendicular to the optical axis. Conditional formula (1) below is satisfied:

$$-3.0 < fis/f3 < -0.9 \tag{1}$$

where f3 represents the focal length of the third lens group; and
fis represents the focal length of the camera-shake correction lens group.

According to still another aspect of the present invention, an imaging optical device includes the zoom lens system configured as described above, and an imaging element that converts an optical image formed on a light receiving surface thereof into an electrical signal. Here, the zoom lens system is disposed such that an optical image of a subject is formed on the light receiving surface of the imaging element.

According to yet another aspect of the present invention, a digital apparatus includes the imaging optical device configured as described above. Here, the imaging optical device adds at least one of a subject still image shooting function and a subject moving image shooting function to the digital apparatus.

BRIEF DESCRIPTION OF THE DRAWINGS

FIGS. 7A to 7I are longitudinal aberration diagrams of Example 1 in accordance with one or more embodiments of the invention.

FIGS. 8A to 8I are longitudinal aberration diagrams of Example 2 in accordance with one or more embodiments of the invention.

FIGS. 9A to 9I are longitudinal aberration diagrams of Example 3 in accordance with one or more embodiments of the invention.

FIGS. 10A to 10I are longitudinal aberration diagrams of Example 4 in accordance with one or more embodiments of the invention.

FIGS. 11A to 11I are longitudinal aberration diagrams of Example 5 in accordance with one or more embodiments of the invention.

FIGS. 12A to 12I are longitudinal aberration diagrams of Example 6 in accordance with one or more embodiments of the invention.

FIGS. 14A to 14H are lateral aberration diagrams of Example 1 in a middle focal length state, before camera-shake correction in accordance with one or more embodiments of the invention.

FIGS. 16A to 16F are lateral aberration diagrams of Example 1 at the wide angle end, after camera-shake correction in accordance with one or more embodiments of the invention.

FIGS. 17A to 17F are lateral aberration diagrams of Example 1 in the middle focal length state after camera-shake correction in accordance with one or more embodiments of the invention.

FIGS. 18A to 18F are lateral aberration diagrams of Example 1 at the telephoto end, after camera-shake correction in accordance with one or more embodiments of the invention.

FIGS. 21A to 21H are lateral aberration diagrams of Example 2 at the telephoto end, before camera-shake correction in accordance with one or more embodiments of the invention.

FIGS. 22A to 22F are lateral aberration diagrams of Example 2 at the wide angle end, after camera-shake correction in accordance with one or more embodiments of the invention.

FIGS. 23A to 23F are lateral aberration diagrams of Example 2 in the middle focal length state, after camera-shake correction in accordance with one or more embodiments of the invention.

FIGS. 24A to 24F are lateral aberration diagrams of Example 2 at the telephoto end, after camera-shake correction in accordance with one or more embodiments of the invention.

FIGS. 27A to 27H are lateral aberration diagrams of Example 3 at the telephoto end, before camera-shake correction in accordance with one or more embodiments of the invention.

FIGS. 28A to 28F are lateral aberration diagrams of Example 3 at the wide angle end, after camera-shake correction in accordance with one or more embodiments of the invention.

FIGS. 29A to 29F are lateral aberration diagrams of Example 3 in the middle focal length state, after camera-shake correction in accordance with one or more embodiments of the invention.

FIGS. 30A to 30F are lateral aberration diagrams of Example 3 at the telephoto end, after camera-shake correction in accordance with one or more embodiments of the invention.

FIGS. 34A to 34F are lateral aberration diagrams of Example 4 at the wide angle, after camera-shake correction in accordance with one or more embodiments of the invention.

FIGS. 35A to 35F are lateral aberration diagrams of Example 4 in the middle focal length state, after camera-shake correction in accordance with one or more embodiments of the invention.

FIGS. 36A to 36F are lateral aberration diagrams of Example 4 at the telephoto end, after camera-shake correction in accordance with one or more embodiments of the invention.

FIGS. 40A to 40F are lateral aberration diagrams of Example 5 at the wide angle end, after camera-shake correction in accordance with one or more embodiments of the invention.

FIGS. 41A to 41F are lateral aberration diagrams of Example 5 in the middle focal length state, after camera-shake correction in accordance with one or more embodiments of the invention.

FIGS. 42A to 42F are lateral aberration diagrams of Example 5 at the telephoto end, after camera-shake correction in accordance with one or more embodiments of the invention.

FIGS. 43A to 43H are lateral aberration diagrams of Example 6 at the wide angle end, before camera-shake correction in accordance with one or more embodiments of the invention.

FIGS. 45A to 45H are lateral aberration diagrams of Example 6 at the telephoto end, before camera-shake correction in accordance with one or more embodiments of the invention.

FIGS. 46A to 46F are lateral aberration diagrams of Example 6 at the wide angle end, after camera-shake correction in accordance with one or more embodiments of the invention.

FIGS. 47A to 47F are lateral aberration diagrams of Example 6 in the middle focal length state, after camera-shake correction in accordance with one or more embodiments of the invention.

DETAILED DESCRIPTION OF THE EMBODIMENTS

Figure 1:
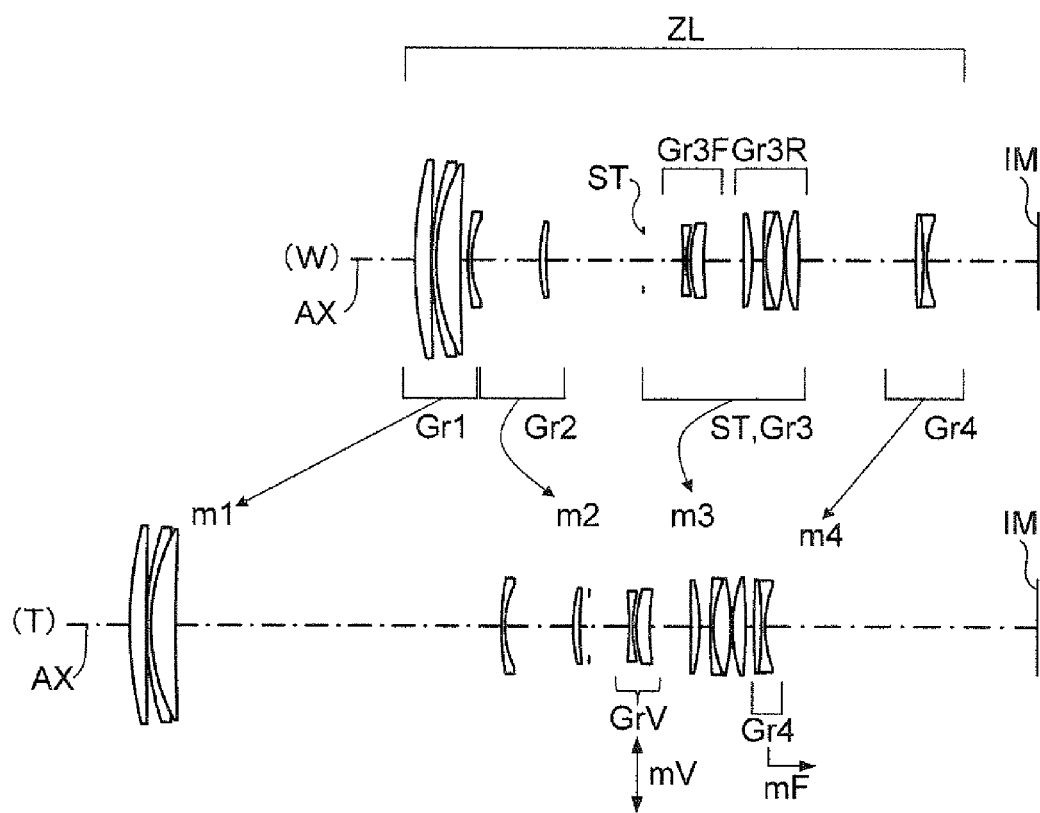
FIG. 1 is an optical configuration diagram in accordance with one or more embodiments of the invention (Example 1).

Hereinafter, descriptions will be given of a zoom lens system, an imaging optical device, and a digital apparatus according to embodiments of the invention. Zoom lens systems according to one or more embodiments of the invention are ones that achieve magnification variation by moving a plurality of lens groups along an optical axis to change a distance between the plurality of lens groups. A zoom lens system of a first zoom type includes, in order from an object side, a first lens group having a positive optical power, a second lens group having a negative optical power, a third lens group having a positive optical power, and a fourth lens group (optical power is defined as the reciprocal of a focal length). A zoom lens system of a second zoom type includes, in order from the object side, a first lens group having a positive optical power, a second lens group having a negative optical power, a third lens group having a positive optical power, a fourth lens group, and a fifth lens group.

These zoom types are both configured as follows: During magnification variation from a wide angle end to a telephoto end, a distance between the first lens group and the second lens group is increased, a distance between the second lens group and the third lens group is reduced, and a distance between the third lens group and the fourth lens group is reduced; the third lens group includes, in order from the object side, a front lens group and a rear lens group which are separated from each other by a widest air gap on the optical axis in the third lens group; camera-shake correction is performed by moving whole or part of the front lens group as a camera-shake correction lens group in a direction perpendicular to the optical axis; and conditional formula (1) below is satisfied:

$$-3.0 < fis/f3 < -0.9 \tag{1}$$

where f3 represents a focal length of the third lens group; and fis represents a focal length of the camera-shake correction lens group.

In the first and second zoom types, in order to achieve high optical performance and miniaturization of a telephoto zoom lens system, a positive-lead type configuration is adopted. Furthermore, with an optical power arrangement where the second lens group has a negative optical power and the third lens group has a positive optical power, the optical power arrangement at the wide angle end becomes a retro-focus type optical power arrangement, and this helps secure an adequate lens back, while, at the telephoto end, the distance between the second lens group and the third lens group is reduced to thereby reduce retro-focus type optical power, and this helps achieve a compact total length of the zoom lens system. Moreover, with camera-shake correction performed by moving whole or part of the front lens group of the third lens group in a direction perpendicular to the optical axis, a compact and light-weight shake-proof mechanism is achieved.

Conditional formula (1) is one for appropriately setting the focal length of the camera-shake correction lens group to thereby achieve miniaturization and high correction accuracy of the camera-shake correction mechanism. When the value of fis/f3 is below the lower limit of conditional formula (1), the optical power of the camera-shake correction lens group becomes so weak that the camera-shake correction lens group needs to move by a large amount to correct image blur on an imaging surface, and this invites increase in size of the camera-shake correction mechanism. On the other hand, when the value of fis/f3 is above the upper limit of conditional formula (1), the optical power of the camera-shake correction lens group becomes so strong that the degree of sensitiveness of the image shift on the imaging surface with respect to the movement of the camera-shake correction lens group is caused to be too high, and this invites degraded correction accuracy. Further, variations in aberration such as coma aberration and lateral chromatic aberration at the time of camera-shake correction may also be caused to increase. In one or more embodiments, by satisfying conditional formula (1), miniaturization and high correction accuracy and performance of the camera-shake correction mechanism can be achieved in a balanced manner.

According to the above characteristic configurations, even with a telephoto zoom lens system whose angle of view (2ω) at the telephoto end is about 5°, it is possible not only to achieve a high-performance zoom lens system and an imaging optical device having a compact and light weight shake-proof mechanism and an imaging optical device, but also to achieve miniaturization of the entire optical system. When such a compact zoom lens system or an imaging optical device having the shake-proof mechanism is incorporated in a digital apparatus such as a digital camera, it is possible to equip the digital apparatus with a high-performance image input function in a compact manner. This contributes to higher compactness, lower cost, higher performance, higher specifications, etc. of the digital apparatus. For example, the zoom lens system according to one or more embodiments of the invention is suitable as an interchangeable lens system for mirrorless interchangeable-lens system digital cameras, and thus contributes to achieving a light-weight and compact portable interchangeable lens system. Now, descriptions will be given below of conditions, etc. required to obtain these advantages in a balanced manner, and to also obtain still higher optical performance, miniaturization, etc.

One or more embodiments of the invention satisfy conditional formula (1a) below:

$$-2.4 < fis/f3 < -1.1 \quad (1a)$$

Conditional formula (1a) described above specifies, in the range of the conditions specified by conditional formula (1) described further above, a range of conditions based on the above-described viewpoints, etc. In one or more embodiments, satisfying conditional formula (1a) makes it possible to further enhance the above-described advantages.

In the above-mentioned third lens group, the front lens group may have a negative optical power, the rear lens group have a positive optical power, and conditional formulas (2) below be satisfied:

$$0.15 < d3/y'\text{max} < 1.1 \quad (2)$$

where
d3 represents a distance between the front lens group and the rear lens group; and
y'max represents a diagonal image height.

The adoption of the negative-positive retro-focus type optical power arrangement in the third lens group makes it possible to secure an adequate lens back at the wide angle end in a zoom lens system of high variable magnification ratio. Then, appropriate setting of the distance in the negative-positive optical power arrangement makes it possible to achieve both high aberration performance and reduction in entire length of the zoom lens system. Conditional formula (2) is one for appropriately setting the distance d3 between the front and rear lens groups in the third lens group, in an imaging optical system for forming an optical image of a subject on an imaging surface whose diagonal length is 2y'max. When the value of d3/y'max is below the lower limit of conditional formula (2), the front and rear lens groups each need to have an increased optical power to secure an adequate lens back at the wide angle end, and this gives rise to a tendency for high-order spherical aberration or coma aberration to be generated. On the other hand, when the value of d3/y'max is above the upper limit of conditional formula (2), the entire third lens group becomes too thick, which causes the entire length of the imaging optical system to increase, too. Furthermore, a diameter of the rear lens group in the third lens group also becomes large, causing increase in size and weight of an entire lens barrel. Hence, by satisfying a conditional formula (2), improved optical performance and miniaturization can both be achieved in a balanced manner.

One or more embodiments of the invention satisfy conditional formula (2a) below:

$$0.18 < d3/y'\text{max} < 1.0 \quad (2a)$$

Conditional formula (2a) described above specifies, in the range of the conditions specified by conditional formula (2) described further above, a range of conditions based on the above-described viewpoints, etc. In one or more embodiments, satisfying conditional formula (2a) makes it possible to further enhance the above-described advantages.

In one or more embodiments of the invention the third lens group includes at least one aspherical surface. By disposing at least one aspherical surface in the third lens group including the camera-shake correction lens group, it is possible to satisfactorily correct eccentric aberration generated during camera-shake correction from the wide angle end to the telephoto end. Further, by disposing an aspherical surface on a lens element directly behind the camera-shake correction lens group, it is possible to further enhance the above-described advantages.

In one or more embodiments of the invention the camera-shake correction lens group includes at least a positive lens element and a negative lens element. When the camera-shake correction lens group includes at least a positive lens element and a negative lens element, it is possible to reduce lateral chromatic aberration generated during camera-shake correction.

In one or more embodiments of the invention an aperture stop, which moves with the third lens group during magnification variation, is disposed between the second lens group and the third lens group, and in some embodiments the front lens group in the third lens group include, in order from the object side, the camera-shake correction lens group and a positive lens element. By the disposition of the camera-shake correction lens group immediately behind the aperture stop makes it possible to reduce the diameter of the camera-shake correction lens group, and thus to achieve reduction in size and weight of the camera-shake correction mechanism. Furthermore, the disposition of a positive lens element behind the camera-shake correction lens group, which is a negative lens group, makes it possible to correct chromatic aberration in the front lens group of the third lens group, and thus to reduce chromatic aberration even when a beam incidence height or an incidence angle changes during magnification variation. Furthermore, light convergence effect exerted by the positive lens element helps to prevent increase in diameter of the rear lens group of the third lens group, and thus to achieve reduction in weight.

One or more embodiments of the invention satisfy conditional formula (3) below:

$$-1.2 < f2/f1 < -0.2 \quad (3)$$

where
f1 represents a focal length of the first lens group; and
f2 represents a focal length of the second lens group.

Conditional formula (3) is one for appropriately setting the focal lengths of the first and second lens groups. When the value of f2/f1 is below the lower limit of conditional formula (3), the second group has an insufficient negative optical power, which causes increase in Petzval sum, and thus makes it difficult to correct image plane properties. On the other hand, when the value of f2/f1 is above the upper limit of conditional formula (3), the optical power of the first lens group becomes too weak, which causes reduction in telephoto power and thus makes it difficult to reduce the entire length of the imaging optical system. In one or more embodiments, by satisfying conditional formula (3), improved optical performance and miniaturization can both be achieved in a balanced manner.

One or more embodiments of the invention satisfy the following conditional formulas (3a):

$$-1 < f2/f1 < -0.3 \tag{3a}$$

Conditional formula (3a) described above specifies, in the range of the conditions specified by conditional formula (3) described further above, a range of conditions based on the above-described viewpoints, etc. In one or more embodiments, satisfying conditional formula (3a) makes it possible to further enhance the above-described advantages.

One or more embodiments of the invention satisfy conditional formula (4) below:

$$0.2 < f3/f1 < 0.29 \tag{4}$$

where
f1 represents the focal length of the first lens group; and
f3 represents the focal length of the third lens group.

Conditional formula (4) is one for appropriately setting the focal lengths of the first and third lens groups. When the value of f3/f1 is below the lower limit of conditional formula (4), the third lens group has a too strong optical power, and this gives rise to a tendency for high-order spherical aberration or coma aberration to be generated in the third lens group. In addition, the optical power of the first lens group becomes too weak, which causes reduction in telephoto optical power and thus makes it difficult to reduce the entire length of the imaging optical system. On the other hand, when the value of f3/f1 is above the upper limit of conditional formula (4), the first lens group has a too strong optical power, and this gives rise to a tendency for high-order spherical aberration or coma aberration to be generated in the first lens group. In one or more embodiments, by satisfying conditional formula (4), improved optical performance and miniaturization can both be achieved in a balanced manner.

One or more embodiments of the invention satisfy conditional formula (4a) below:

$$0.22 < f3/f1 < 0.28 \tag{4a}$$

Conditional formula (4a) described above specifies, in the range of the conditions specified by conditional formula (4) described further above, a range of conditions based on the above-described viewpoints, etc. In one or more embodiments, satisfying conditional formula (4a) makes it possible to further enhance the above-described advantages.

During focusing from an infinity object to a close-distance object, the fourth lens group may move along the optical axis. For example, in one or more embodiments, during focusing from an infinity object to a close-distance object, the fourth lens group may be moved to the image plane side along the optical axis. By using the fourth lens group as a focus lens group in this manner, a lighter-weight and more compact focusing lens group can be achieved with ease. This makes it possible to achieve high-speed focusing and miniaturization of an entire lens barrel.

In one or more embodiments of the invention, the fourth lens group may include at least a positive lens element and a negative lens element. When the fourth lens group includes a positive lens element and a negative lens element, it is possible to reduce variations of longitudinal chromatic aberration and lateral chromatic aberration generated during magnification variation, and further, to reduce variations of longitudinal chromatic aberration and lateral chromatic aberration generated during shifting of focus to an object in proximity.

In one or more embodiments of the invention the fourth lens group as a whole may have a negative optical power. When the fourth lens group is given a negative optical power, the optical power arrangement from the first to fourth lens groups becomes a positive-negative-positive-negative double-telephoto type optical power arrangement. This is further advantageous for reduction of the entire length of the imaging optical system. Moreover, when the fourth lens group has a negative optical power, off-axial beams are swung up, and this makes it possible to reduce diameter of lens elements of the third lens group with respect to an imaging element. This is advantageous for miniaturization of the present configuration where the camera-shake correction lens group is provided in the third lens group.

The zoom lens system according to one or more embodiments of the invention is suitably used as an imaging lens system for a digital apparatus (for example, a lens interchangeable digital camera) equipped with an image input function. By combining the zoom lens system with an imaging element, etc., it is possible to achieve an imaging optical device that optically takes in an image of a subject and outputs an electrical signal. The imaging optical device constitutes a main component of a camera used for shooting a still image or a moving image of a subject. For example, the imaging optical device is configured by including, in order from the object side (that is, the subject side), a zoom lens system that forms an optical image of the object and an imaging element that converts the optical image formed by the zoom lens system into an electrical signal. By disposing the zoom lens system having the characteristic configurations as described above such that an optical image of the subject is formed on a light receiving surface (that is, an imaging surface) of the imaging element, it is possible to achieve a compact, low-cost, high-performance imaging optical device, and a digital apparatus including the same.

Examples of the digital apparatus having the image input function include cameras such as a digital camera, a video camera, a monitoring camera, a security camera, a vehicle-mounted camera, and a TV telephone camera. The examples also include such ones of the following as have a camera function incorporated or externally provided: a personal computer, a portable digital apparatus (for example, a mobile phone, a smart phone (high-performance mobile phone), a tablet terminal, and a mobile computer), their peripheral devices (such as a scanner, a printer, and a mouse), and other digital apparatuses (such as a drive recorder and national defense equipment). As is clear from these examples, it is possible not only to constitute a camera by using an imaging optical device, but also to equip various types of apparatuses with a camera function by mounting an imaging optical device therein. For example, it is possible to constitute a digital apparatus having an image input function, such as a camera-equipped mobile phone.

Figure 49:
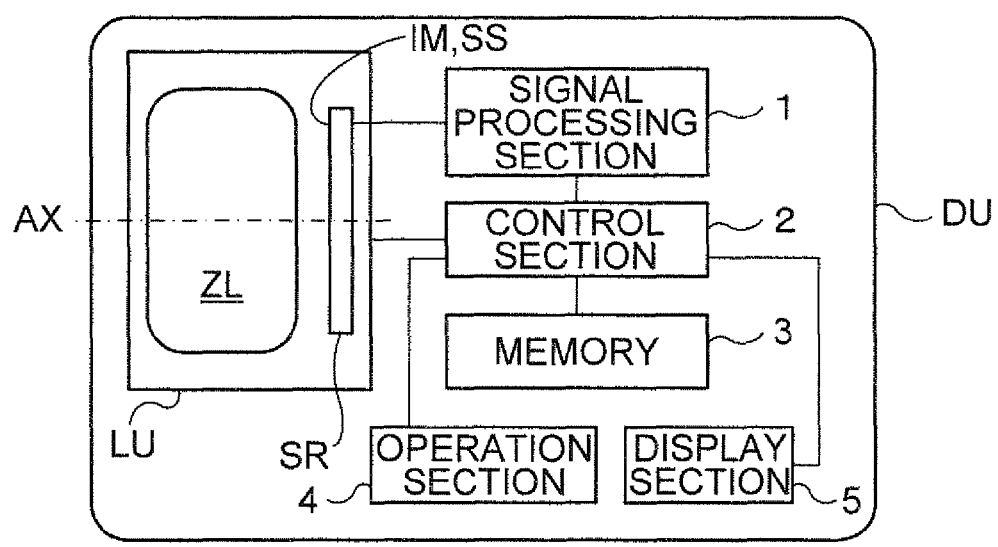
FIG. 49 is a schematic diagram showing in outline a configuration example of a digital apparatus incorporating a zoom lens system in accordance with one or more embodiments of the invention.

FIG. 49 is a schematic sectional view showing in outline a configuration example of a digital apparatus DU as an example of the digital apparatus having the image input function. An imaging optical device LU incorporated in the digital apparatus DU shown in FIG. 49 includes, in order from the object side (that is, the subject side), a zoom lens system ZL (with AX representing the optical axis) that forms an optical image (image plane) IM of an object in a magnification-variable fashion, and an imaging element SR that converts the optical image IM formed by the zoom lens system ZL on a light receiving surface (imaging surface) SS into an electrical signal. A parallel flat plate PT is also provided as necessary (a cover glass of the imaging element SR, for example, which corresponds to an optical filter such as an optical low-pass filter or an infrared cut filter disposed as necessary). When the digital apparatus DU having the image input function is constituted with the imaging optical device LU, though the imaging optical device LU is generally disposed within a body of the digital apparatus DU, it is possible to adopt a suitable design as required to achieve a camera function. For example, the imaging optical device LU formed as a unit can be removably or rotatably provided in a main body of the digital apparatus DU.

The zoom lens system ZL is a four-lens-group or five-lens-group zoom lens system that includes, in order from the object side, positive, negative, and positive lens groups and that performs magnification variation (that is, zooming) from the wide angle end to the telephoto end by changing a distance between the lens groups. The zoom lens system ZL is configured such that an optical image IM is faulted on the light receiving surface SS of the imaging element SR, and such that the distance between the first and second lens groups is increased, the distance between the second third lens groups is reduced, and the distance between the third and fourth lens groups is reduced during magnification variation from the wide angle end to the telephoto end. The third lens group includes, in order from the object side, a front lens group and a rear lens group that are separated from each other by a widest air gap on the optical axis within the third lens group. Camera-shake correction is performed by moving whole or part of the front lens group as a camera-shake correction lens group in a direction perpendicular to the optical axis AX.

Used as the imaging element SR is, for example, a solid-state imaging element having a plurality of pixels such as a CCD (Charge Coupled Device) image sensor or a CMOS (Complementary Metal-Oxide Semiconductor) image sensor. Since the zoom lens system ZL is disposed such that the optical image IM of the subject is formed on the light receiving surface SS that is a photoelectric conversion section of the imaging element SR, the optical image IM formed by the zoom lens system ZL is converted into an electrical signal by the imaging element SR.

The digital apparatus DU includes, in addition to the imaging optical device LU, a signal processing section 1, a control section 2, a memory 3, an operation section 4, a display section 5, etc. The signal generated in the imaging element SR is subjected to predetermined digital image processing, image compression processing, etc., as necessary, in the signal processing section 1, and then, the signal is recorded as a digital image signal in the memory 3 (a semiconductor memory, an optical disc, etc.), or may be transmitted to another apparatus via a cable or by being converted into an infrared signal or the like (as in the communication function of a cell phone, for example). The control section 2 is formed with a microcomputer, and intensively performs, for example, control of functions such as shooting functions (including a still image shooting function and a moving image shooting function) and an image reproduction function, and control of lens movement mechanisms for zooming, focusing and camera-shake correction, etc. For example, the control section 2 controls the imaging optical device LU such that at least one of subject still image shooting and subject moving image shooting is performed. The display section 5 includes a display such as a liquid crystal monitor, and it displays an image based on the image signal converted by the imaging element SR or the image information recorded in the memory 3. The operation section 4 is a section that includes operation members such as an operation button (for example, a release button) and an operation dial (for example, a shooting mode dial), and it transmits information input by an operator to the control section 2.

Here, further detailed descriptions will be given of specific optical configurations of the zoom lens system ZL dealing with first to sixth embodiments. FIG. 1 to FIG. 6 are optical configuration diagrams respectively corresponding to the zoom lens systems ZL of the first to sixth embodiments. They are optical sectional views showing lens arrangements, lens shapes, etc. at the wide angle end (W) and the telephoto end (T). In each of those of the optical configuration diagrams showing the first zoom type, arrows m1, m2, m3, and m4 respectively indicate, in a schematic manner, movements of a first lens group Gr1, a second lens group Gr2, a third lens group Gr3, and a fourth lens group Gr4 during zooming from the wide angle end (W) to the telephoto end (T). In each of those of the optical configuration diagrams showing the second zoom type, arrows m1, m2, m3, m4, and m5 respectively indicate, in a schematic manner, movements of a first lens group Gr1, a second lens group Gr2, a third lens group Gr3, a fourth lens group Gr4, and a fifth lens group Gr5 during zooming from the wide angle end (W) to the telephoto end (T).

As is clear from the optical configuration diagrams, the zoom lens systems ZL of the first to sixth embodiments are configured to perform magnification variation (that is, zooming) from the wide angle end (W) to the telephoto end (T) by changing all the distances between the lens groups on the axis, such that, during magnification variation, all the lens groups each move relatively with respect to the image plane IM. A stop (aperture stop) ST is located on the object side of the third lens group Gr3 (that is, between the second lens group Gr2 and the third lens group Gr3), and is moved together with the third lens group Gr3 during magnification variation. During magnification variation from the wide angle end (W) to the telephoto end (T), the distance between the first lens group Gr1 and the second lens group Gr2 is increased, the distance between the second lens group Gr2 and the third lens group Gr3 is reduced, and the distance between the third lens group Gr3 and the fourth lens group Gr4 is reduced.

During focusing, the fourth lens group Gr4 moves along the optical axis AX. That is, the fourth lens group Gr4 is a focusing lens group, and as indicated by arrow mF, it moves toward the image plane IM side during focusing from infinite to a close-distance object. During camera-shake correction, a camera-shake correction lens group GrV moves in a direction perpendicular to the optical axis AX. That is, the camera-shake correction lens group GrV, which is whole or part of the front lens group Gr3F of the third lens group Gr3, moves perpendicularly with respect to the optical axis AX as indicated by arrow mV, and thereby, camera-shake correction is performed.

In one or more embodiments described by FIG. 1, in the zoom lens system ZL having a four-group design with a positive-negative-positive-negative arrangement, the lens groups are configured as follows in order from the object side, as seen in paraxial surface shape. The first lens group Gr1 is composed of a positive meniscus lens element convex to the object side, and a cemented lens element composed of a negative meniscus lens element concave to the image side and a positive meniscus lens element convex to the object side. The second lens group Gr2 is composed of a negative meniscus lens element concave to the image side, and a positive meniscus lens element convex to the object side.

The third lens group Gr3 is composed of the front lens group Gr3F having a negative optical power and the rear lens group Gr3R having a positive optical power, and the stop ST is disposed between the second lens group Gr2 and the third lens group Gr3. The front lens group Gr3F is the camera-shake correction lens group GrV, and is composed of a biconcave negative lens element and a positive meniscus lens element convex to the object side. The rear lens group Gr3R is composed of a positive meniscus lens element convex to the image side, a cemented lens element composed of a negative meniscus lens element concave to the image side and a biconvex positive lens element, and a biconvex positive lens element. The fourth lens group Gr4 is composed of one cemented lens element composed of a biconvex positive lens element and a biconcave negative lens element.

Figure 2:
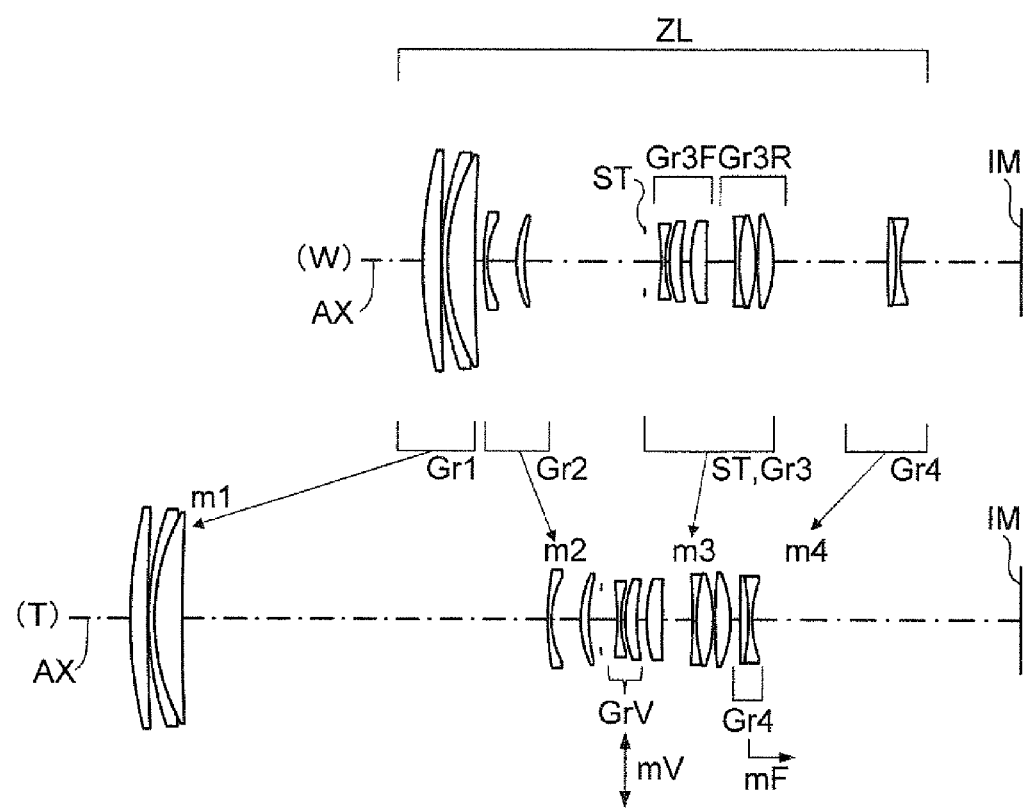
FIG. 2 is an optical configuration diagram in accordance with one or more embodiments of the invention (Example 2).

In one or more embodiments described by FIG. 2, in the zoom lens system ZL having a four-group design with a positive-negative-positive-negative arrangement, the lens groups are configured as follows in order from the object side, as seen in paraxial surface shape. The first lens group Gr1 is composed of a positive meniscus lens element convex to the object side, and a cemented lens element composed of a negative meniscus lens element concave to the image side and a positive meniscus lens element convex to the object side. The second lens group Gr2 is composed of a negative meniscus lens element concave to the image side and a positive meniscus lens element convex to the object side. The third lens group Gr3 is composed of the front lens group Gr3F having a negative optical power and the rear lens group Gr3R having a positive optical power, and the stop ST is disposed between the second lens group Gr2 and the third lens group Gr3. The front lens group Gr3F is composed of the camera-shake correction lens group GrV that is composed of a biconcave negative lens element and a positive meniscus lens element convex to the object side, and a biconvex positive lens element (having aspherical surfaces on both sides). The rear lens group Gr3R is composed of a cemented lens element composed of a biconcave negative lens element and a biconvex positive lens element, and a biconvex positive lens element. The fourth lens group Gr4 is composed of one cemented lens element composed of a biconvex positive lens element and a biconcave negative lens element.

Figure 3:
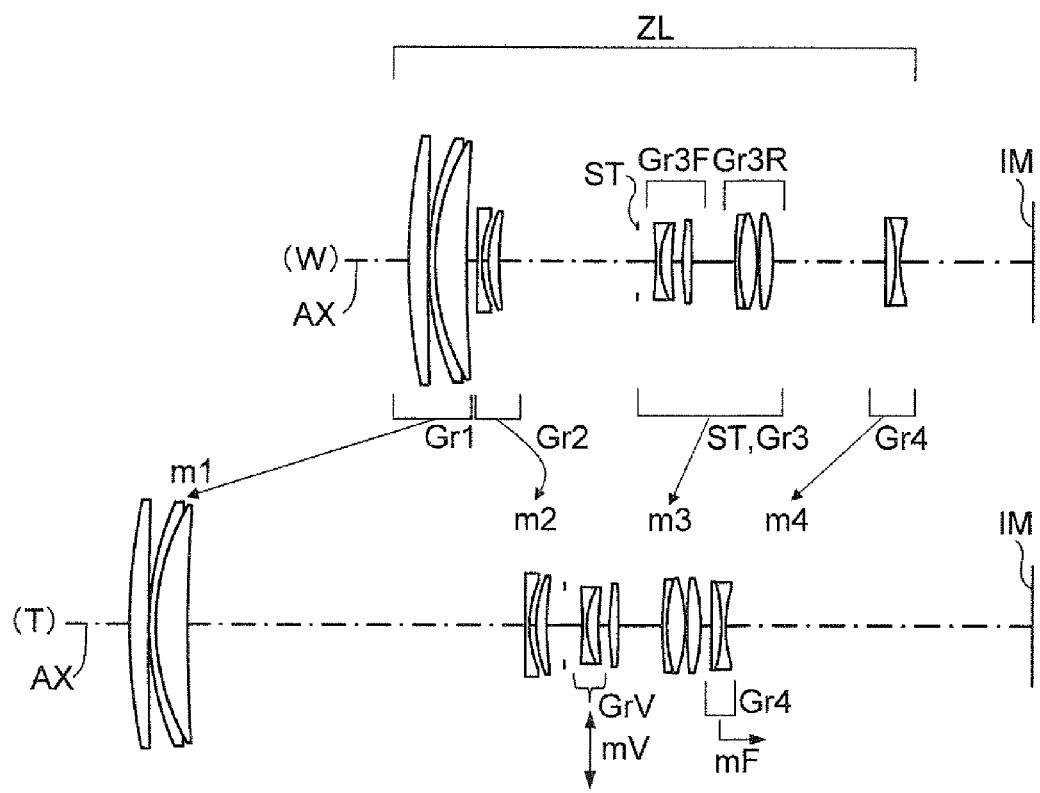
FIG. 3 is an optical configuration diagram in accordance with one or more embodiments of the invention (Example 3).

In one or more embodiments described by FIG. 3, in the zoom lens system ZL having a four-group design with a positive-negative-positive-negative arrangement, the lens groups are configured as follows in order from the object side, as seen in paraxial surface shape. The first lens group Gr1 is composed of a positive meniscus lens element convex to the object side, and a cemented lens element composed of a negative meniscus lens element concave to the image side and a positive meniscus lens element convex to the object side. The second lens group Gr2 is composed of a biconcave negative lens element and a positive meniscus lens element convex to the object side. The third lens group Gr3 is composed of the front lens group Gr3F having a negative optical power and the rear lens group Gr3R having a positive optical power, and the stop ST is disposed between the second lens group Gr2 and the third lens group Gr3. The front lens group Gr3F is composed of a cemented lens element (camera-shake correction lens group GrV) composed of a biconcave negative lens element and a positive meniscus lens element convex to the object side, and a biconvex positive lens element (having aspherical surfaces on both sides). The rear lens group Gr3R is composed of a cemented lens element composed of a negative meniscus lens element concave to the image side and a biconvex positive lens element, and a biconvex positive lens element. The fourth lens group Gr4 is composed of one cemented lens element composed of a positive meniscus lens element convex to the image side and a biconcave negative lens element.

Figure 4:
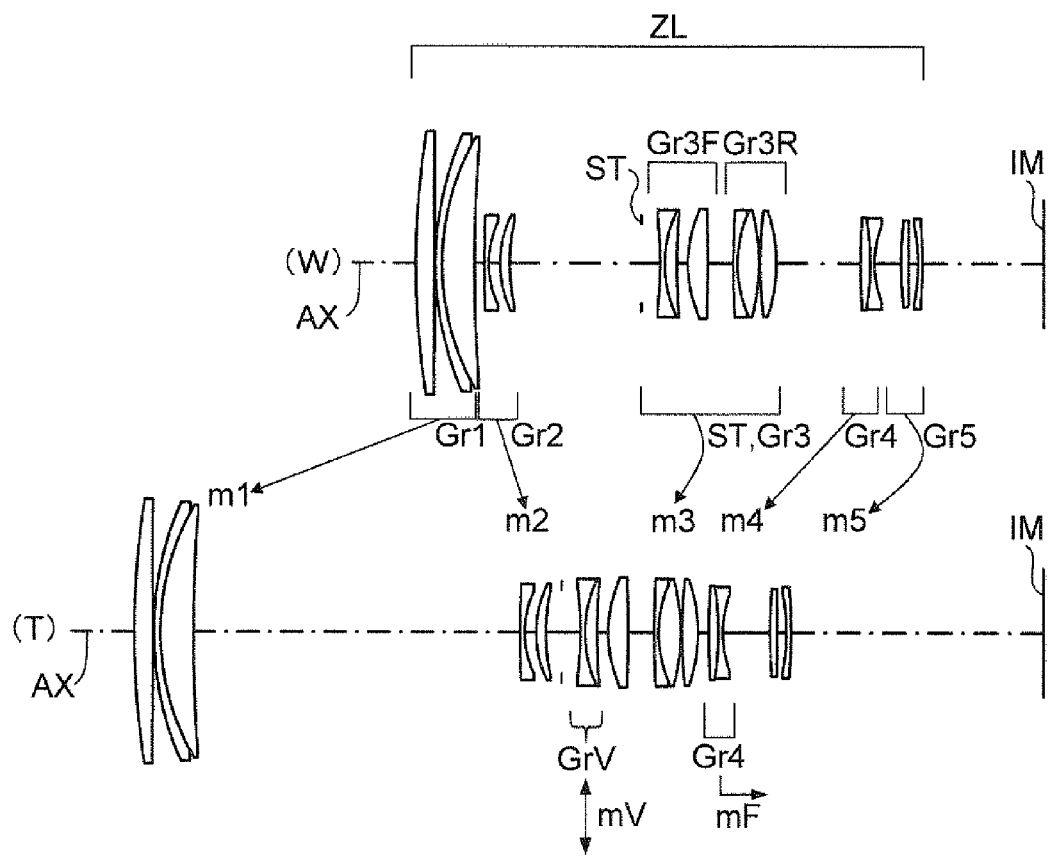
FIG. 4 is an optical configuration diagram in accordance with one or more embodiments of the invention (Example 4).

In one or more embodiments described by FIG. 4, in the zoom lens system ZL having a five-group design with a positive-negative-positive-negative-negative arrangement, the lens groups are configured as follows in order from the object side, as seen in paraxial surface shape. The first lens group Gr1 is composed of a biconvex positive lens element, and a cemented lens element composed of a negative meniscus lens element concave to the image side and a positive meniscus lens element convex to the object side. The second lens group Gr2 is composed of a negative meniscus lens element concave to the image side and a positive meniscus lens element convex to the object side. The third lens group GT3 is composed of the front lens group Gr3F having a negative optical power and the rear lens group Gr3R having a positive optical power, and the stop ST is disposed between the second lens group Gr2 and third lens group Gr3. The front lens group Gr3F is composed of a cemented lens element (camera-shake correction lens group GrV) composed of a biconcave negative lens element and a positive meniscus lens element convex to the object side, and a biconvex positive lens element (having aspherical surfaces on both sides). The rear lens group Gr3R is composed of a cemented lens element composed of a negative meniscus lens element concave to the image side and a biconvex positive lens element, and a biconvex positive lens element. The fourth lens group Gr4 is composed of one cemented lens element composed of a biconvex positive lens element and a biconcave negative lens element. The fifth lens group Gr5 is composed of a biconvex positive lens element (having aspherical surfaces on both sides) and a negative meniscus lens element concave to the object side.

Figure 5:
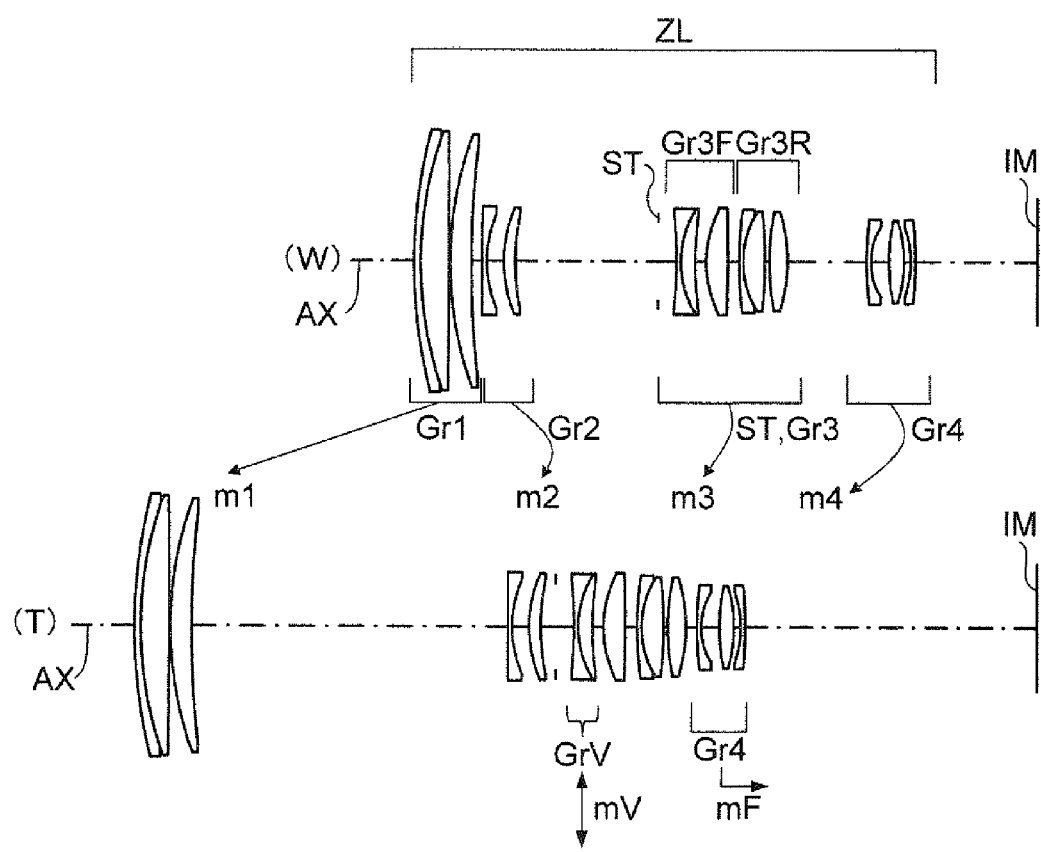
FIG. 5 is an optical configuration diagram in accordance with one or more embodiments of the invention (Example 5).

In one or more embodiments described by FIG. 5, in the zoom lens system ZL having a four-group design with a positive-negative-positive-negative arrangement, the lens groups are configured as follows in order from the object side, as seen in paraxial surface shape. The first lens group Gr1 is composed of a cemented lens element composed of a negative meniscus lens element concave to the image side and a biconvex positive lens element, and a positive meniscus lens element convex to the object side. The second lens group Gr2 is composed of a negative meniscus lens element concave to the image side and a positive meniscus lens element convex to the object side. The third lens group Gr3 is composed of the front lens group Gr3F having a negative optical power and the rear lens group Gr3R having a positive optical power, and the stop ST is disposed between the second lens group Gr2 and third lens group Gr3. The front lens group Gr3F is composed of a cemented lens element (camera-shake correction lens group GrV) composed of a biconcave negative lens element and a positive meniscus lens element convex to the object side, and a biconvex positive lens element (having aspherical surfaces on both sides). The rear lens group Gr3R is composed of a cemented lens element composed of a negative meniscus lens element concave to the image side and a biconvex positive lens element, and a biconvex positive lens element. The fourth lens group Gr4 is composed of a negative meniscus lens element concave to the image side, a biconvex positive lens element, and a negative meniscus lens element concave to the object side (having an aspherical surface on the image side).

Figure 6:
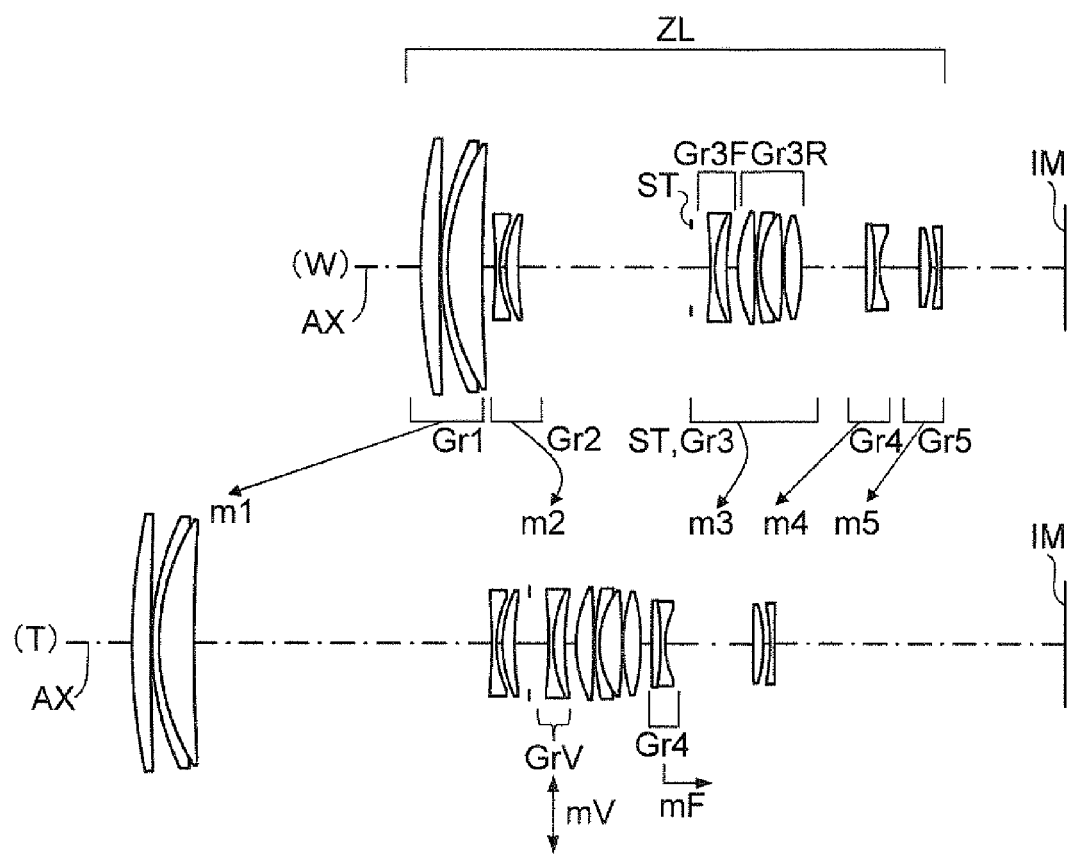
FIG. 6 is an optical configuration diagram in accordance with one or more embodiments of the invention (Example 6).
Figure 13A:
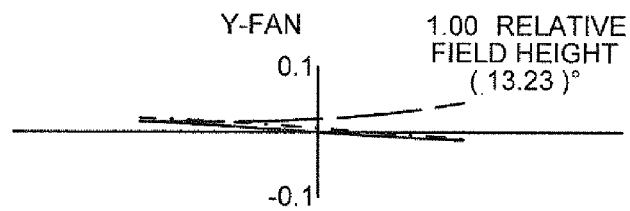
FIGS. 13A to 13H are lateral aberration diagrams of Example 1 at a wide angle end, before camera-shake correction in accordance with one or more embodiments of the invention.
Figure 13B:
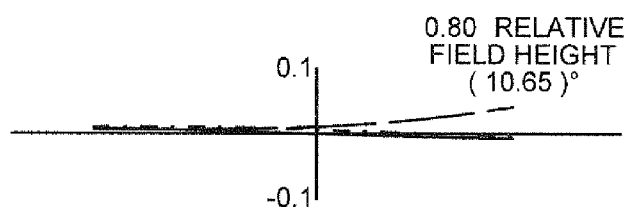
Figure 13C:
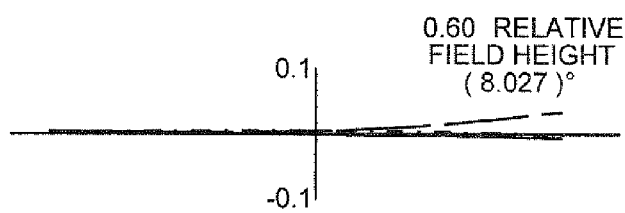
Figure 13D:
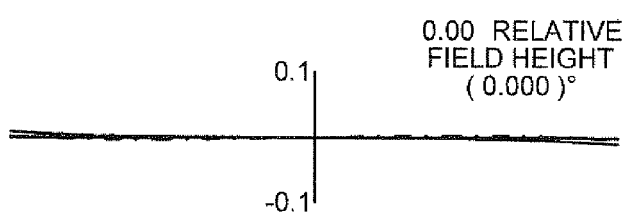
Figure 13E:
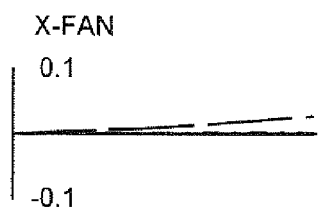
Figure 13F:
Figure 13G:
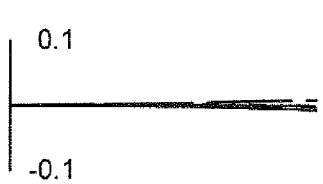
Figure 13H:
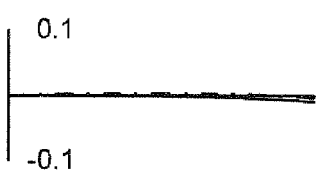
Figure 15A:
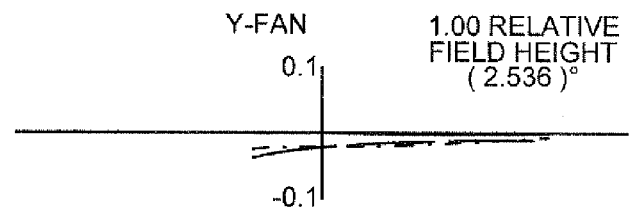
FIGS. 15A to 15H are lateral aberration diagrams of Example 1 at a telephoto end, before camera-shake correction in accordance with one or more embodiments of the invention.
Figure 15B:
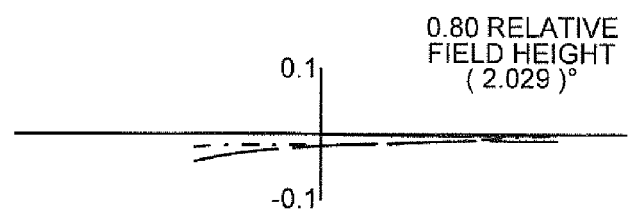
Figure 15C:
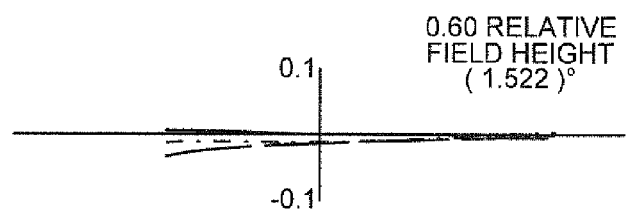
Figure 15D:
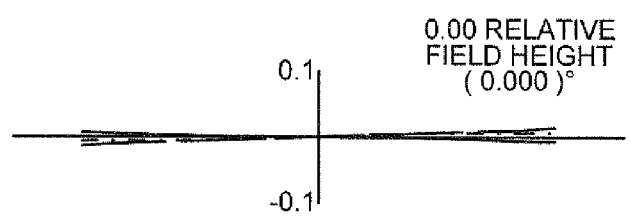
Figure 15E:
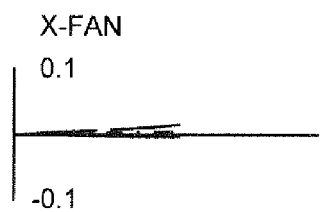
Figure 15F:
Figure 15G:
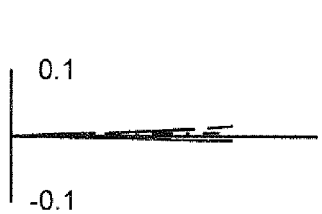
Figure 15H:
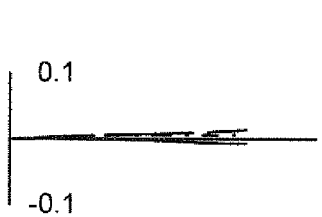
Figure 19A:
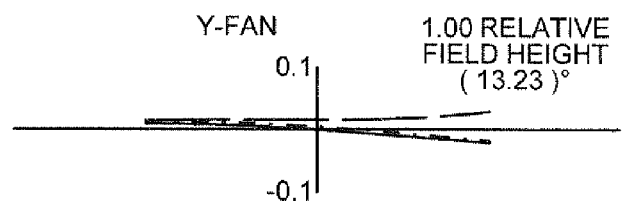
FIGS. 19A to 19H are lateral aberration diagrams of Example 2 at the wide angle end, before camera-shake correction in accordance with one or more embodiments of the invention.
Figure 19B:
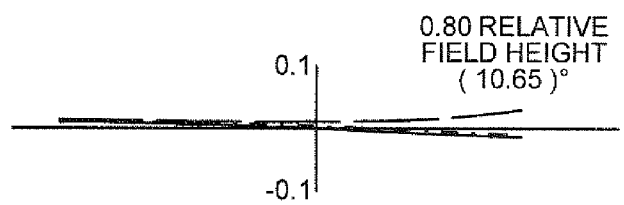
Figure 19C:
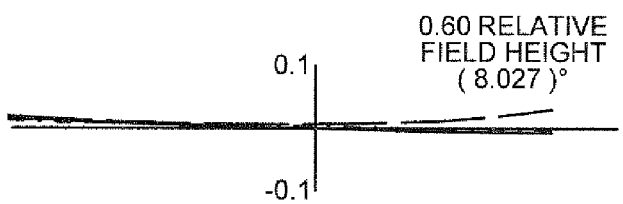
Figure 19D:
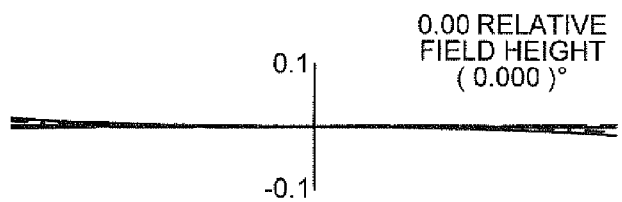
Figure 19E:
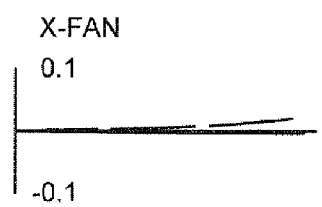
Figure 19F:
Figure 19G:
Figure 19H:
Figure 20A:
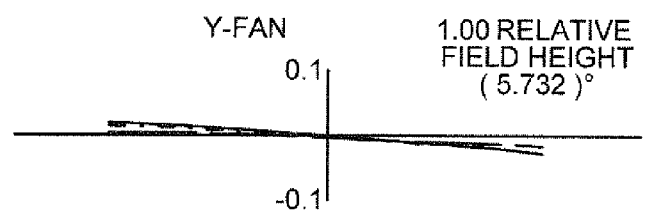
FIGS. 20A to 20H are lateral aberration diagrams of Example 2 in the middle focal length state, before camera-shake correction in accordance with one or more embodiments of the invention.
Figure 20E:
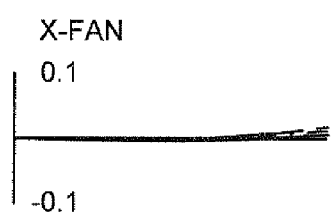
Figure 20B:
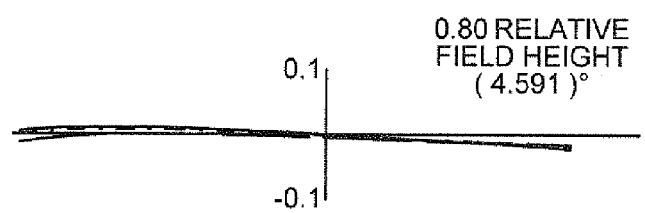
Figure 20F:
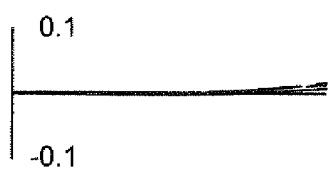
Figure 20C:
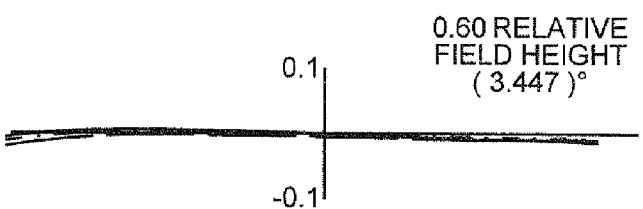
Figure 20G:
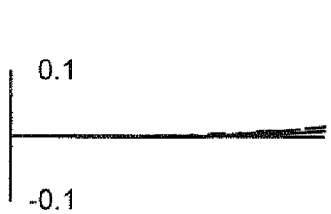
Figure 20D:
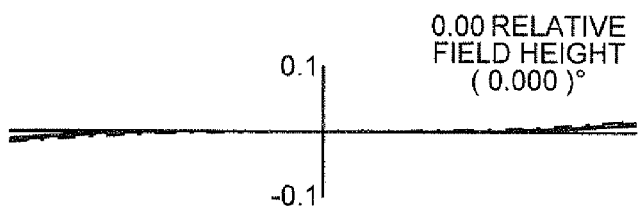
Figure 20H:
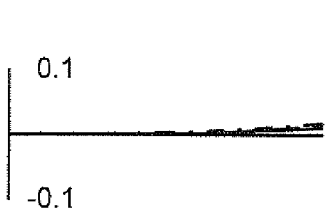
Figure 25A:
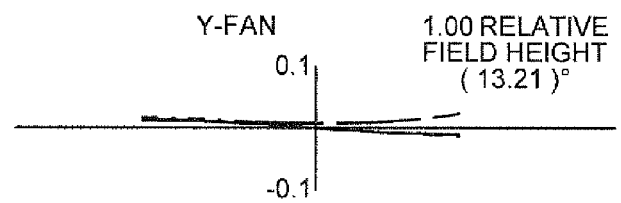
FIGS. 25A to 25H are lateral aberration diagrams of Example 3 at the wide angle end, before camera-shake correction in accordance with one or more embodiments of the invention.
Figure 25B:
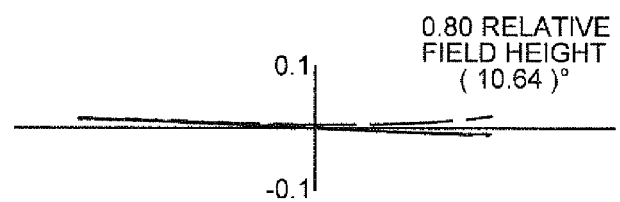
Figure 25C:
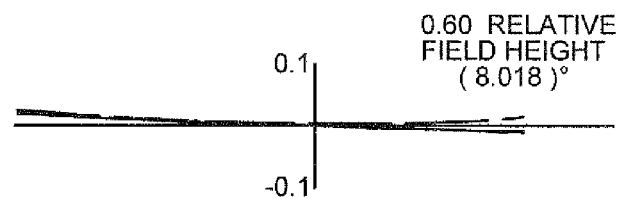
Figure 25D:
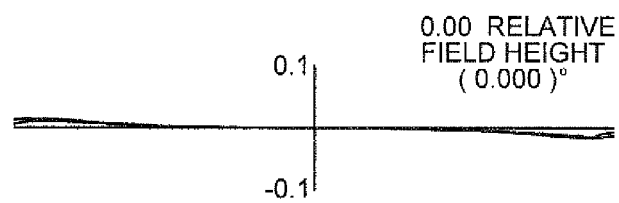
Figure 25E:
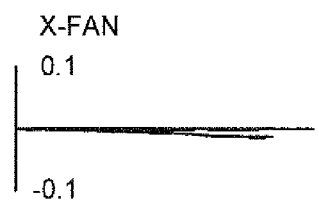
Figure 25F:
Figure 25G:
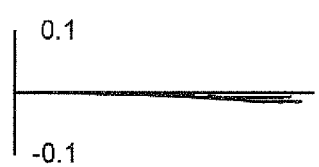
Figure 25H:
Figure 26A:
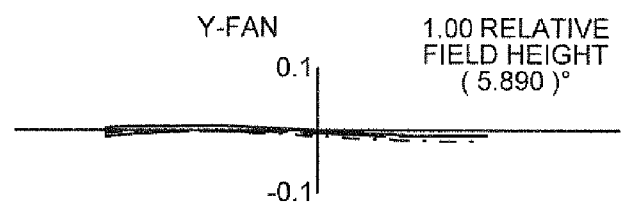
FIGS. 26A to 26H are lateral aberration diagrams of Example 3 in the middle focal length state, before camera-shake correction in accordance with one or more embodiments of the invention.
Figure 26B:
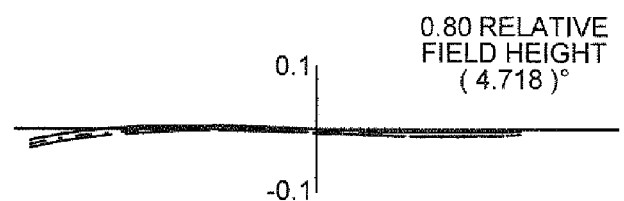
Figure 26C:
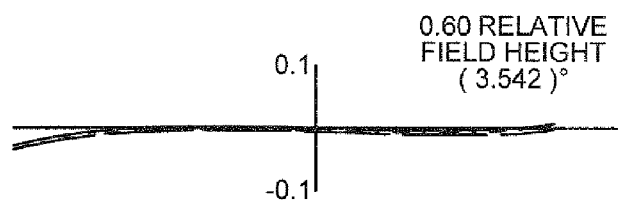
Figure 26D:
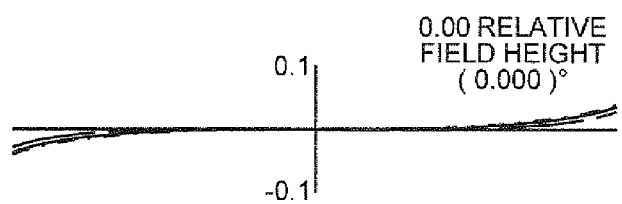
Figure 26E:
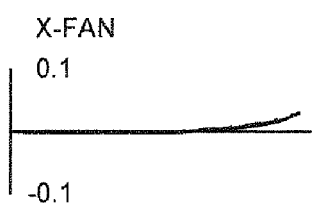
Figure 26F:
Figure 26G:
Figure 26H:
Figure 31A:
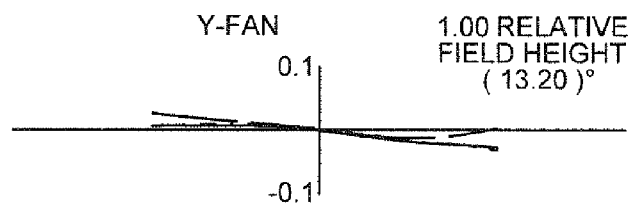
FIGS. 31A to 31H are lateral aberration diagrams of Example 4 at the wide angle end, before camera-shake correction in accordance with one or more embodiments of the invention.
Figure 31B:
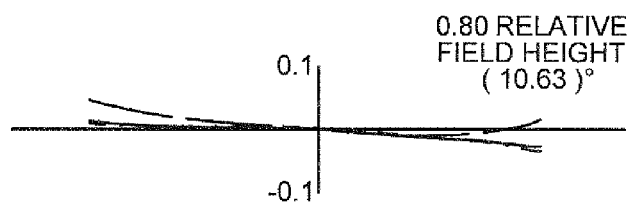
Figure 31C:
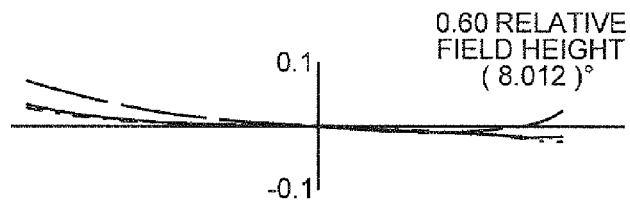
Figure 31D:
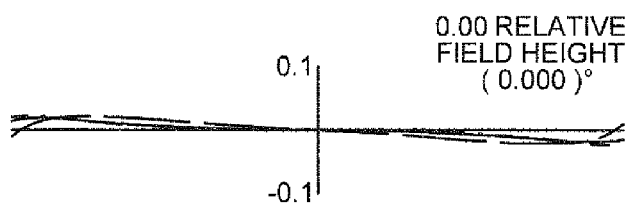
Figure 31E:
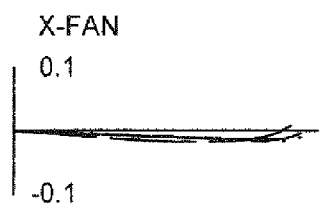
Figure 31F:
Figure 31G:
Figure 31H:
Figure 32A:
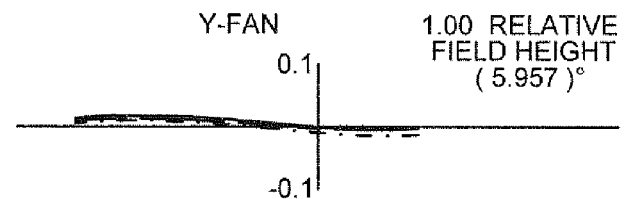
FIGS. 32A to 32H are lateral aberration diagrams of Example 4 in the middle focal length state, before camera-shake correction in accordance with one or more embodiments of the invention.
Figure 32B:
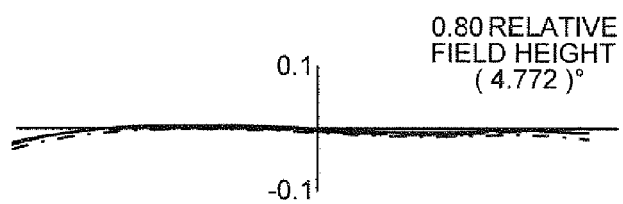
Figure 32C:
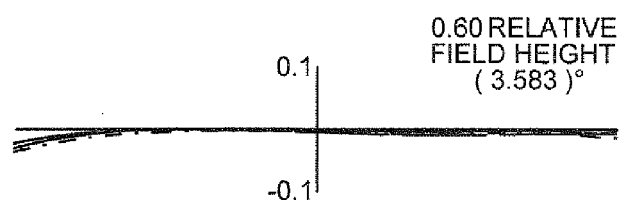
Figure 32D:
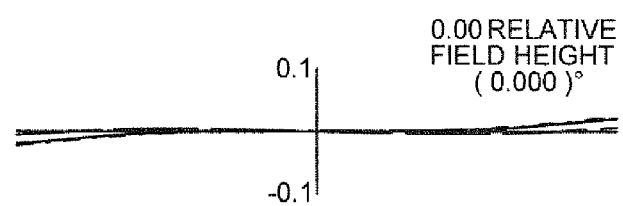
Figure 32E:
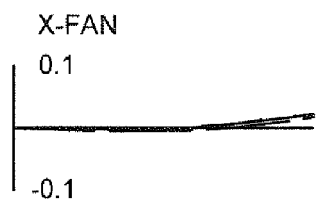
Figure 32F:
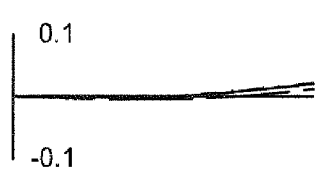
Figure 32G:
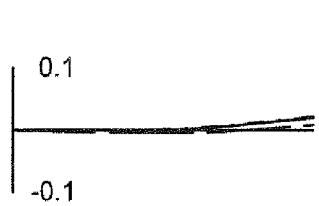
Figure 32H:
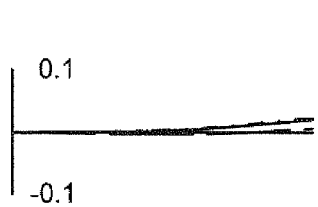
Figure 33A:
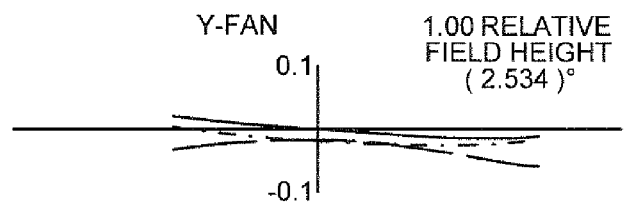
FIGS. 33A to 33H are lateral aberration diagrams of Example 4 at the telephoto end, before camera-shake correction in accordance with one or more embodiments of the invention.
Figure 33E:
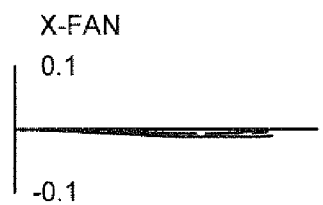
Figure 33B:
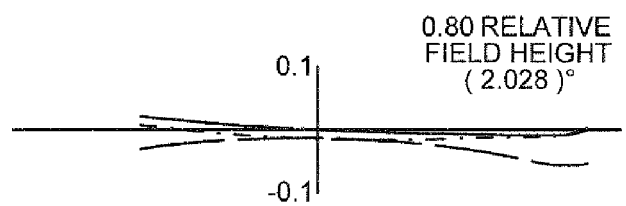
Figure 33F:
Figure 33C:
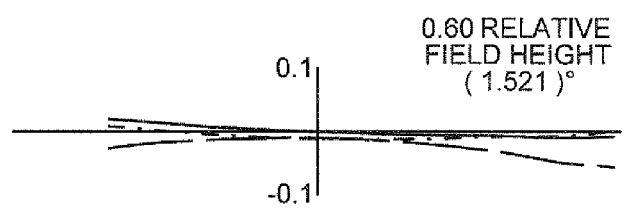
Figure 33G:
Figure 33D:
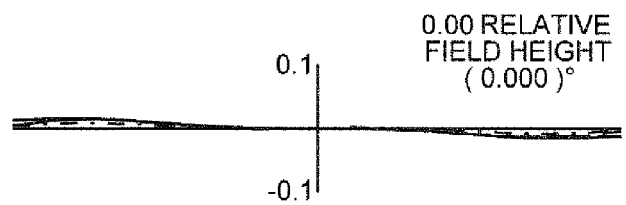
Figure 33H:
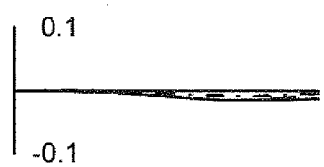
Figure 37A:
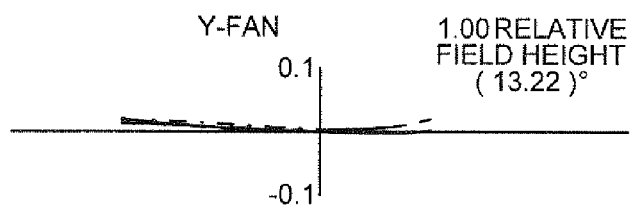
FIGS. 37A to 37H are lateral aberration diagrams of Example 5 at the wide angle end, before camera-shake correction in accordance with one or more embodiments of the invention.
Figure 37B:
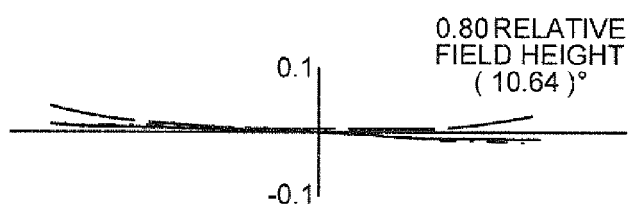
Figure 37C:
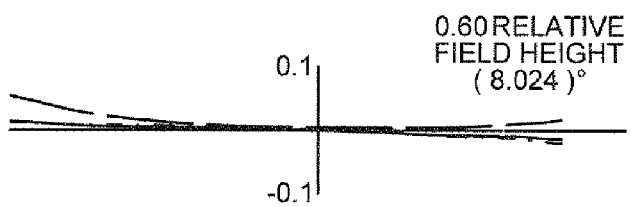
Figure 37D:
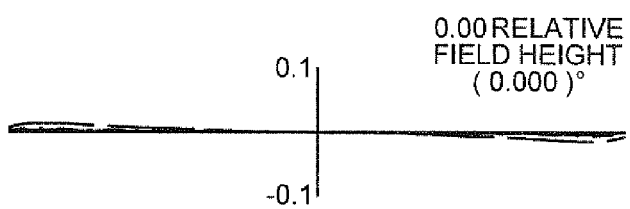
Figure 37E:
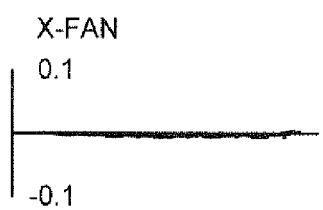
Figure 37F:
Figure 37G:
Figure 37H:
Figure 38A:
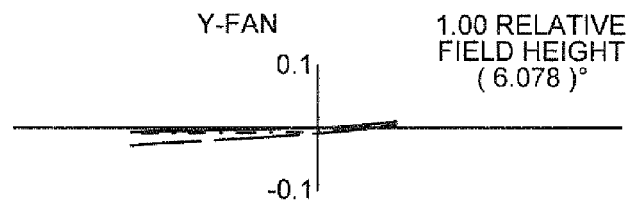
FIGS. 38A to 38H are lateral aberration diagrams of Example 5 in the middle focal length state, before camera-shake correction in accordance with one or more embodiments of the invention.
Figure 38E:
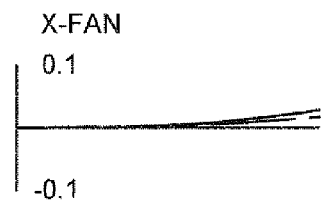
Figure 38B:
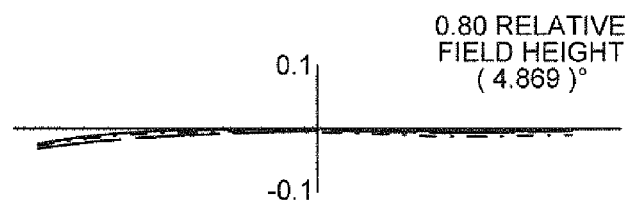
Figure 38F:
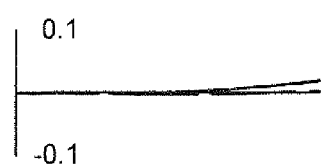
Figure 38C:
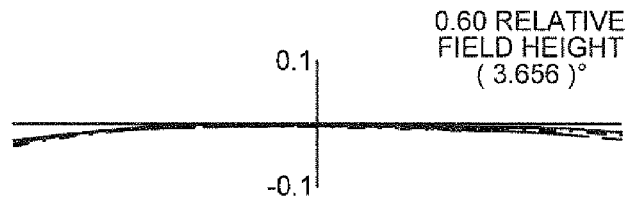
Figure 38G:
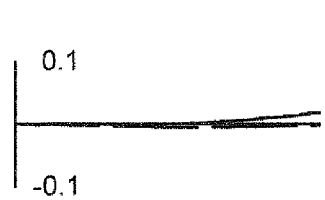
Figure 38D:
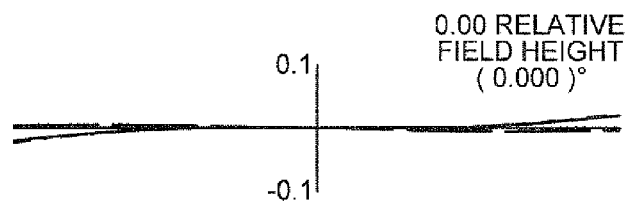
Figure 38H:
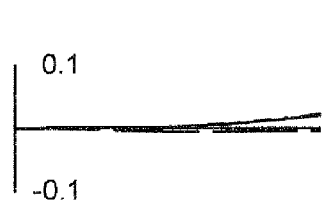
Figure 39A:
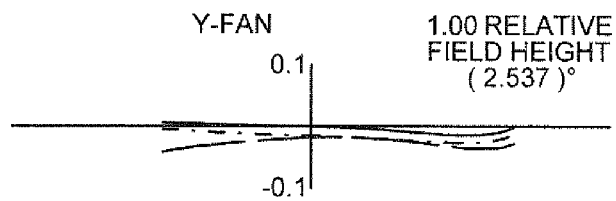
FIGS. 39A to 39H are lateral aberration diagrams of Example 5 at the telephoto end, before camera-shake correction in accordance with one or more embodiments of the invention.
Figure 39E:
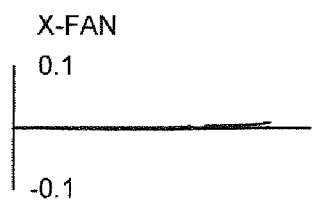
Figure 39B:
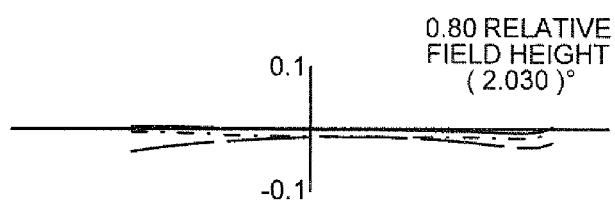
Figure 39F:
Figure 39C:
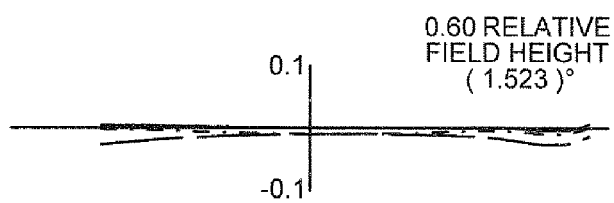
Figure 39G:
Figure 39D:
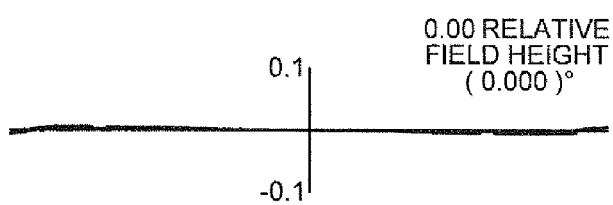
Figure 39H:
Figure 44A:
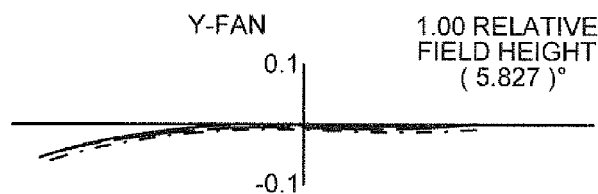
FIGS. 44A to 44H are lateral aberration diagrams of Example 6 in the middle focal length state, before camera-shake correction in accordance with one or more embodiments of the invention.
Figure 44B:
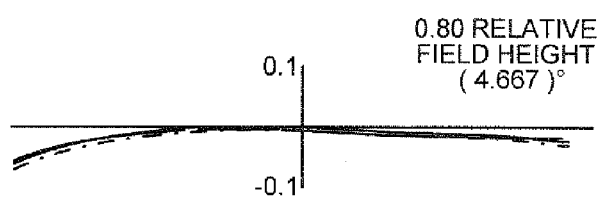
Figure 44C:
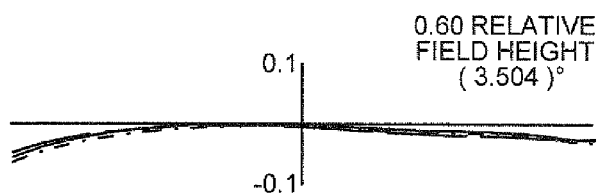
Figure 44D:
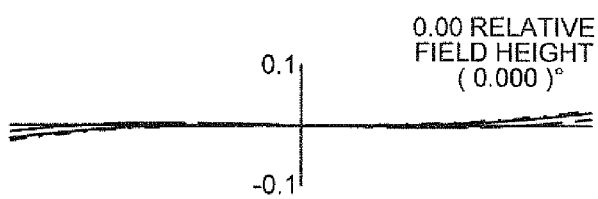
Figure 44E:
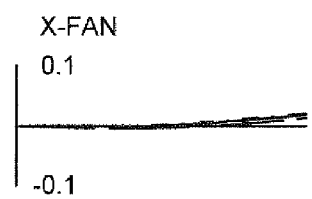
Figure 44F:
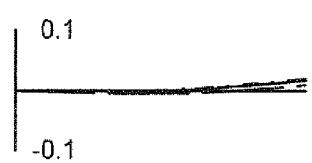
Figure 44G:
Figure 44H:
Figure 48A:
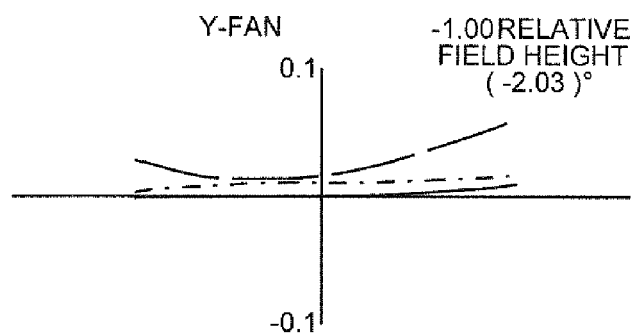
FIGS. 48A to 48F are lateral aberration diagrams of Example 6 at the telephoto end, after camera-shake correction in accordance with one or more embodiments of the invention.
Figure 48D:
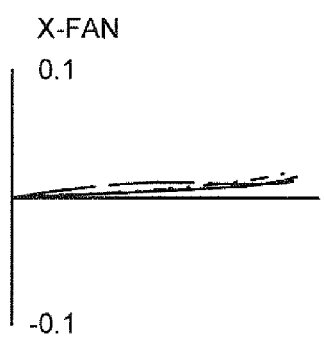
Figure 48B:
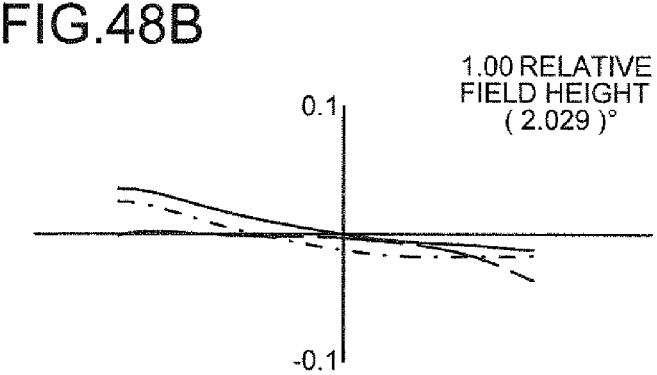
Figure 48E:
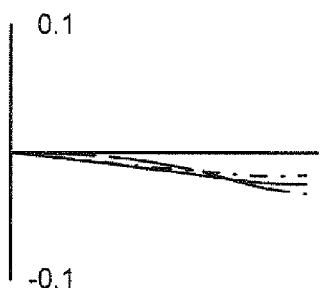
Figure 48C:
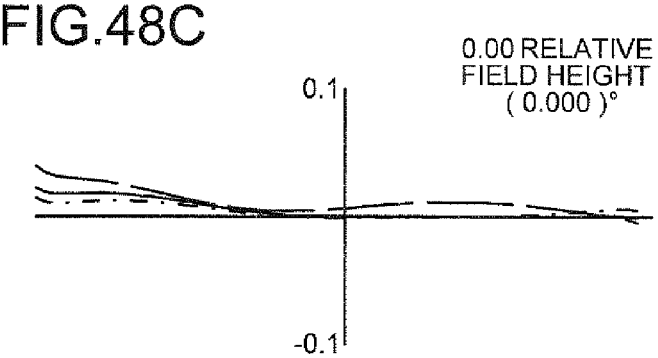
Figure 48F:
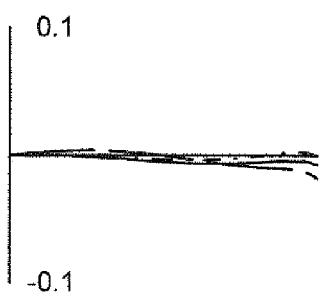

In one or more embodiments described by FIG. 6, in the zoom lens system ZL having a five-group design with a positive-negative-positive-negative-positive arrangement, the lens groups are configured as follows in order from the object side, as seen in paraxial surface shape. The first lens group Gr1 is composed of a positive meniscus lens element convex to the object side, and a cemented lens element composed of a negative meniscus lens element concave to the image side and a positive meniscus lens element convex to the object side. The second lens group Gr2 is composed of a biconcave negative lens element and a positive meniscus lens element convex to the object side. The third lens group Gr3 is composed of the front lens group Gr3F having a negative optical power and the rear lens group Gr3R having a positive optical power, and the stop ST is disposed between the second lens group Gr2 and third lens group Gr3. The front lens group Gr3F is the camera-shake correction lens group GrV, and is composed of one cemented lens element composed of a biconcave negative lens element and a positive meniscus lens element convex to the object side. The rear lens group Gr3R is composed of a biconvex positive lens element (having aspherical surfaces on both sides), a cemented lens element composed of a negative meniscus lens element concave to the image side and a biconvex positive lens element, and a biconvex positive lens element. The fourth lens group Gr4 is composed of one cemented lens element composed of a biconvex positive lens element and a biconcave negative lens element. The fifth lens group Gr5 is composed of a biconvex positive lens element (having aspherical surfaces on both sides) and a biconcave negative lens element.

EXAMPLES

Hereinafter, the configuration and other features of each of zoom lens systems to which embodiments of the invention are applied will be described in more detail with reference to construction data etc. of examples. Examples 1 to 6 (EX1 to EX6) presented below are numerical examples respectively corresponding to the embodiments described above, and optical configuration diagrams (FIG. 1 to FIG. 6) showing the lens arrangement, shapes of lens elements, etc. of a corresponding one of Examples 1 to 6.

In the construction data of each example, listed as surface data are, from the leftmost column rightward, surface number i, radius of curvature r (mm), axial face-to-face distance d (mm), refractive index nd for the d-line (with a wavelength of 587.56 nm), and Abbe number vd for the d-line. A surface whose surface number is marked with an asterisk "*" is an aspherical surface, of which the surface shape is defined by formula (AS) below in a local rectangular coordinate system (x, y, z) having its origin at the vertex of the surface. Listed as aspherical surface data are aspherical surface coefficients, etc. In the aspherical surface data of each example, any absent term indicates that the corresponding coefficient equals zero, and "e−n=×10$^{-n}$" holds with respect to all the data:

$$z = \frac{ch^2}{\sqrt{1-(1+K)c^2h^2}} + \Sigma A_j h^j \quad (AS)$$

where h represents a height in a direction perpendicular to the z-axis (optical axis AX), ($h^2=x^2+y^2$);

z represents an amount of sag in the optical axis AX direction at a height h (relative to the vertex of the surface);

c represents a curvature (the reciprocal of a radius of curvature r) at the vertex of the surface;

K represents a conic constant; and

Aj represents an aspherical surface coefficient of j-th order.

As miscellaneous data, a zoom ratio (magnification variation ratio) is shown, and furthermore, with respect to each of the focal length states W, M and T, a focal length of the entire system (F1, mm), an f-number (Fno.), a half angle of view (ω, °), an image height (y'max, mm), a total lens length (TL, mm), a back focus (BF, mm) and a variable surface-to-surface distance (di, i: surface number, mm) are shown. As zoom lens group data, a focal length (f1, 12, f3, f4, f5, f6; mm) of each lens group is shown. Here, the back focus BF is given as an air equivalent length from the last lens surface to the paraxial image surface, and the total lens length TL is the sum of the distance from the foremost lens surface to the last lens surface and the back focus BF. In table 1, values corresponding to the conditional formulae are show with respect to each of the examples. In table 2, focal lengths fis, f3F, and f3R of the lens groups (the camera-shake correction lens group GrV, the front lens group Gr3F, and the rear lens group Gr3R) in the third lens group Gr3 are shown with respect to each of the examples.

FIGS. 7A to 7I, 8A to 8I, 9A to 9I, 10A to 10I, 11A to 11I, and 12A to 12I are aberration diagrams (longitudinal aberration diagrams in the normal condition (before decentering) and in an infinity in-focus state) respectively corresponding to Example 1 to Example 6 (EX1 to EX6). FIGS. 7A to 7C, 8A to 8C, 9A to 9C, 10A to 10C, 11A to 11C, and 12A to 12C show aberrations at the wide angle end W. FIGS. 7D to 7F, 8D to 8F, 9D to 9F, 10D to 10F, 11D to 11F, and 12D to 12F show aberrations in the middle focal length state M. FIGS. 7G to 7I, 8G to 8I, 9G to 9I, 10G to 10I, 11G to 11I, and 12G to 12I show aberrations at the telephoto end T. Among FIGS. 7A to 7I, 8A to 8I, 9A to 9I, 10A to 10I, 11A to 11I, and 12A to 12I, FIGS. 7A, 7D, and 7G, FIGS. 8A, 8D, and 8G, FIGS. 9A, 9D, and 9G, FIGS. 10A, 10D, and 100, FIGS. 11A, 11D, and 11G, and FIGS. 12A, 12D, and 12G are spherical aberration diagrams; FIGS. 7B, 7E, and 7H, FIGS. 8B, 8E, and 8H, FIGS. 9B, 9E, and 9H, FIGS. 10B, 10E, and 10H, FIGS. 11B, 11E, and 11H, and FIGS. 12B, 12E, and 12H are astigmatism diagrams; and FIGS. 7C, 7F, and 7I, FIGS. 8C, 8F, and 8I, FIGS. 9C, 9F, and 9I, FIGS. 10C, 10F, and 10I, FIGS. 11C, 11F, and 11I, and FIGS. 12C, 12F, 12I are distortion aberration diagrams.

In the spherical aberration diagrams, a solid line represents the amount of spherical aberration for the d-line (with a wavelength of 587.56 nm), a dash-and-dot line represents the amount of spherical aberration for the C-line (with a wavelength of 656.28 nm), and a broken line represents the amount of spherical aberration for the g-line (with a wavelength of 435.84 nm), all in terms of deviations (unit: mm) from a paraxial image plane in the optical axis AX direction, the vertical axis representing the height of incidence at the pupil as normalized with respect to the maximum height of incidence (hence, relative pupil height). In the astigmatism diagrams, a broken line Y represents the tangential image plane for the d-line, and a solid line X represents the sagittal image plane for the d-line, both in terms of deviations (unit: mm) from the paraxial image surface in the optical axis AX direction, the vertical axis represents the image height (IMG HT, unit: mm). In the distortion diagrams, the horizontal axis represents the distortion (unit: %) for the d-line, and the vertical axis represents the image height (IMG HT, unit: mm). The maximum value of the image height IMG HT (that is, the maximum image height y'max) corresponds to one-half (that is, diagonal image height) of the diagonal length of the light-receiving surface SS of the imaging element SR.

FIGS. 13A to 13H, 14A to 14H, 15A to 15H, 16A to 16F, 17A to 17F, 18A to 18F . . . 43A to 43H, 44A to 44H, 45A to 45H, 46A to 46F, 47A to 47F, and 48A to 48F are lateral aberration diagrams (a solid line for d-line, a dash-and-dot line for C-line, a broken line for g-line) of Examples 1 to 6 (EX1 to EX6) before decentering (in the normal condition) and after decentering (during the camera shake correction), in an infinity in-focus state. FIGS. 13A to 13H . . . 18A to 18F correspond to Example 1, FIGS. 19A to 19H . . . 24A to 24F correspond to Example 2, FIGS. 25A to 25H . . . 30A to 30F correspond to Example 3, FIGS. 31A to 31H . . . 36A to 36F correspond to Example 4, FIGS. 37A to 37H . . . 42A to 42F correspond to Example 5, and FIGS. 43A to 43H . . . 48A to 48F correspond to Example 6. As those of skill in the art would readily appreciate, X-FAN indicates lateral aberration in the direction of the X-axis, and Y-FAN indicates a lateral aberration in the direction of the Y-axis.

FIGS. 13A to 13H, 14A to 14H, and 15A to 15H; FIGS. 19A to 19H, 20A to 20H, and 21A to 21H; FIGS. 25A to 25H, 26A to 26H, and 27A to 27H; FIGS. 31A to 31H, 32A to 32H, and 33A to 33H; FIGS. 37A to 37H, 38A to 38H, and 39A to 39H; and FIGS. 43A to 43H, 44A to 44H, and 45A to 45H are lateral aberration diagrams in the focal length states W, M, and T before decentering. FIGS. 16A to 16F, 17A to 17F, and 18A to 18F; FIGS. 22A-22F, 23A-23F, and 24A-24F; FIGS. 28A-28F, 29A-29F, and 30A-30F; FIGS. 34A-34F, 35A-35F, and 36A-36F; FIGS. 40A-40F, 41A-41F, and 42A-42F; and FIGS. 46A-46F, 47A-47F, and 48A-48F are lateral aberration diagrams in the focal length states W, M, and T after decentering.

The lateral aberration diagrams before decentering illustrate axial and off-axial lateral aberration performance (0.6 image height, 0.8 image height, 1.0 image height). The lateral aberration diagrams after decentering illustrate axial and off-axial lateral aberration performance (±0.8 image height) when an image blur of an angle of 0.3 degrees is corrected by decentering the camera-shake correction lens group GrV.

Example 1

Unit: mm

Surface Data

| i | r | d | nd | vd |
|---|---|---|---|---|
| object | infinity | infinity | | |
| 1 | 92.406 | 3.814 | 1.48749 | 70.44 |
| 2 | 731.888 | 0.100 | | |
| 3 | 70.141 | 1.000 | 1.80610 | 33.27 |
| 4 | 45.673 | 5.586 | 1.48749 | 70.44 |
| 5 | 400.081 | variable | | |
| 6 | 58.880 | 0.800 | 1.77250 | 49.62 |
| 7 | 20.907 | 15.715 | | |
| 8 | 34.344 | 1.493 | 1.75211 | 25.05 |
| 9 | 62.884 | variable | | |
| 10 (stop) | infinity | 9.196 | | |
| 11 | −81.467 | 0.800 | 1.69680 | 55.46 |
| 12 | 30.322 | 0.874 | | |
| 13 | 28.762 | 3.000 | 1.75211 | 25.05 |
| 14 | 58.867 | 9.430 | | |
| 15 | −815.151 | 2.024 | 1.48749 | 70.44 |
| 16 | −43.773 | 2.521 | | |
| 17 | 146.621 | 0.700 | 1.75211 | 25.05 |
| 18 | 26.929 | 4.010 | 1.51823 | 58.96 |
| 19 | −48.488 | 0.400 | | |
| 20 | 31.674 | 3.055 | 1.49700 | 81.61 |
| 21 | −134.875 | variable | | |
| 22 | 230.497 | 1.722 | 1.84666 | 23.78 |
| 23 | −87.228 | 0.810 | 1.69680 | 55.46 |
| 24 | 25.566 | variable | | |
| image | infinity | | | |

Miscellaneous Data
zoom ratio 5.31

| | Wide (W) | Mid (M) | Tele (T) |
|---|---|---|---|
| Fl | 46.014 | 108.925 | 244.162 |
| Fno. | 4.501 | 5.462 | 5.803 |
| ω | 13.227 | 5.670 | 2.536 |
| y'max | 10.815 | 10.815 | 10.815 |
| TL | 143.615 | 186.369 | 208.684 |
| BF | 25.441 | 52.582 | 62.597 |
| d5 | 1.800 | 42.056 | 74.858 |
| d9 | 22.229 | 9.740 | 2.190 |
| d21 | 27.095 | 14.942 | 1.989 |
| d24 | 25.441 | 52.582 | 62.597 |

Zoom Lens Group Data

| Group (Surface) | Focal Length |
|---|---|
| 1 (1-5) | 125.242 |
| 2 (6-9) | −100.214 |
| 3 (10-21) | 34.910 |
| 4 (22-24) | −46.069 |

Example 2

Unit: mm

Surface Data

| i | r | d | nd | vd |
|---|---|---|---|---|
| object | infinity | infinity | | |
| 1 | 90.536 | 3.672 | 1.48749 | 70.44 |
| 2 | 435.993 | 0.178 | | |
| 3 | 65.725 | 1.200 | 1.80610 | 33.27 |
| 4 | 44.550 | 5.680 | 1.49700 | 81.61 |
| 5 | 380.042 | variable | | |
| 6 | 54.211 | 0.800 | 1.77250 | 49.62 |
| 7 | 18.068 | 6.017 | | |
| 8 | 21.445 | 1.644 | 1.75211 | 25.05 |
| 9 | 32.606 | variable | | |
| 10 (stop) | infinity | 3.336 | | |
| 11 | −54.944 | 0.800 | 1.69680 | 55.46 |
| 12 | 22.400 | 0.879 | | |
| 13 | 21.949 | 2.402 | 1.75211 | 25.05 |
| 14 | 40.249 | 2.000 | | |
| 15* | 30.135 | 3.192 | 1.48749 | 70.24 |
| 16* | −170.768 | 6.213 | | |
| 17 | −134.554 | 0.800 | 1.75211 | 25.05 |
| 18 | 35.616 | 3.440 | 1.51823 | 58.96 |
| 19 | −28.839 | 0.400 | | |
| 20 | 85.792 | 3.266 | 1.49700 | 81.61 |
| 21 | −23.513 | variable | | |
| 22 | 444.302 | 1.681 | 1.84666 | 23.78 |
| 23 | −51.604 | 0.810 | 1.69680 | 55.46 |
| 24 | 21.202 | variable | | |
| image | infinity | | | |

-continued

Unit: mm

Aspherical Surface Data

| i | K | A4 | A6 |
|---|---|---|---|
| 15 | 0.0000e+000 | 2.0338e−005 | 1.2350e−007 |
| 16 | 0.0000e+000 | 6.6864e−005 | 2.1950e−007 |

| A8 | A10 | A12 |
|---|---|---|
| 0.0000e+000 | 0.0000e+000 | 0.0000e+000 |
| 0.0000e+000 | 0.0000e+000 | 0.0000e+000 |

| A14 | A16 |
|---|---|
| 0.0000e+000 | 0.0000e+000 |
| 0.0000e+000 | 0.0000e+000 |

Miscellaneous Data
zoom ratio 5.31

| | Wide angle (W) | Middle (M) | Telephoto (T) |
|---|---|---|---|
| Fl | 46.014 | 107.740 | 244.134 |
| Fno. | 4.501 | 5.271 | 5.802 |
| ω | 13.227 | 5.732 | 2.537 |
| y'max | 10.815 | 10.815 | 10.815 |
| TL | 123.635 | 155.847 | 183.685 |
| BF | 24.954 | 39.803 | 55.373 |
| d5 | 1.800 | 45.580 | 75.334 |
| d9 | 24.865 | 6.912 | 2.572 |
| d21 | 23.605 | 15.142 | 1.995 |
| d24 | 24.954 | 39.803 | 55.373 |

Zoom Lens Group Data

| Group (Surface) | Focal Length |
|---|---|
| 1 (1-5) | 119.319 |
| 2 (6-9) | −71.478 |
| 3 (10-21) | 29.631 |
| 4 (22-24) | −35.807 |

Example 3

Unit: mm

Surface Data

| i | r | d | nd | vd |
|---|---|---|---|---|
| object | infinity | infinity | | |
| 1 | 109.401 | 3.545 | 1.48749 | 70.44 |
| 2 | 848.396 | 0.100 | | |
| 3 | 53.797 | 1.200 | 1.84666 | 23.78 |
| 4 | 42.478 | 5.772 | 1.49700 | 81.61 |
| 5 | 285.669 | variable | | |
| 6 | −3956.181 | 0.800 | 1.83481 | 42.72 |
| 7 | 20.081 | 1.225 | | |
| 8 | 22.982 | 1.922 | 1.84666 | 23.78 |
| 9 | 55.718 | variable | | |
| 10 (stop) | infinity | 3.320 | | |
| 11 | −63.156 | 0.810 | 1.80610 | 33.27 |
| 12 | 14.560 | 2.110 | 1.84666 | 23.78 |
| 13 | 53.114 | 2.000 | | |
| 14* | 39.495 | 1.631 | 1.58313 | 59.38 |
| 15* | −223.806 | 8.117 | | |
| 16 | 76.030 | 0.800 | 1.84666 | 23.78 |
| 17 | 29.942 | 3.340 | 1.49700 | 81.61 |
| 18 | −26.869 | 0.400 | | |
| 19 | 91.632 | 2.465 | 1.49700 | 81.61 |
| 20 | −31.521 | variable | | |
| 21 | −938.439 | 1.800 | 1.92286 | 20.88 |
| 22 | −29.827 | 0.810 | 1.83481 | 42.72 |
| 23 | 22.541 | variable | | |
| image | infinity | | | |

Aspherical Surface Data

| i | K | A4 | A6 |
|---|---|---|---|
| 14 | 0.0000e+000 | −2.1742e−005 | −3.1752e−007 |
| 15 | 0.0000e+000 | 1.2040e−005 | −2.5037e−007 |

| A8 | A10 | A12 |
|---|---|---|
| −5.7716e−009 | −6.7100e−011 | 0.0000e+000 |
| −6.9898e−009 | −4.6936e−011 | 0.0000e+000 |

| A14 | A16 |
|---|---|
| 0.0000e+000 | 0.0000e+000 |
| 0.0000e+000 | 0.0000e+000 |

Miscellaneous Data
zoom ratio 5.30

| | Wide angle (W) | Middle (M) | Telephoto (T) |
|---|---|---|---|
| Fl | 46.064 | 104.830 | 244.270 |
| Fno. | 4.502 | 4.735 | 5.801 |
| ω | 13.213 | 5.890 | 2.535 |
| y'max | 10.815 | 10.815 | 10.815 |
| TL | 114.708 | 134.961 | 165.689 |
| BF | 24.395 | 29.677 | 56.295 |
| d5 | 1.957 | 41.943 | 61.946 |
| d9 | 25.449 | 6.685 | 3.282 |
| d20 | 20.739 | 14.488 | 1.998 |
| d23 | 24.395 | 29.677 | 56.295 |

Zoom Lens Group Data

| Group (Surface) | Focal Length |
|---|---|
| 1 (1-5) | 102.111 |
| 2 (6-9) | −52.413 |
| 3 (10-20) | 26.910 |
| 4 (21-23) | −28.518 |

Example 4

Unit: mm

Surface Data

| i | r | d | nd | vd |
|---|---|---|---|---|
| object | infinity | infinity | | |
| 1 | 131.998 | 3.414 | 1.48749 | 70.44 |
| 2 | −5459.942 | 0.200 | | |
| 3 | 51.155 | 1.200 | 1.84666 | 23.78 |
| 4 | 40.467 | 5.934 | 1.49700 | 81.61 |
| 5 | 248.247 | variable | | |
| 6 | 232.973 | 0.800 | 1.83481 | 42.72 |
| 7 | 15.545 | 2.074 | | |
| 8 | 17.348 | 1.769 | 1.84666 | 23.78 |
| 9 | 30.649 | variable | | |
| 10 (stop) | infinity | 3.435 | | |
| 11 | −61.600 | 0.810 | 1.83400 | 37.34 |
| 12 | 19.515 | 2.205 | 1.84666 | 23.78 |
| 13 | 93.272 | 2.000 | | |
| 14* | 20.071 | 3.637 | 1.58313 | 59.38 |
| 15* | −116.454 | 4.759 | | |
| 16 | 139.565 | 0.800 | 1.90366 | 31.31 |
| 17 | 19.475 | 4.010 | 1.49700 | 81.61 |
| 18 | −32.816 | 0.200 | | |
| 19 | 71.326 | 2.941 | 1.49700 | 81.61 |

-continued

Unit: mm

| | | | | |
|---|---|---|---|---|
| 20 | −26.177 | variable | | |
| 21 | 119.311 | 1.739 | 1.84666 | 23.78 |
| 22 | −46.360 | 0.810 | 1.72916 | 54.67 |
| 23 | 16.944 | variable | | |
| 24* | 77.813 | 1.316 | 1.58313 | 59.38 |
| 25* | −904.632 | 1.763 | | |
| 26 | −30.815 | 0.800 | 1.72916 | 54.67 |
| 27 | −83.899 | variable | | |
| image | infinity | | | |

Aspherical Surface Data

| i | K | A4 | A6 |
|---|---|---|---|
| 14 | 0.0000e+000 | −1.2048e−005 | 1.1531e−008 |
| 15 | 0.0000e+000 | 3.4169e−005 | 3.9983e−008 |
| 24 | 0.0000e+000 | 5.4446e−005 | −9.1726e−008 |
| 25 | 0.0000e+000 | 4.3505e−005 | 1.5019e−007 |

| A8 | A10 | A12 |
|---|---|---|
| 3.8744e−010 | −2.2519e−011 | 0.0000e+000 |
| −1.1505e−010 | −2.1406e−011 | 0.0000e+000 |
| −4.0074e−009 | −1.2023e−010 | 0.0000e+000 |
| −1.1038e−008 | −5.5498e−011 | 0.0000e+000 |

| A14 | A16 |
|---|---|
| 0.0000e+000 | 0.0000e+000 |
| 0.0000e+000 | 0.0000e+000 |
| 0.0000e+000 | 0.0000e+000 |
| 0.0000e+000 | 0.0000e+000 |

Miscellaneous Data
zoom ratio 5.30

| | Wide angle (W) | Middle (M) | Telephoto (T) |
|---|---|---|---|
| Fl | 46.103 | 103.642 | 244.329 |
| Fno. | 4.505 | 5.291 | 5.802 |
| ω | 13.202 | 5.957 | 2.534 |
| y'max | 10.815 | 10.815 | 10.815 |
| TL | 114.779 | 134.857 | 165.867 |
| BF | 22.079 | 19.336 | 46.053 |
| d5 | 1.813 | 40.834 | 59.661 |
| d9 | 23.958 | 6.963 | 2.848 |
| d20 | 15.362 | 12.066 | 1.997 |
| d23 | 4.953 | 9.043 | 8.692 |
| d27 | 22.079 | 19.336 | 46.053 |

Zoom Lens Group Data

| Group (Surface) | Focal Length |
|---|---|
| 1 (1-5) | 101.339 |
| 2 (6-9) | −37.605 |
| 3 (10-20) | 25.578 |
| 4 (21-23) | −30.359 |
| 5 (24-27) | −154.589 |

Example 5

Unit: mm

Surface Data

| i | r | d | nd | vd |
|---|---|---|---|---|
| object | infinity | infinity | | |
| 1 | 83.116 | 1.200 | 1.84666 | 23.78 |
| 2 | 61.624 | 5.231 | 1.49700 | 81.61 |
| 3 | −1938.821 | 0.200 | | |
| 4 | 58.960 | 3.870 | 1.49700 | 81.61 |

-continued

Unit: mm

| | | | | |
|---|---|---|---|---|
| 5 | 163.299 | variable | | |
| 6 | 999.055 | 0.800 | 1.83481 | 42.72 |
| 7 | 18.967 | 3.145 | | |
| 8 | 21.882 | 2.102 | 1.92286 | 20.88 |
| 9 | 36.630 | variable | | |
| 10 (stop) | infinity | 3.341 | | |
| 11 | −81.059 | 0.810 | 1.80610 | 33.27 |
| 12 | 15.858 | 2.642 | 1.84666 | 23.78 |
| 13 | 59.248 | 2.000 | | |
| 14* | 17.551 | 4.000 | 1.58313 | 59.38 |
| 15* | −135.234 | 2.177 | | |
| 16 | 57.710 | 0.800 | 1.91082 | 35.25 |
| 17 | 14.854 | 4.010 | 1.49700 | 81.61 |
| 18 | −77.181 | 0.811 | | |
| 19 | 40.057 | 3.298 | 1.49700 | 81.61 |
| 20 | −26.913 | variable | | |
| 21 | 53.346 | 0.800 | 1.77250 | 49.62 |
| 22 | 10.711 | 3.326 | | |
| 23 | 32.321 | 2.734 | 1.67270 | 32.17 |
| 24 | −22.395 | 1.258 | | |
| 25 | −16.957 | 0.800 | 1.74320 | 49.29 |
| 26* | −168.879 | variable | | |
| image | infinity | | | |

Aspherical Surface Data

| i | K | A4 | A6 |
|---|---|---|---|
| 14 | 0.0000e+000 | −1.6918e−005 | −1.6655e−007 |
| 15 | 0.0000e+000 | 3.2039e−005 | −1.3989e−007 |
| 26 | 0.0000e+000 | −7.9128e−005 | −1.1801e−007 |

| A8 | A10 | A12 |
|---|---|---|
| 3.7966e−009 | −4.1683e−011 | 0.0000e+000 |
| 3.4015e−009 | −4.1795e−011 | 0.0000e+000 |
| −5.6666e−009 | 4.5083e−011 | 0.0000e+000 |

| A14 | A16 |
|---|---|
| 0.0000e+000 | 0.0000e+000 |
| 0.0000e+000 | 0.0000e+000 |
| 0.0000e+000 | 0.0000e+000 |

Miscellaneous Data
zoom ratio 5.30

| | Wide angle (W) | Middle (M) | Telephoto (T) |
|---|---|---|---|
| Fl | 46.033 | 101.564 | 244.108 |
| Fno. | 4.503 | 5.065 | 5.803 |
| ω | 13.221 | 6.078 | 2.537 |
| y'max | 10.815 | 10.815 | 10.815 |
| TL | 114.627 | 131.062 | 165.624 |
| BF | 22.495 | 20.460 | 53.550 |
| d5 | 2.013 | 42.899 | 57.958 |
| d9 | 26.246 | 7.048 | 2.761 |
| d20 | 14.518 | 11.301 | 2.000 |
| d26 | 22.495 | 20.460 | 53.550 |

Zoom Lens Group Data

| Group (Surface) | Focal Length |
|---|---|
| 1 (1-5) | 98.402 |
| 2 (6-9) | −42.101 |
| 3 (10-20) | 24.644 |
| 4 (21-26) | −22.821 |

Example 6

Unit: mm

Surface Data

| i | r | d | nd | vd |
|---|---|---|---|---|
| object | infinity | infinity | | |
| 1 | 108.560 | 3.387 | 1.48749 | 70.44 |
| 2 | 600.783 | 0.200 | | |
| 3 | 50.555 | 1.200 | 1.84666 | 23.78 |
| 4 | 40.013 | 6.165 | 1.49700 | 81.61 |
| 5 | 309.858 | variable | | |
| 6 | −95.450 | 0.800 | 1.83481 | 42.72 |
| 7 | 18.811 | 1.117 | | |
| 8 | 20.573 | 2.157 | 1.84666 | 23.78 |
| 9 | 57.520 | variable | | |
| 10 (stop) | infinity | 3.454 | | |
| 11 | −74.721 | 0.810 | 1.72916 | 54.67 |
| 12 | 21.159 | 2.018 | 1.91082 | 35.25 |
| 13 | 50.050 | 2.000 | | |
| 14* | 21.157 | 3.149 | 1.58313 | 59.38 |
| 15* | −96.804 | 0.200 | | |
| 16 | 43.333 | 0.800 | 1.90366 | 31.31 |
| 17 | 15.294 | 4.010 | 1.49700 | 81.61 |
| 18 | −89.558 | 0.200 | | |
| 19 | 30.368 | 3.184 | 1.49700 | 81.61 |
| 20 | −35.256 | variable | | |
| 21 | 601.528 | 1.553 | 1.92286 | 20.88 |
| 22 | −44.913 | 0.810 | 1.72916 | 54.67 |
| 23 | 13.796 | variable | | |
| 24* | 464.345 | 1.853 | 1.58313 | 59.38 |
| 25* | −24.439 | 1.210 | | |
| 26 | −30.695 | 0.800 | 1.72916 | 54.67 |
| 27 | 513.681 | variable | | |
| image | infinity | | | |

Aspherical Surface Data

| i | K | A4 | A6 |
|---|---|---|---|
| 14 | 0.0000e+000 | −1.5499e−005 | 1.5969e−007 |
| 15 | 0.0000e+000 | 1.7027e−005 | 1.7705e−007 |
| 24 | 0.0000e+000 | 3.5524e−005 | −5.5850e−007 |
| 25 | 0.0000e+000 | 1.7931e−005 | −3.9956e−007 |

| A8 | A10 | A12 |
|---|---|---|
| −1.0890e−009 | −3.6279e−012 | 0.0000e+000 |
| −1.5167e−009 | −1.8129e−012 | 0.0000e+000 |
| 1.8709e−008 | −2.3239e−010 | 0.0000e+000 |
| 1.2944e−008 | −1.6951e−010 | 0.0000e+000 |

| A14 | A16 |
|---|---|
| 0.0000e+000 | 0.0000e+000 |
| 0.0000e+000 | 0.0000e+000 |
| 0.0000e+000 | 0.0000e+000 |
| 0.0000e+000 | 0.0000e+000 |

Miscellaneous Data
zoom ratio 5.31

| | Wide angle (W) | Middle (M) | Telephoto (T) |
|---|---|---|---|
| Fl | 46.037 | 105.983 | 244.227 |
| Fno. | 4.501 | 5.602 | 5.801 |
| ω | 13.220 | 5.827 | 2.536 |
| y'max | 10.815 | 10.815 | 10.815 |
| TL | 114.663 | 126.902 | 165.734 |
| BF | 22.003 | 25.747 | 51.582 |
| d5 | 2.293 | 37.844 | 52.877 |
| d9 | 30.691 | 7.828 | 2.592 |
| d20 | 11.426 | 8.996 | 1.999 |
| d23 | 7.174 | 5.409 | 15.606 |
| d27 | 22.003 | 25.747 | 51.582 |

Zoom Lens Group Data

Unit: mm

| Group (Surface) | Focal Length |
|---|---|
| 1 (1-5) | 97.702 |
| 2 (6-9) | −39.450 |
| 3 (10-20) | 22.549 |
| 4 (21-23) | −21.367 |
| 5 (24-27) | 1409.667 |

TABLE 1

| Values Corresponding to Conditional Formulae | (1) fis/f3 | (2) d3/y'max | (3) f2/f1 | (4) f3/f1 |
|---|---|---|---|---|
| Example 1 | −1.60 | 0.87 | −0.80 | 0.28 |
| Example 2 | −1.21 | 0.57 | −0.60 | 0.25 |
| Example 3 | −1.42 | 0.75 | −0.51 | 0.26 |
| Example 4 | −1.76 | 0.44 | −0.37 | 0.25 |
| Example 5 | −1.85 | 0.20 | −0.43 | 0.25 |
| Example 6 | −2.28 | 0.18 | −0.40 | 0.23 |

TABLE 2

Lens Groups in 3$^{rd}$ Lens Group

| | GrV | Gr3F | Gr3R |
|---|---|---|---|
| | | Focal Length | |
| | fis | f3F | f3R |
| Example 1 | −55.77 | −55.77 | 28.33 |
| Example 2 | −35.83 | −149.42 | 29.90 |
| Example 3 | −38.20 | −132.09 | 26.11 |
| Example 4 | −45.13 | 71.23 | 35.85 |
| Example 5 | −45.70 | 56.44 | 38.18 |
| Example 6 | −51.45 | −51.45 | 17.51 |

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A zoom lens system that performs magnification variation by moving a plurality of lens groups along an optical axis to change a distance between the plurality of lens groups, the zoom lens system comprising, in order from an object side:
   a first lens group having a positive optical power;
   a second lens group having a negative optical power;
   a third lens group having a positive optical power; and
   a fourth lens group,
   wherein,
   during magnification variation from a wide angle end to a telephoto end, a distance between the first lens group and the second lens group is increased, a distance between the second lens group and the third lens group is reduced, and a distance between the third lens group and the fourth lens group is reduced;
   the third lens group includes, in order from the object side, a front lens group and a rear lens group which are separated from each other by a widest air gap on an optical axis in the third lens group;

camera-shake correction is performed by moving whole or part of the front lens group as a camera-shake correction lens group in a direction perpendicular to the optical axis;
conditional formula (1) below is satisfied:

$$-3.0 < fis/f3 < -0.9 \qquad (1)$$

where
f3 represents a focal length of the third lens group; and
fis represents a focal length of the camera-shake correction lens group; and
conditional formula (4) below is satisfied;

$$0.2 < f3/f1 < 0.29 \qquad (4)$$

where
f1 represents a focal length of the first lens group.

2. The zoom lens system according to claim 1, wherein,
in the third lens group, the front lens group is a lens group having a negative optical power, and the rear lens group is a lens group having a positive optical power; and
conditional formula (2) below is satisfied:

$$0.15 < d3/y'\text{max} < 1.1 \qquad (2)$$

where
d3 represents the widest air gap between the front lens group and the rear lens group on the optical axis; and
y'max represents a diagonal image height.

3. The zoom lens system according to claim 1, wherein
the third lens group includes at least one aspherical surface.

4. The zoom lens system according to claim 1, wherein
the camera-shake correction lens group includes at least a positive lens element and a negative lens element.

5. The zoom lens system according to claim 1, wherein
a stop that moves with the third lens group during magnification variation is disposed between the second lens group and the third lens group; and
the front lens group in the third lens group includes, in order from the object side, the camera-shake correction lens group and a positive lens element.

6. The zoom lens system according to claim 1, wherein
conditional formula (3) below is satisfied:

$$-1.2 < f2/f1 < -0.2 \qquad (3)$$

where
f1 represents a focal length of the first lens group; and
f2 represents a focal length of the second lens group.

7. The zoom lens system according to claim 1, wherein,
during focusing from an infinity object to a close-distance object, the fourth lens group moves along the optical axis.

8. The zoom lens system according to claim 1, wherein
the fourth lens group includes at least a positive lens element and a negative lens element.

9. The zoom lens system according to claim 1, wherein
the fourth lens group has a negative optical power as a whole.

10. An imaging optical device comprising:
the zoom lens system according to claim 1; and
an imaging element that converts an optical image formed on a light receiving surface thereof into an electrical signal,
wherein
the zoom lens system is disposed such that an optical image of a subject is formed on the light receiving surface of the imaging element.

11. A digital apparatus comprising
the imaging optical device according to claim 10, wherein
the imaging optical device adds at least one of a subject still image shooting function and a subject moving image shooting function to the digital apparatus.

12. The zoom lens system according to claim 1, wherein
the first lens group moves toward the object side during magnification variation from the wide angle end to the telephoto end.

\* \* \* \* \*